INVENTORS. A.E. JOEL, JR.
M.E. KROM
M. POSIN

BY
ATTORNEY

INVENTORS: A.E. JOEL, JR.
M.E. KROM
M. POSIN
BY
ATTORNEY

INVENTORS. A.E. JOEL, JR.
M.E. KROM
M. POSIN
BY
ATTORNEY

A.E. JOEL, JR.
INVENTORS M.E. KROM
M. POSIN
BY
ATTORNEY

INVENTORS
A. E. JOEL, JR.
M. E. KROM
M. POSIN
BY
ATTORNEY

INVENTORS A.E. JOEL, JR.
M.E. KROM
M. POSIN

BY

ATTORNEY

FIG. 23

Nov. 5, 1957  A. E. JOEL, JR., ET AL  2,812,385
LINE CONCENTRATOR SYSTEM
Filed Dec. 28, 1955  29 Sheets-Sheet 27

FIG. 27

| FIG. 2 | FIG. 5 | FIG. 8 | FIG. 13 | FIG. 17 | FIG. 21 | FIG. 25 |
|---|---|---|---|---|---|---|
| FIG. 3 | FIG. 6 | FIG. 9 | FIG. 14 | FIG. 18 | FIG. 22 | FIG. 26 |
| FIG. 4 | FIG. 7 | FIG. 10 | FIG. 15 | FIG. 19 | FIG. 23 | |
| | | FIG. 11 | FIG. 16 | FIG. 20 | FIG. 24 | |
| | | FIG. 12 | | | | |

FIG. 31

| | HAO CONTACT | | | | | | | |
|---|---|---|---|---|---|---|---|---|
| | 0 | 1 | 2 | 3 | 4 | 5 | 6 | 7 |
| VG0 | 0 | — | — | — | — | — | — | 7 |
| VG1 | 3 | — | — | — | — | — | 3 | 2 |
| VG2 | — | — | — | 2 | — | — | 1 | 1 |
| VG3 | — | 2 | 1 | — | 1 | 3 | — | 1 |
| VG4 | — | — | — | 1 | 3 | 2 | — | — |
| VG5 | 2 | — | 2 | — | — | 1 | 1 | 3 |
| VG6 | — | 3 | 3 | 3 | — | — | 2 | — |
| VG7 | 1 | 1 | — | — | 2 | — | 1 | 1 |
| VG8 | — | — | — | 1 | 3 | — | 2 | 1 |
| VG9 | — | 3 | 3 | — | — | 2 | — | 3 |
| VG10 | 2 | — | — | 1 | — | 1 | 1 | 1 |
| VG11 | 1 | — | 2 | 2 | 1 | 1 | 1 | — |

FIG. 29

| | RESISTANCE | | | | RELAY | | | |
|---|---|---|---|---|---|---|---|---|
| | E | F | G | H | TS0 | TS1 | TS2 | TS3 |
| VG0 | 2 | 3 | 4 | 5 | 0 | 1 | 7 | 6 |
| VG1 | 1 | 2 | 5 | 6 | 4 | 7 | 3 | 0 |
| VG2 | 0 | 3 | 4 | 7 | 6 | 2 | 1 | 5 |
| VG3 | 0 | 1 | 6 | 7 | 2 | 3 | 5 | 4 |
| VG4 | 0 | 4 | 5 | 4 | 3 | 6 | 2 | 7 |
| VG5 | 0 | 3 | 6 | 5 | 7 | 1 | 0 | 3 |
| VG6 | 2 | 1 | 7 | 6 | 1 | 4 | 6 | 2 |
| VG7 | 3 | 3 | 5 | 7 | 5 | 0 | 4 | 6 |
| VG8 | 1 | 3 | 2 | 3 | 2 | 6 | 5 | 7 |
| VG9 | 0 | 1 | 3 | 7 | 4 | 6 | 3 | 0 |
| VG10 | 4 | 5 | 6 | 1 | 1 | 5 | 0 | 2 |
| VG11 | 0 | 2 | 4 | 6 | 5 | 7 | 3 | 1 |

INVENTORS  A.E. JOEL, JR.
M.E. KROM
M. POSIN
BY
ATTORNEY

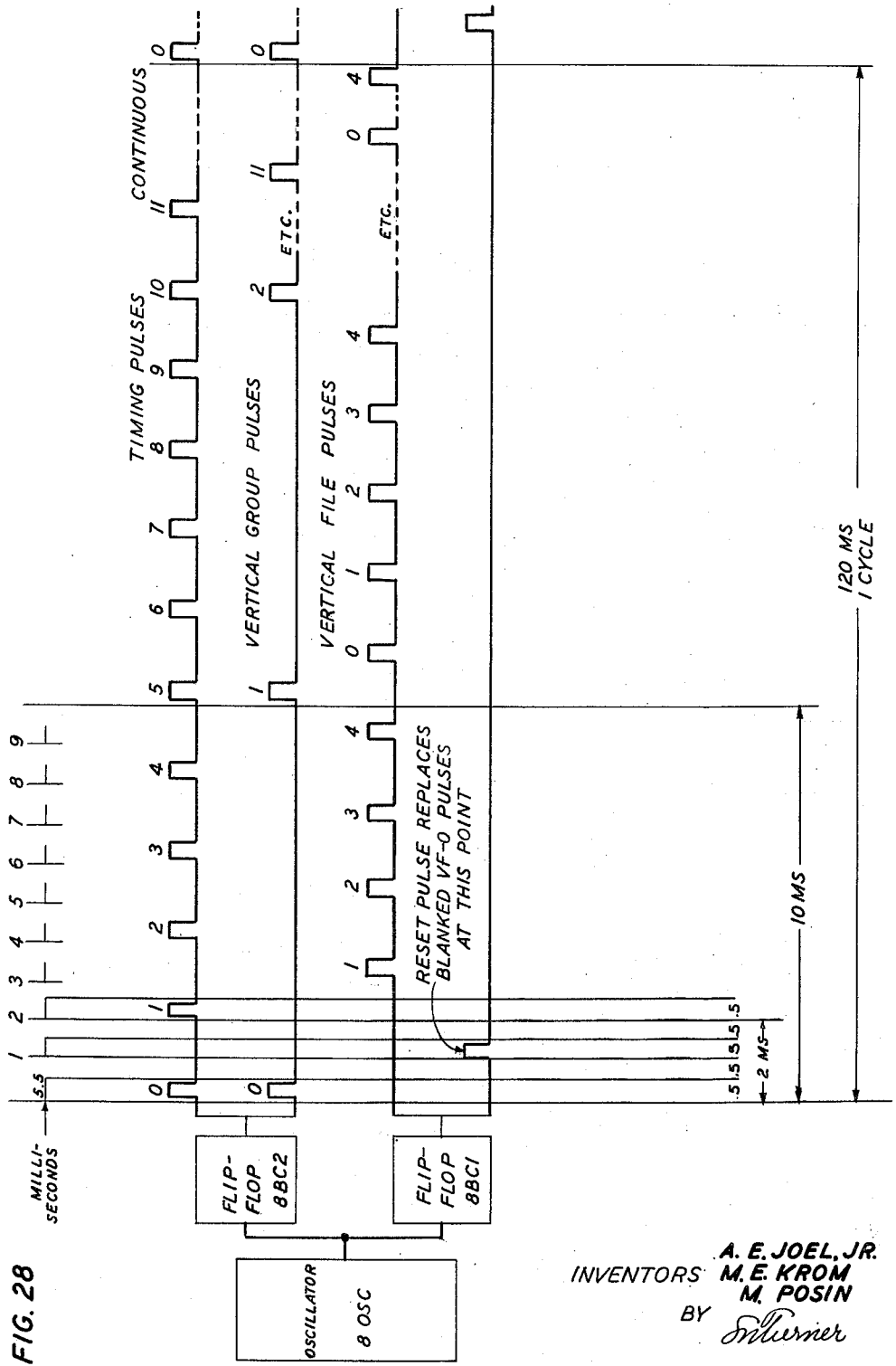

FIG. 30

| FOR SUB LINE NUMBERS | VG | LINE UNIT | | | | | | PREFERENCE |
|---|---|---|---|---|---|---|---|---|
| | | 0 | 1 | 2 | 3 | 4 | 5 | |
| | | TRUNK NUMBER | | | | | | |
| 00 - 04 | 0 | 1 | 6 | 0 | 7 | 8 | 9 | 0, 1, 7, 6, 8, 9 |
| 05 - 09 | 1 | 3 | 4 | 0 | 7 | 8 | 9 | 4, 7, 3, 0, 8, 9 |
| 10 - 14 | 2 | 1 | 6 | 2 | 5 | 8 | 9 | 6, 2, 1, 5, 8, 9 |
| 15 - 19 | 3 | 3 | 4 | 2 | 5 | 8 | 9 | 2, 3, 5, 4, 8, 9 |
| 20 - 24 | 4 | 3 | 6 | 2 | 7 | 8 | 9 | 3, 6, 2, 7, 8, 9 |
| 25 - 29 | 5 | 0 | 5 | 2 | 7 | 8 | 9 | 7, 5, 0, 2, 8, 9 |
| 30 - 34 | 6 | 3 | 6 | 1 | 4 | 8 | 9 | 1, 4, 6, 3, 8, 9 |
| 35 - 39 | 7 | 0 | 5 | 1 | 4 | 8 | 9 | 5, 0, 4, 1, 8, 9 |
| 40 - 44 | 8 | 0 | 2 | 4 | 6 | 8 | 9 | 2, 0, 6, 4, 8, 9 |
| 45 - 49 | 9 | 5 | 7 | 4 | 6 | 8 | 9 | 4, 6, 5, 7, 8, 9 |
| 50 - 54 | 10 | 0 | 2 | 1 | 3 | 8 | 9 | 1, 3, 0, 2, 8, 9 |
| 55 - 59 | 11 | 5 | 7 | 1 | 3 | 8 | 9 | 7, 5, 3, 1, 8, 9 |

INVENTORS  A. E. JOEL, JR.
M. E. KROM
M. POSIN

BY

ATTORNEY

United States Patent Office 2,812,385
Patented Nov. 5, 1957

2,812,385

LINE CONCENTRATOR SYSTEM

Amos E. Joel, Jr., South Orange, and Myron E. Krom, Convent Station, N. J., and Melvin Posin, New York, N. Y., assignors to Bell Telephone Laboratories, Incorporated, New York, N. Y., a corporation of New York Application December 28, 1955, Serial No. 555,948

51 Claims. (Cl. 179—18)

This invention relates to telephone systems and more particularly to subscriber line concentrating systems.

Each subscriber substation normally requires a pair of wires to connect it with the central office. For a substation which is located at a considerable distance from the central office, the cost of these wires is substantial. In fact, in the present day telephone plant a large portion of the cost of installation and operation is that of the wire used in the subscriber loops between the substations and the central office. The utilization of line concentrating systems is attractive where the outside plant costs are high and the distances between groups of substations and the central office are large while the number of substations and the amount of local interconnecting traffic among the substations is not adequate to justify their connection to a separate community dial office.

A line concentrating system is a means for reducing the outside plant serving a central office, and at the same time dispersing the central office switching equipment. The first switching equipment, to which dial lines are connected, is effectively moved to a location remote from the central office. The remotely located equipment is a slave unit which is controlled by the central office to concentrate the traffic from the subscriber lines to the central office.

As the central office is not directly in information communication with the subscriber lines due to the interposition of the remote line concentrator, it is generally necessary in such systems to provide a number of control leads to effect test and control functions. In order to obtain the greatest saving in the telephone plant it is desirable to have a high ratio between the subscriber lines and trunks connected to a remote line concentrator while keeping the number of control leads required to pass information signals to and from the concentrator to a minimum.

It is a general object of this invention to provide an improved communication system in which a large number of subscriber lines may be individually connected to a central office by a smaller number of common trunks whereby considerable saving is attained.

Another object of the present invention is to provide a line concentrator system which effects economies in central office equipment and in the wiring connecting central offices with subscribers' stations.

An illustrative embodiment of the present invention makes use of common control equipment found in crossbar systems such as described in the Patent 2,585,904 which was granted to A. J. Busch on February 19, 1952. Such common control telephone systems utilize two basic types of switching frames which are designated line link frames and trunk link frames. The line link frames and the trunk link frames are interconnected by a network of junctors. Subscriber lines are associated with the line link frames and all types of outgoing and incoming trunks, as well as originating registers for supplying dial tone and storing dialed numbers, are associated with the trunk link frames. Through this system of line and trunk link frames traffic flows in two directions: originating calls from a subscriber line appearance on a line link frame to a trunk appearance on a trunk link frame; and terminating calls from a trunk appearance on a trunk link frame to a line appearance on a line link frame. The line link frames are, therefore, bilateral, handling both originating and terminating calls. By remotely locating the first switching stage, a relatively small amount of equipment is remotely located because each subscriber line has only a single appearance in the switching equipment.

The remotely located first switching stage is part of the slave unit which is referred to as a line concentrator. In the illustrative embodiment of the present invention a number of line concentrators provide for connections between a large plurality of subscriber lines and a small plurality of talking trunks extending from the central office. The condition of each of the subscriber lines is cyclically detected and supplied to the central office by means of a scanning system of the type described in the copending applications of Almquist-Joel-Posin, Serial No. 555,916, and Abbott-Joel, Serial No. 555,947, both filed on even date herewith. Each concentrator includes a passive line scanner which is synchronously and cyclically driven by a central office pulse generator. The control or scanning pulses from the generator are supplied in parallel through concentrator control, or detector circuits and over sets of three control pairs to the line concentrators. Each set of control pairs and each concentrator detector circuit is individually associated with one of the concentrators. The control pairs connect the line concentrators with the central office and are utilized in determining the line conditions, in setting up a call and in supplying power to the concentrators. A feature of the present invention pertains to means for providing all the power required at the concentrators over the sets of control pairs on a phantom basis from the central office.

The subscriber lines at each concentrator are connectable to the trunks on a random slip basis. The random slip trunking system is of the type described in the copending application Serial No. 555,929 of Brooks-Joel-Krom, filed on even date herewith. In such a system, each line is connectable to only some of the trunks that connect the associated concentrator with the central office and the trunk multiples are different for different lines on a random basis.

Each line is connected to a trunk multiple by means of a number of crosspoints; one for each trunk in the multiple. A feature of the present invention relates to means for providing over the control pairs to the central office an indication of the operation of a crosspoint. The pulses that are supplied from the central office to operate a crosspoint are converted, upon its operation, to pulses indicating crosspoint closure and the latter pulses are returned to the central office.

In order for a crosspoint to be operated, it is marked on both its line and trunk terminals. A marker, which controls the establishment of the talking connections, initiates the two sequences of operations for marking the line and trunk terminals of a crosspoint, an outpulsing operation which selects and marks the line terminal, and a concurrent trunk selecting operation which selects and marks the trunk terminal. It is another feature of this invention that the crosspoints are marked in this manner for both terminating and originating calls. Once the marker has seized the line link frame, the calls are handled in a similar manner for both types of calls.

The line scanner that is utilized to cyclically determine the service condition of the subscriber lines is also utilized as an accumulator during the outpulsing sequence of operation. The line scanner controls the selection of the line side of the crosspoint. A further feature of this invention relates to this dual function of the line scanner.

A further feature of the present invention pertains to means for delaying the completion of the outpulsing operation for a terminating call to check if the subscriber line is busy. The same pulses that are utilized to select the line terminal are also used to make the line busy check.

After the dialing connection has been established for an originating call, and dialing has been completed, the marker initiates a call-back call for establishing a talking connection from the calling line through a concentrator trunk and the line link and trunk link frames to an outgoing trunk. On a call-back call the same concentrator trunk which was utilized for the dialing connection is selected. The same trunk is utilized because the concentrator crosspoint is locked during the establishment of the dialing connection to avoid increasing the marker holding time during the call-back call. The means, therefore, for establishing the line-to-outgoing trunk connection through the same concentrator trunk for a call-back call is another important feature of this invention.

The marker holding time for establishing the connections for an originating or terminating call should be kept to a minimum. In the crossbar system described in the above-identified patent to Busch, for example, marker holding time is valued at approximately sixty dollars per millisecond per marker. Concentrating systems, due to the necessity for passing information signals to and from the concentrator, tend to increase the marker holding time for establishing a connection and thereby tend to require additional markers in the marker group.

It is an object of the present invention to provide a common control line concentrating telephone system which does not materially increase the marker holding time. In order to avoid materially increasing marker holding time, the outpulsing speed is at a greater rate than the normal scanning speed. A feature of the present invention relates to means for quickly selecting and marking the concentrator crosspoint.

A further feature of the present invention pertains to means for establishing a call-back connection without interrupting the normal scanning cycle. During the establishing of a dialing connection, scanning is resumed when the concentrator crosspoint is closed. As the concentrator trunk remains locked to the calling line for a call-back call, an outpulsing operation for selecting the terminal of the crosspoint is unnecessary and the scanning cycle need not be interrupted. Further increase of marker holding time, is, therefore, avoided.

The concentrator trunks are connected at the central office to an auxiliary switch. The auxiliary switch is, therefore, located between the first switching stage at the concentrator and the secondary of the line link frame to become effectively the primary of the line link frame. Utilizing an auxiliary switch permits locking the dialing connection trunk to the calling line. When an idle path through the trunk link frame and secondary of the line link frame is selected by the marker for the call-back call, the auxiliary switch functions to extend it to the locked dialing connection trunk. The auxiliary switch also permits the random slip trunk multipling. Without the auxiliary switch, any of the trunks could be selected by the marker for any line. Still another feature of this invention relates, therefore, to auxiliary switching means for establishing connections to the concentrator trunks.

Still another feature of this invention relates to means for delaying the disconnect signal to the concentrator crosspoints when a call is being served. The identity of the trunk to be disconnected is retained until the delaying call is served.

Still another feature relates to means at the central office for denying service for any of the subscriber lines, without disturbing the normal scanning of the other subscriber lines.

Further objects and features will become apparent upon consideration of the following description taken in conjunction with the drawings wherein:

Fig. 1 is a functional diagram, or general circuit representation, of the line concentrating system of the present invention;

Figs. 2 through 26, when arranged in accordance with Fig. 27, are a detailed circuit representation of the line concentrating system of the present invention wherein Figs. 2 through 6 illustrate a remote line concentrator;

Figs. 19, 20, 23 and 24 illustrate the line selection and test circuit at the central office.

Fig. 27 illustrates the arrangement of Figs. 2 through 26;

Fig. 28 is a series of pulse time curves illustrating the scanning sequence of the line concentrating system of the present invention;

Fig. 29 is a table illustrating the connections from resistors 16E–H and the windings of relays 16TS0–5 to contacts of relays 14VG0–11;

Fig. 30 is a table illustrating the slip multiple and trunk preference; and

Fig. 31 is a table illustrating the connections from contacts of relays 14VG0–11.

GENERAL DESCRIPTION

Figure 1:
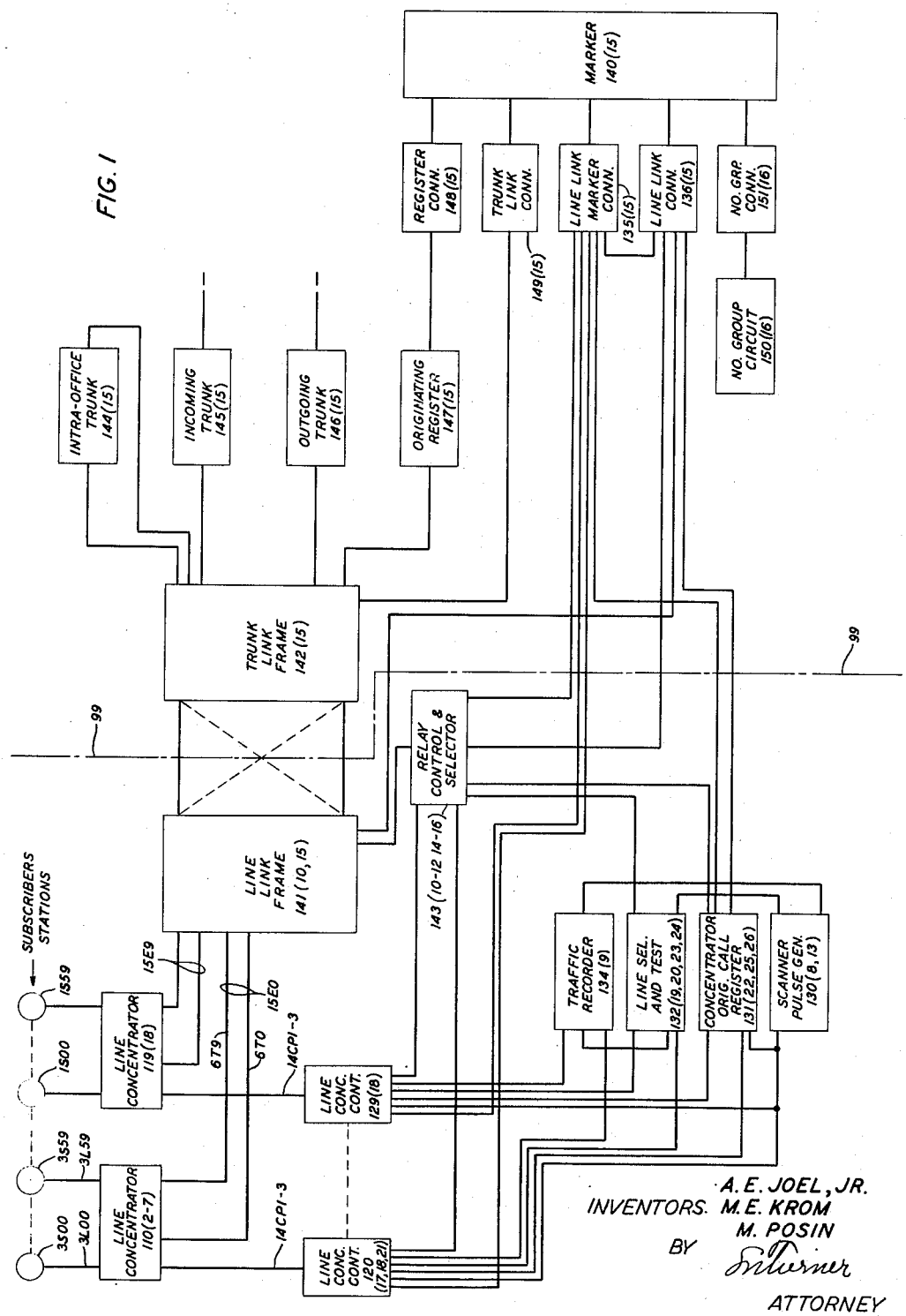
Figure 2:
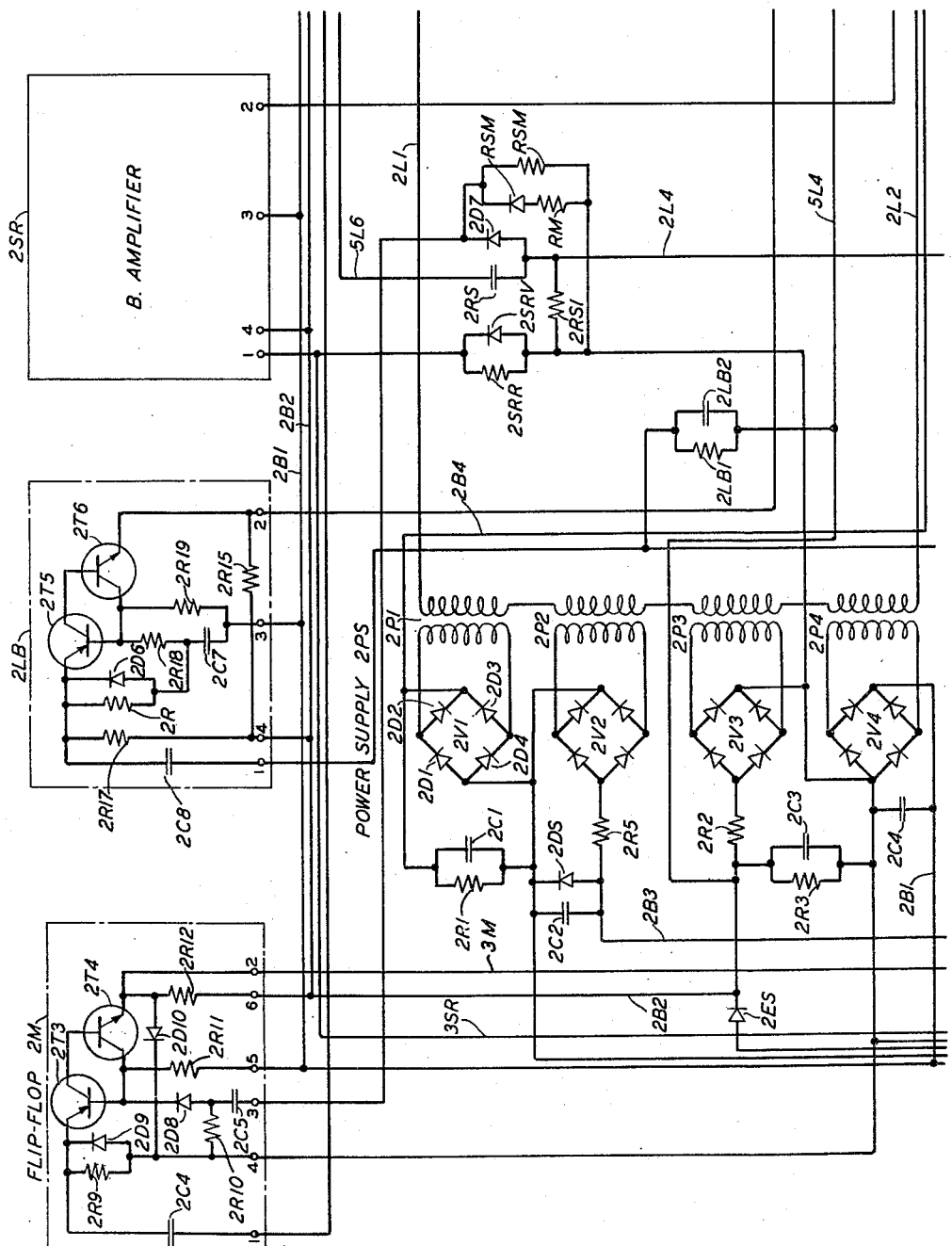
Figure 3:
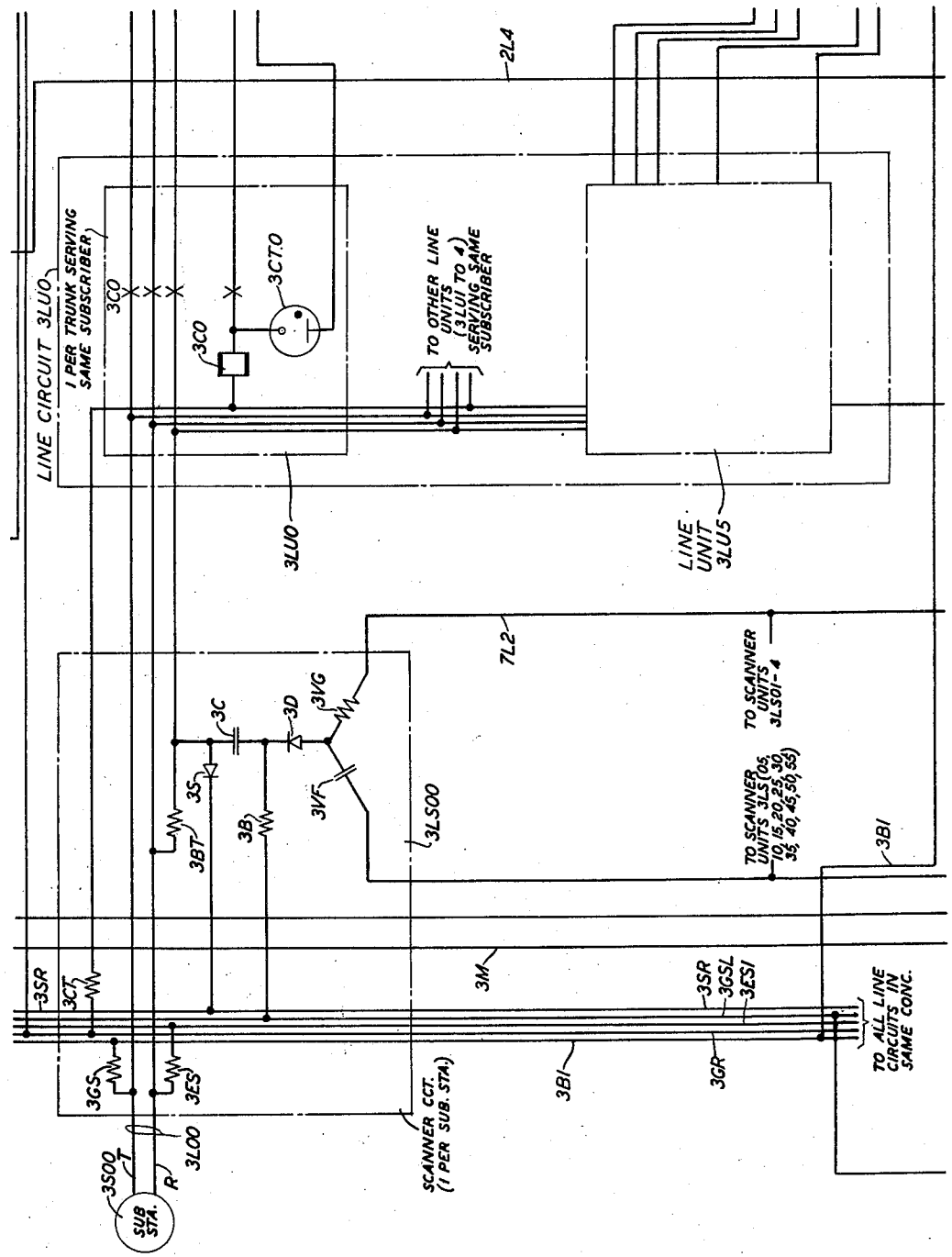
Figure 4:
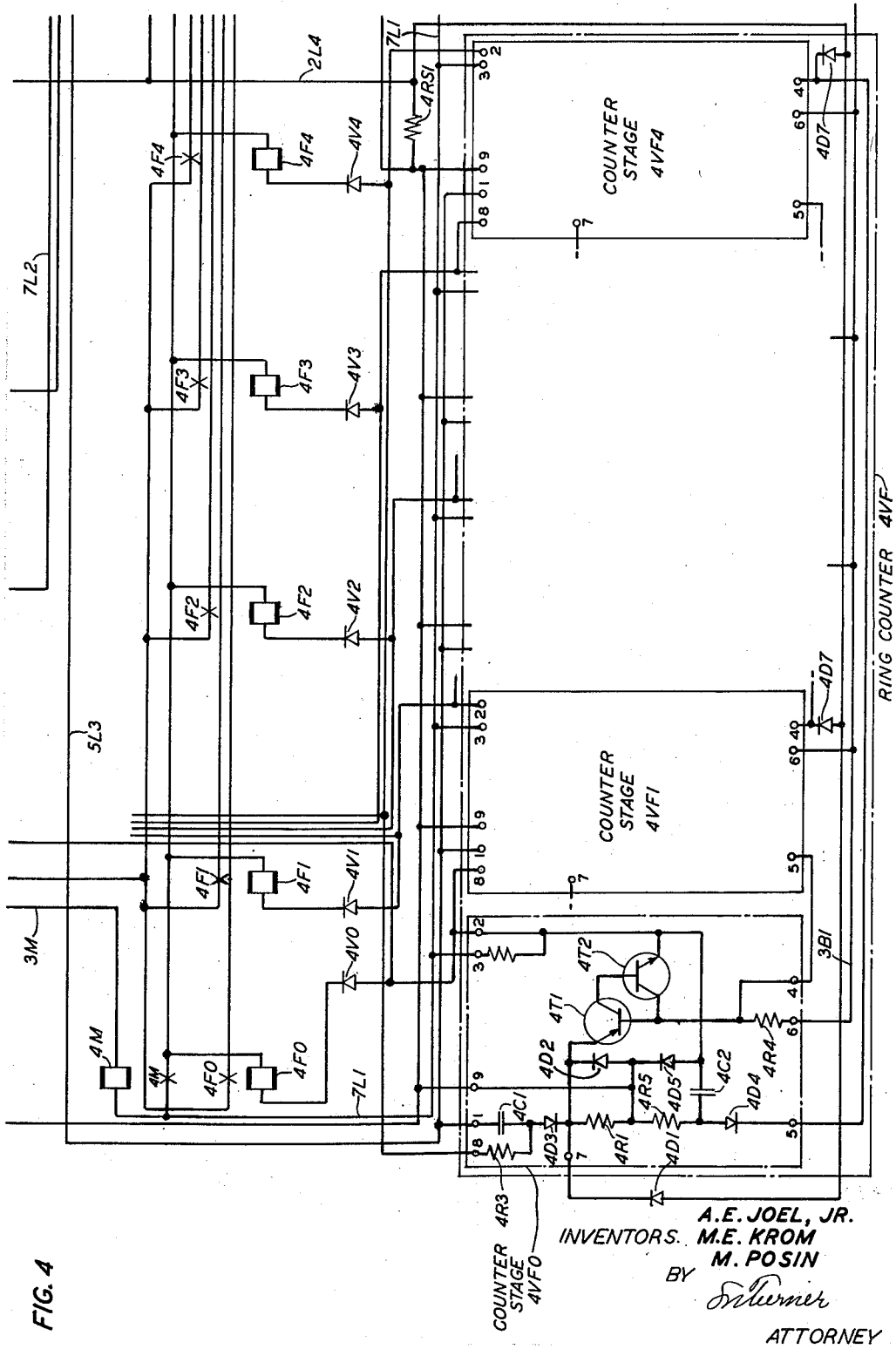
Figure 5:
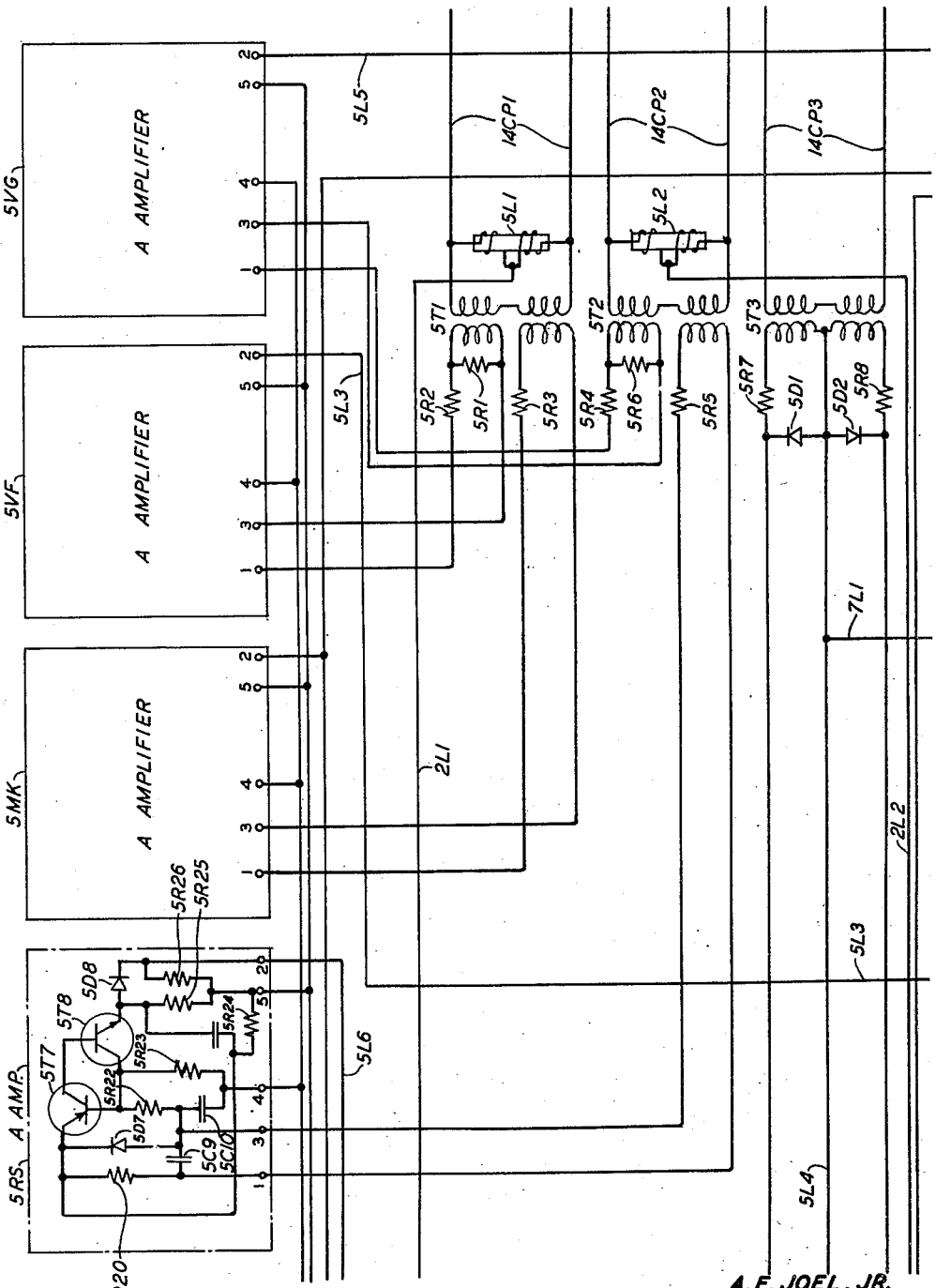
Figure 6:
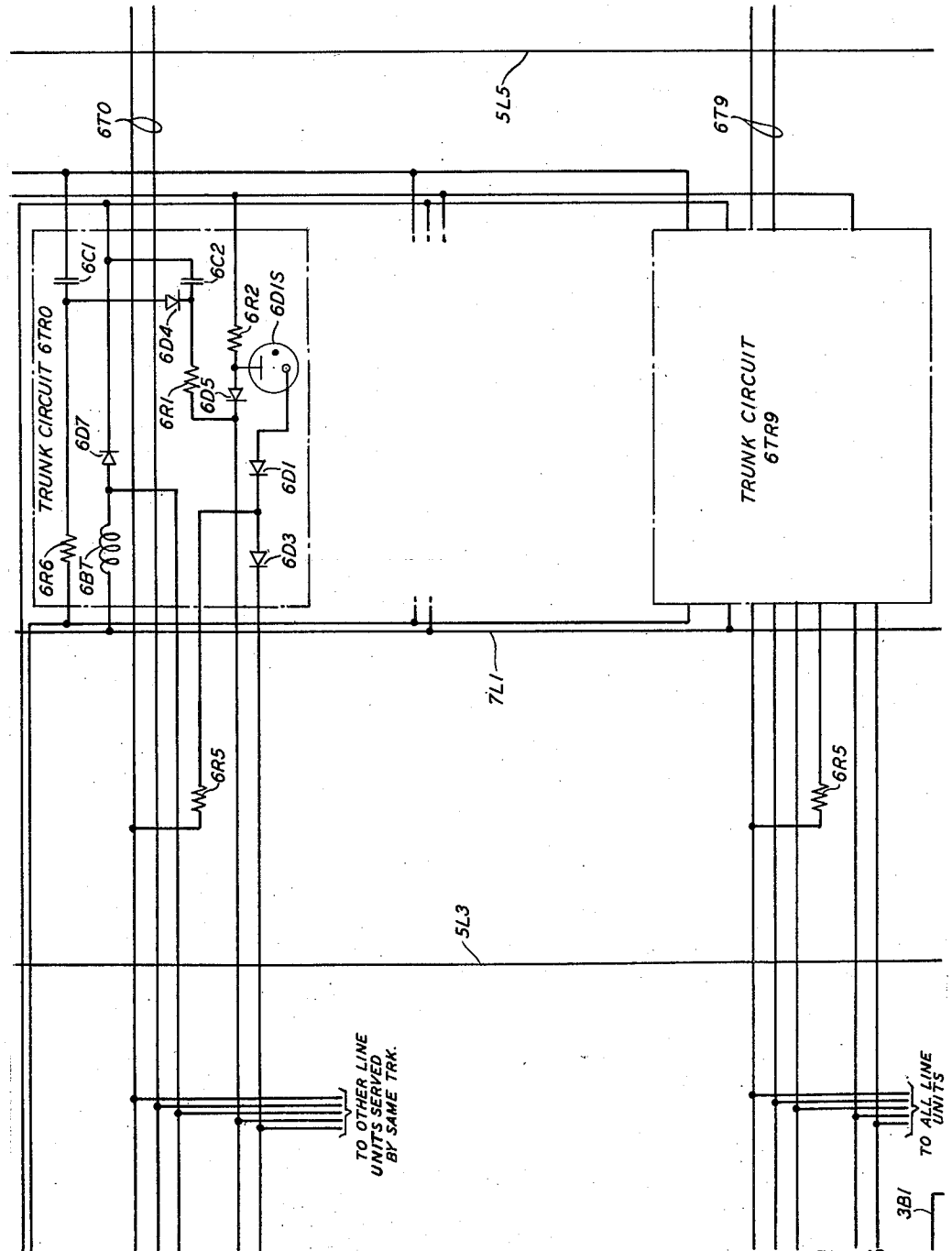
Figure 7:
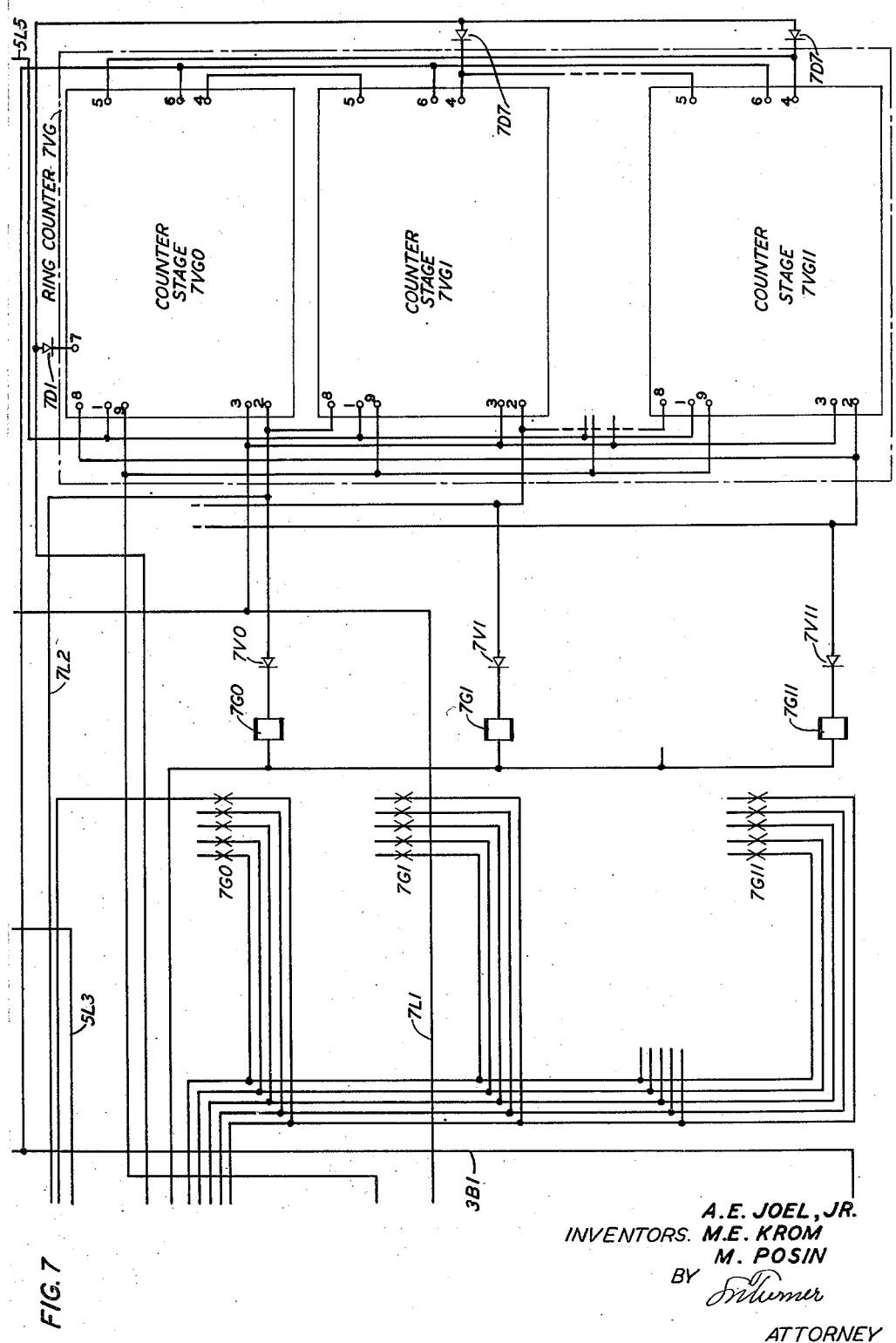

Referring to Fig. 1, the equipment which is shown to the right of the dash-dot heavy line 99 is common control equipment of the type described in the above mentioned Busch patent.

Figure 15:
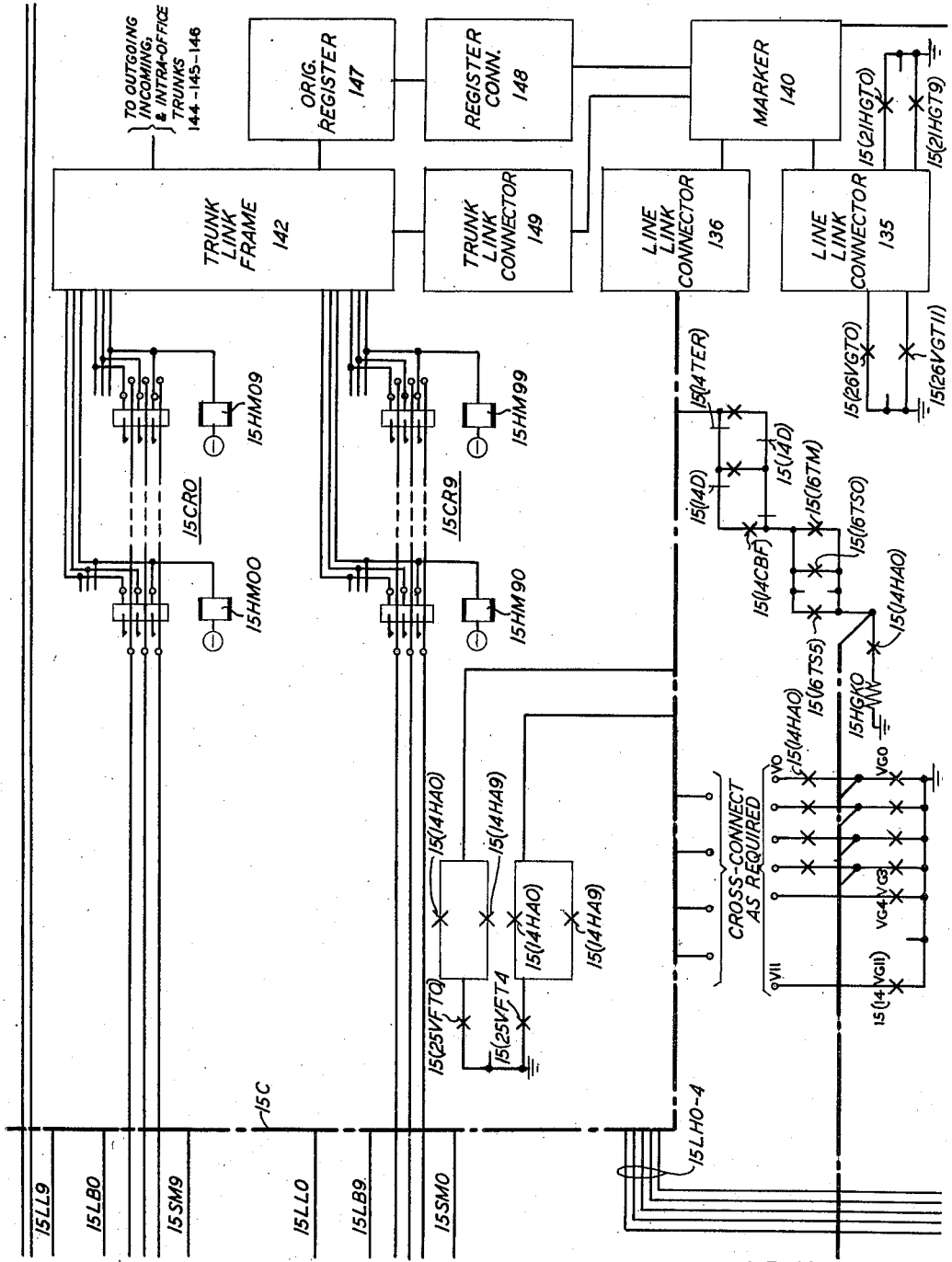
Figure 16:
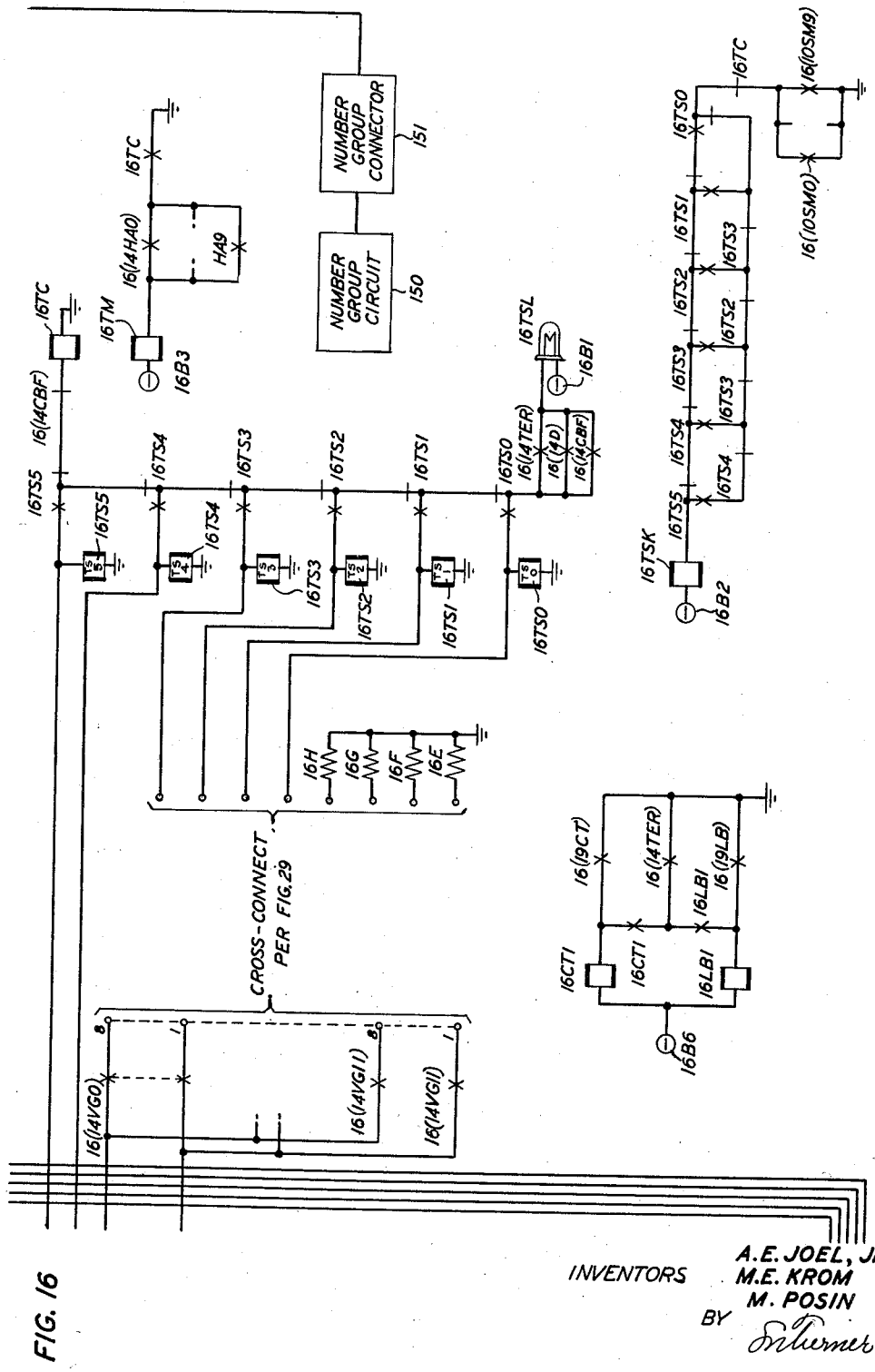

Each box, or functional circuit, includes in parenthesis, the figure number or numbers of the detail circuit drawings in which the box appears. For example, the trunk link frame 142 is shown in Fig. 15 of the detail circuit drawings. The trunk link frame 142 provides connections from the intraoffice trunk 144, incoming trunk 145, outgoing trunk 146, and the originating register 147 to the line link frame 141. Six hundred subscriber lines 3S00–59, 1S00–59, etc. are associated with the line link frame 141 by means of ten line concentrators 110–9. The stations 3S00–59, 1S00–59, etc. and the line concentrators 110–9 are remotely located. All the rest of the equipment shown in Fig. 1 is located at the central office.

In common control systems of the type described in the above-identified Busch patent, the line link frame is the first switching frame to which the subscriber lines are connected. In the illustrative embodiment of the present invention, the remotely located line concentrators 110–9 are the first switching stage to which the stations 3S00–59, 1S00–59, etc. are connected.

Through the line concentrators 110–9, the line link frame 141 and the trunk line frame 142 traffic flows in two directions: originating calls from one of the substations 3S00–59, 1S00–59, etc., and terminating calls from one of the trunks 144 or 145. The line concentrators 110–9 are therefore bilateral, handling both originating and terminating calls. Each of the line concentrators 110–9 concentrates the traffic to and from 60 subscriber stations through one of the ten sets of trunks 1SE0–9 to the central office line link frame 141. The concentrator 110, for example, provides for connections from the substations 3S00–59 through lines 3L00–59 to the ten trunks 6T0–9 of the set 1SE0. The effect of utilizing the line concentrators 110–9 is to place a part of the central office switching equipment at a remote location.

Under control of a scanner pulse generator 130, located in the central office, each of the line concentrators 110–9 cyclically scans the 60 lines connected thereto. The scanning operation determines the service condition of the lines and supplies it to the central office. The scanner pulse generator 130 simultaneously provides scanning pulses through the ten line concentrator control circuits 120–9, and the ten sets of control pairs 14CP1–3 to the ten concentrators 110–9, respectively. Each of the line concentrators 110–9 is connected to the central office by means of one of the ten sets 1SE0–9 and one of the sets of three control pairs 14CP1–3. The line concentrator control circuits 120–9 are individually associated with the concentrators 110–9, and all of the rest of the central office equipment including the generator 130, is common control equipment.

The generator 130 also supplies the scanning pulses to the concentrator originating call register 131. The ten line concentrators 110–9 and the register 131 are, in this manner, synchronously and cyclically operated under control of the scanning pulses from the generator 130.

The scanner pulse generator 130 supplies four types of pulses: vertical group pulses, vertical file pulses, reset pulses and timing pulses. These pulses are illustrated in the scanning pulse sequence diagram shown in Fig. 28. As in the ordinary crossbar telephone systems, the subscriber lines are arbitrarily arranged in groups designated vertical groups, vertical files and horizontal groups. All the subscriber lines connected to one of the ten concentrators 110–9 are in the same horizontal group and they are subdivided into twelve vertical groups, each of which includes five vertical files. The vertical group pulses supplied by the scanner pulse generator 130 select a group of five lines connected to each of the line concentrators 110–9. The vertical group pulse is supplied simultaneously to the ten line concentrators 110–9 so that five-times-ten, or 50, subscriber lines are selected. Between two such vertical group pulses the scanner pulse generator 130 supplies five vertical file pulses to the concentrators 110–9 to select one subscriber line connected to each of the concentrators, or ten in all. In order to scan the 600 lines, the scanner pulse generator 130 provides to each of the ten line concentrators 110–9 and to the register 131, twelve 15-volt vertical group pulses spaced at intervals of 10 milliseconds and five 15-volt vertical file pulses spaced at intervals of 2 miliseconds between each pair of vertical group pulses. The vertical file and vertical group pulses are ½ millisecond pulses and the complete scanning cycle has a duration of 120 milliseconds.

In addition to the vertical group and the vertical file pulses, the generator 130 supplies one reset pulse at the beginning of the cycle to ensure the synchronous operation of the line concentrator scanning cycles and the originating call register cycle with that of the generator 130. The reset pulse is also supplied to a traffic recorder 134 which periodically records the service condition of the lines and trunks. The operation of the traffic recorder 134 is hereinafter described in a separate section of the detailed description. The pulse sequence diagram, mentioned above and depicted in Fig. 28, illustrates the vertical file, vertical group and reset pulses. The reset pulse also functions as the first vertical file pulse so that only 59 vertical file pulses are provided instead of 60 during one scanning cycle.

To recapitulate, during one scanning cycle, the pulse generator 130 supplies one reset pulse, twelve vertical group pulses and 59 vertical file pulses. One vertical file pulse is provided for each of the 60 subscriber lines 3L00–59, if the reset pulse is counted as a vertical file pulse. The scanner pulse generator 130 also provides 60 timing pulses which are utilized, as is hereinafter described, when a call to or from one of the 600 subscriber lines is being serviced. The timing pulses are supplied to the line concentrator control circuits 120–9 and to an outpulsing or line section and test circuit 132.

The vertical group pulses ready the concentrators 110–9 for scanning the five-times-ten, or 50 lines in the vertical group and each vertical file pulse scans one line, connected to each of the concentrators 110–9, in the readied group. The scanning is in parallel, so that effectively a separate vertical group pulse is simultaneously supplied to each of the ten line concentrators 110–9.

The generator 130 is not stopped during the operating sequence of the line concentrating system of the present invention, but continuously and cyclically generates the 59 vertical file pulses, the twelve vertical group pulses, the reset pulse and the 60 timing pulses.

When a call is initiated at one of the 600 subscriber lines 3S00–59, 1S00–59, etc. a service request pulse is provided to the central office. If the call originates at line 3L14, for example, the vertical file pulse 14 is transformed at the concentrator 110 to a service request pulse and supplied back over the control pair 14CP3 to the central office. The service request pulse is received by the control or detector circuit 120, which thereupon functions generally to stop the transmission of the vertical group and reset pulses to all ten concentrators 110–9, and to stop the register 131. The register 131, which was cyclically keeping count of the vertical file and vertical group pulses, is locked at the identity of the calling line 3L14.

The vertical file pulses to the concentrator 110 are uninterrupted by the circuit 120 when the service request pulse is received. The five lines in the vertical group 2, which includes the calling line 3L14, are therefore cyclically scanned. Every 10 milliseconds when the service requesting line 3L14 is scanned, another service request pulse is returned over the control pair 14CP3 to the central office. The successive detection of the service request pulses at circuit 120 verifies the continuance of the service request. If a successive service request pulse is not detected, it indicates that the service request has been abandoned.

When the service request pulse is received, the line concentrator control circuit 120 also functions to supply the reset pulses, if any occur, to the line concentrator 110 as vertical file pulses. The reset pulse is supplied as a vertical file pulse because the first vertical file pulse is blanked when the reset pulse is supplied from the scanner pulse generator 130. With the reset pulse being supplied to the concentrator 110 as a vertical file pulse, the vertical file pulses are uninterrupted so that a false abandonment indication does not occur.

When the circuit 120 is operated, it also supplies the horizontal group identity to a line link marker connector 135. As described above, the circuit 120 is individually associated with the concentrator 110 which is effectively the horizontal group 0. The connector 135 is associated with a marker 140 which controls the establishment of a talking connection through the frames 141 and 142. The marker 140 is seized by the connector 135 after the vertical group identity has been supplied thereto from the register 131.

When the register 131 is stopped on the line location, it supplies the vertical group identity to the connector 135 and it readies a path for supplying the vertical file identity through the relay control and selector circuit 143 to the line link connector 136. The circuit 143 is associated with and controls the operation of the line link frame 141. When the connector 135 receives the vertical group identity, it seizes the marker 140 and supplies to it the horizontal and vertical group information. When the marker 140 is seized, it in turn seizes the line link frame 141 by means of the line link connector 136 and circuit 143. When the marker 140 seizes the line link frame 141, the circuit 143 completes the path for supplying the vertical file information to the marker 140. The marker 140 thereupon has the horizontal group, vertical group and vertical file information which identifies, respectively, the concentrator 110 and the line 3L14.

When the marker 140 seizes the connector 136, it supplies to the circuit 143 the identity of the calling line 3L14 and an indication that a dial tone or originating call is being served. When the circuit 143 receives the calling line identity and the originating call indication, it initiates two concurrent sequences of operation: (1) it selects one of the trunks 6T0–9 for connection to line 3L14; and (2) it initiates an outpulsing operation at circuit 132 for supplying the calling line identity to the concentrator 110.

At the concentrator 110, the calling line 3L14 is connectable to only six of the ten trunks 6T0–9. Fig. 30 illustrates the trunk connections and the preference of selecting the trunks. For line 3L14, which is in vertical group 2, the trunks 6T6, 6T2, 6T1, 6T5, 6T8 and 6T9 are available with the preference being in the order as listed. A connection cannot be established from line 3L14 to any one of the trunks 6T3, 6T4, 6T7 and 6T0. The six trunks connectable to a subscriber line are referred to as being in the same trunk multiple. The circuit 143 selects the preferred idle one of the six trunks in the trunk multiple connected to the calling line 3L14. If all six trunks are idle, the preferred trunk 6T6 is selected. If trunk 6T6 is busy, the second preferred trunk 6T2 is selected. The lines in each vertical group have a different trunk multiple in a random order. Random slip trunk multipling of this type distributes the load over the trunks and permits simpler concentrators. The concentrators 110–9 are simpler because each line is connectable to only six of the ten trunks 6T0–9 providing for a 40 percent saving in connections. The random slip and trunk preference utilized in the line concentrator system of the present invention is described in detail in the above mentioned disclosure of Brooks-Joel-Krom.

The trunks 6T8 and 6T9 are always the least preferred trunks in each of the trunk multiples. Each trunk multiple includes, therefore, two sets of trunks, one of which varies in a random manner being different in each multiple, and one of which is common to each multiple. By utilizing common least preferred trunks, the probability of the existence of an idle trunk for each multiple is increased.

Concurrently with the trunk selecting sequence of operation by the circuit 143, the marker 140 selects an idle connnection partially through the line link frame 141 and through the trunk link frame 142 to the originating register 147. The register 147 is seized by the marker 140 through the connector 148 and the frame 142 is seized by the marker 140 through the connector 149. When the connection is established from the frame 141 to the register 147, an indication thereof is provided from the frame 141 to the circuit 143. With the trunk selecting sequence of operation completed and the connection to register 147 established, the circuit 143 readies a path for supplying a +100 volt connect potential through the frame 141 and the tip lead of the selected trunk 6T6 to the concentrator 110.

The connect potential is supplied to the concentrator 110 when both the trunk selecting and the outpulsing sequences of operation are completed. The outpulsing sequence of operation, as described above, is concurrent with the trunk selection sequence of operations.

The outpulsing sequence is initiated when the line and concentrator identity is supplied from the marker 140 to the circuit 143. When the circuit 143 receives the concentrator and line identity, it supplies the calling line identity to the line selection and test circuit 132 and it operates the circuit 120 to switch the pulsing paths through the control pairs 14CP1–3 to come from the line selection and test circuit 132 instead of from the scanner pulse generator 130. Until circuit 120 is operated by circuit 143, the vertical file pulsing to the concentrator 110 was continuous. As described above, when the service request pulse is received at the control circuit 120, the vertical group and reset pulsing is stopped, but the vertical file pulsing is uninterrupted. When the outpulsing sequence of operations is commenced and circuit 120 is operated to switch pulsing paths, the vertical file pulsing is stopped as well.

When circuit 120 is operated, it also readies a path from the line selection circuit 132 for supplying mark pulses over the control pairs 14CP1–3 to the concentrator 110, and it readies a line busy path from the control pairs 14CP1–3 to the circuit 132.

As described above, when circuit 120 receives the service request pulse, it provides an indication thereof to the recorder 134. When the circuit 120 operates to switch pulsing paths to circuit 132 it also provides an indication of the switching operation to the recorder 134. The recorder 134 can therefore measure the elapsed time between receiving a service request pulse and switching the pulsing path to commence the outpulsing sequence of operation.

Finally, when circuit 120 is operated, it initiates the operation of the outpulsing or line selection circuit 132 which has already received the calling line identity from circuit 143. When the circuit 132 is operated by circuit 120, it supplies a reset pulse through circuit 120 and the control pair 14CP2 to reset the concentrator 110. After circuit 132 commences operation, it is controlled solely by the timing pulses from the generator 130, and the registered calling line identity. The operation of the line selector and test circuit 132, in effect, steers the timing pulses from the generator 130 to the concentrator 110 first as a reset pulse, then as simultaneous vertical group and vertical file pulses, and finally as a series of mark pulses to complete the establishment of the connection from the calling line 3L14 to the selected trunk 6T6.

After the reset pulse is provided to the concentrator 110, the circuit 132 simultaneously supplies the vertical file and vertical group pulses, spaced at an interval of 2 milliseconds, to the concentrator 110. The vertical file pulses are provided through the circuit 120 and the control pair 14CP1 and the vertical group pulses are provided through the circuit 120 and the control pair 14CP2. In this manner, the vertical group outpulsing is at a faster rate than the normal scanning rate of supplying vertical group pulses. The normal scanning rate is one vertical group pulse each 10 milliseconds; whereas, the outpulsing rate is one vertical group pulse each 2 milliseconds. Moreover the vertical group and vertical file pulses are simultaneously provided, so that the outpulsing operation is rapid.

The circuit 132 supplies a number of vertical group pulses equal to the vertical group 2 of the calling line 3L14, but a number of vertical file pulses which is one less than the vertical file 4 of the calling line 3L14. The last vertical file pulse is delayed. When three vertical file pulses and two vertical group pulses are provided to the concentrator 110, the circuit 132 is readied for the reception of a line busy pulse from line 3L14. The delayed last vertical file pulse functions as a line busy pulse for line 3L14. For an originating call, this feature is unnecessary, but such a check is significant during the outpulsing sequence of operation for a terminating call. For an originating call, a line busy indication is never received because the line 3L14 cannot be in a busy condition connected to one of the trunks 6T0–9 when it initiates a service request. The initiation of a service request indication is incompatible with initiating a line busy condition at this time. Once outpulsing is commenced, howver, the same sequence of operation is utilized for both originating as well as terminating calls so that the line busy test is made even though it has no significance for the originating call.

The last vertical file pulse is not supplied from the circuit 132 to make the busy test if the trunk selection sequence of operations is not completed. When the trunk 6T6 is selected by circuit 143, an indication of the completion of the selection is provided to circuit 132.

The last vertical file pulse, which functions as the line busy test pulse, also sets the concentrator 110 at the calling line identity. During the outpulsing sequence of operations for a terminating call, if a line busy pulse is received from the concentrator 110, the circuit 132 is released and a busy indication is provided to the marker 140. In the absence of a line busy pulse, the circuit 132 supplies a series of mark pulses through circuit 120 and the control pair 14CP1 to the concentrator 110, and operates circuit 143 to supply the connect potential to the tip lead of trunk 6T6. The combination of the mark pulses, with the concentrator 110 set at the calling line identity, and the connect potential over the tip lead of the selected trunk 6T6 causes the concentrator 110 to establish a talking connection from line 3L14 to trunk 6T6 and to provide an indication thereof over the control pair 14CP3 to the central office. A crosspoint closure indication is provided, in this manner, from the concentrator 110 back through circuit 120 to circuit 132. More specifically when concentrator 110 operates to establish the talking connection, it routes the mark pulses back to the central office as line busy pulses to function as a crosspoint closure indication.

When the circuit 132 receives the line busy pulses or closure indication, it provides a connection establishment indication to the recorder 134 and to the circuit 143. When the circuit 143 receives this indication, it removes the connect potential from the tip lead of the trunk 6T6. The concentrator 110 locks in the talking connection from line 3L14 to trunk 6T6 which is not disturbed by the removal of the connect potential. When circuit 143 receives the closure indication, it also operates the line link frame 141 to connect the trunk 6T6 to the already established connection, described above, to the register 147. The originating call connection from line 3L14 to the originating register 147 is, in this manner, established. When the frame 141 is operated an indication thereof is supplied to the marker 140 which releases the connector 136. When the connector 136 is released, it, in turn, releases the circuit 143. The circuit 143 in turn partially releases circuits 132 and 120. When circuit 120 is partially released, it provides a reset pulse to circuit 132, to the register 131, and to the concentrator 110 and it returns the pulsing paths to the generator 130. As soon as the pulsing paths are returned, normal scanning is resumed. When circuit 132 is released, it allows circuit 120 to completely release.

As long as the originating connection is established, whenever line 3L14 is scanned, a line busy pulse is returned to the central office. Normal scanning continues during dialing and even during the establishment of a call-back connection.

When dialing is completed, the originating register 147 calls in the marker 140 through the register connector 148. The marker 140 receives the dialing information from the register 148 and utilizes it to establish a connection from the calling line 3L14 to an outgoing trunk 146. The information supplied by the register 148 to the marker 140 includes the dialed digits, the identity of the calling line 3L14, the identity of the concentrator 110 and the linkages from the frame 141 to the register 147, utilized for the dialing connection. Since the register 148 and marker 140, as described above, are of the type described in the above-identified Busch patent, the register 148 provides the same information to the marker 140 as it would in the absence of the line concentrators 110-9. The linkage information supplied, therefore, to the marker 140 does not include the identity of the trunk 6T6 that was utilized for the dialing connection.

The trunk 6T6 is locked to the calling line 3L14 during the establishment of the dialing connection to reduce the time necessary for establishing the call-back connection and also so that normal scanning need not be interrupted during call back. With the calling line 3L14 locked to the trunk 6T6, an outpulsing operation is unnecessary to select the calling line 3L14. The calling line 3L14 is selected by establishing the call-back connection to the trunk 6T6 to which it is connected. By avoiding the necessity of an outpulsing operation normal scanning, which resumed when the line 3L14 was locked to trunk 6T6, need not be interrupted. In addition to this advantage, selecting the same trunk 6T6 avoids the necessity of a disconnect operation when the dialing connection is opened. The disconnect operation would be necessary before the establishment of the call-back connection through another trunk of the slip multiple connected to line 3L14. Since the trunk 6T6 remains locked to the calling line 3L14 when the dialing connection is released, it is necessary for the marker 140 to establish a connection from the outgoing trunk 146 to the trunk 6T6. In order for such a connection to be established, the marker 140 must first determine the identity of the trunk utilized for the dialing connection.

The marker 140 does not select an idle channel through the frames 141 and 142 to trunk 146 until it receives a indication that the concentrator trunk 6T6 has been identified. In the common control system described in the above-identified Busch patent, the marker waits in a similar manner until it receives a seizure indication from the line link frame.

When the marker 140 is seized, it in turn, by means of connector 136, seizes the line link frame 141 and the relay circuit 143 which controls the operation of frame 141. The relay control circuit 143 receives the register connection linkage identity from the marker 140 and determines which one of the trunks 6T0-9 is connected thereto. When the circuit 143 determines the concentrator trunk identity, it supplies a seizure indication to the marker 140. When the marker 140 receives the seizure indication, it releases the register 138 and proceeds to select a channel from the outgoing trunk 146 through the frames 142 and 141. When the register 138 releases, it in turn releases the line-to-register connection except for the connection from line 3L14 to trunk 6T6. The relay circuit 143 controls the operation of the line link frame 141 to establish a connection from the trunk 6T6 to the newly established linkage from the outgoing trunk 146.

When the frame 141 completes the call-back connection to the line 3L14, it supplies an indication thereof to the marker 140. The marker 140 receives the indication and releases. When the marker 140 releases, it in turn releases the relay control circuit 143. The call-back connection through the frames 141 and 142 is held under control of the trunk 146.

During the establishment of the call-back connection, the line concentrators 110-9 were cyclically scanning the lines 3S00-59, 1S00-59, etc. For example, each 120 milliseconds, a line busy pulse was provided from line 3L14 which remained connected to trunk 6T6. Should a service request originate while the call back is in progress, the concentrator control, or detector, circuits 120-9 recognize the service request as usual. The line requesting service is identified by the register 131 which calls in the line link marker connector 135. The connector 135, however, locks out the originating call if a terminating or call-back call is in progress. When the marker 140 releases for the call-back call, it is seized by the connector 135 for the originating call.

When the calling and called parties disconnect, the talking connection held under control of trunk 146 is released at the frames 141 and 142. When the line link frame 141 opens the talking connection, the circuit 143 supplies a —130 volt disconnect pulse over the tip lead of trunk 6T6 to the concentrator 110. If another call is being served, the disconnect pulse is delayed until after the call is served. At the concentrator the disconnect pulse causes the release of the locked-in connection from line 3L14 to trunk 6T6.

The terminating call operation of the line concentrator telephone system of the present invention is substantially the same as for an originating call, as above outlined. When a terminating call is initiated, the marker 140 receives the calling information from a number group circuit 150 through connector 151. When the marker 140 receives the calling information, it seizes the line link connector 136, and supplies through the connector 136 to the circuit 143 the called line identity, the horizontal group or concentrator identity and an indication that the call is a terminating call. When the circuit 143 receives this information it selects an idle trunk connectable to the called line and initiates the outpulsing sequence of operation, described above, by operating the circuits 120 and 132. When circuit 120 is operated, the scanning cycle is interrupted. The line busy test made when the last vertical file pulse is supplied from circuit 132 to the called concentrator now has significance. If the called line is busy, or if all ten trunks 6T0-9 connected to the called concentrator are busy, a busy indication is returned to the marker 140.

DETAILED CIRCUIT DESCRIPTION

Figure 25:
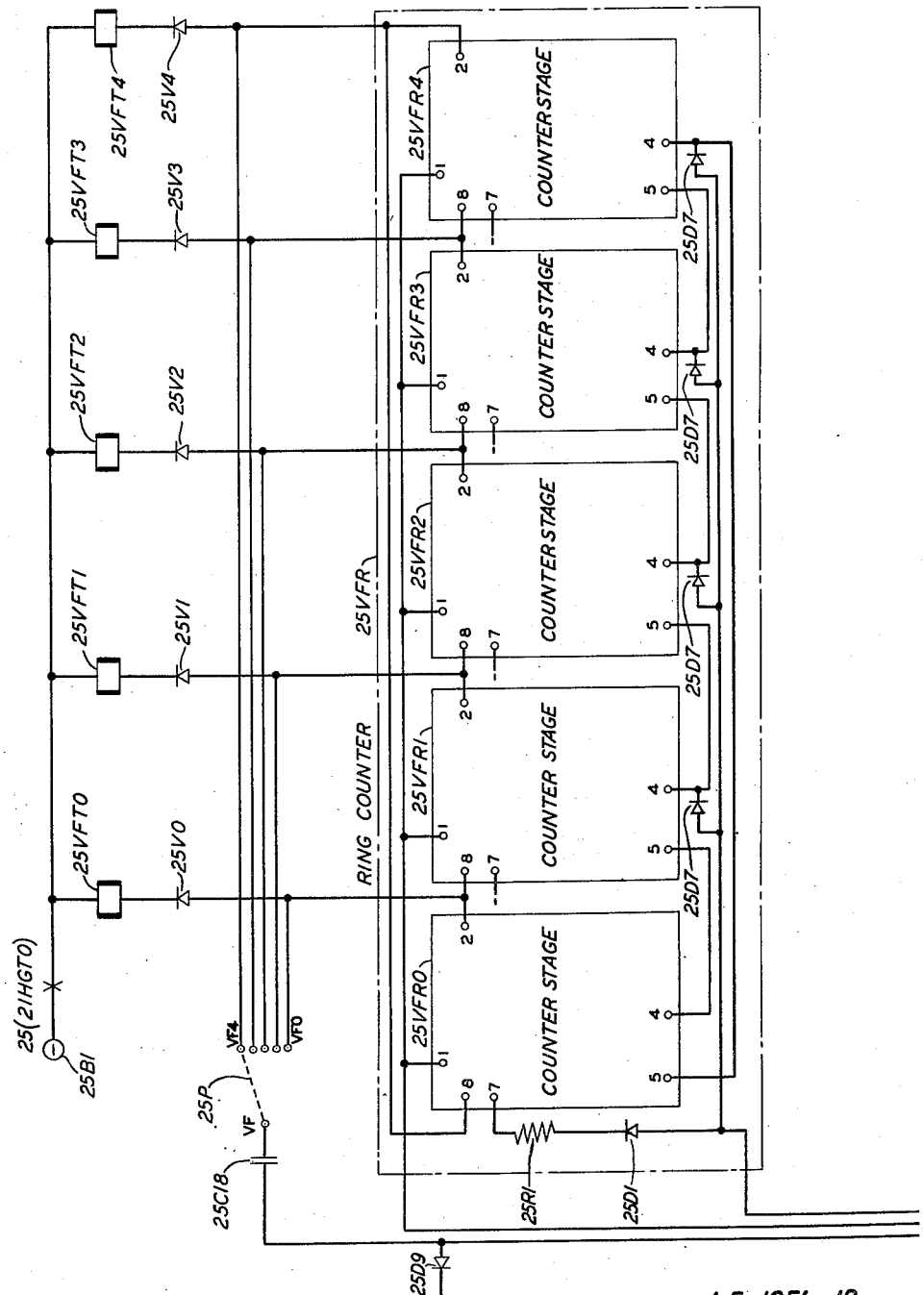
Figure 26:
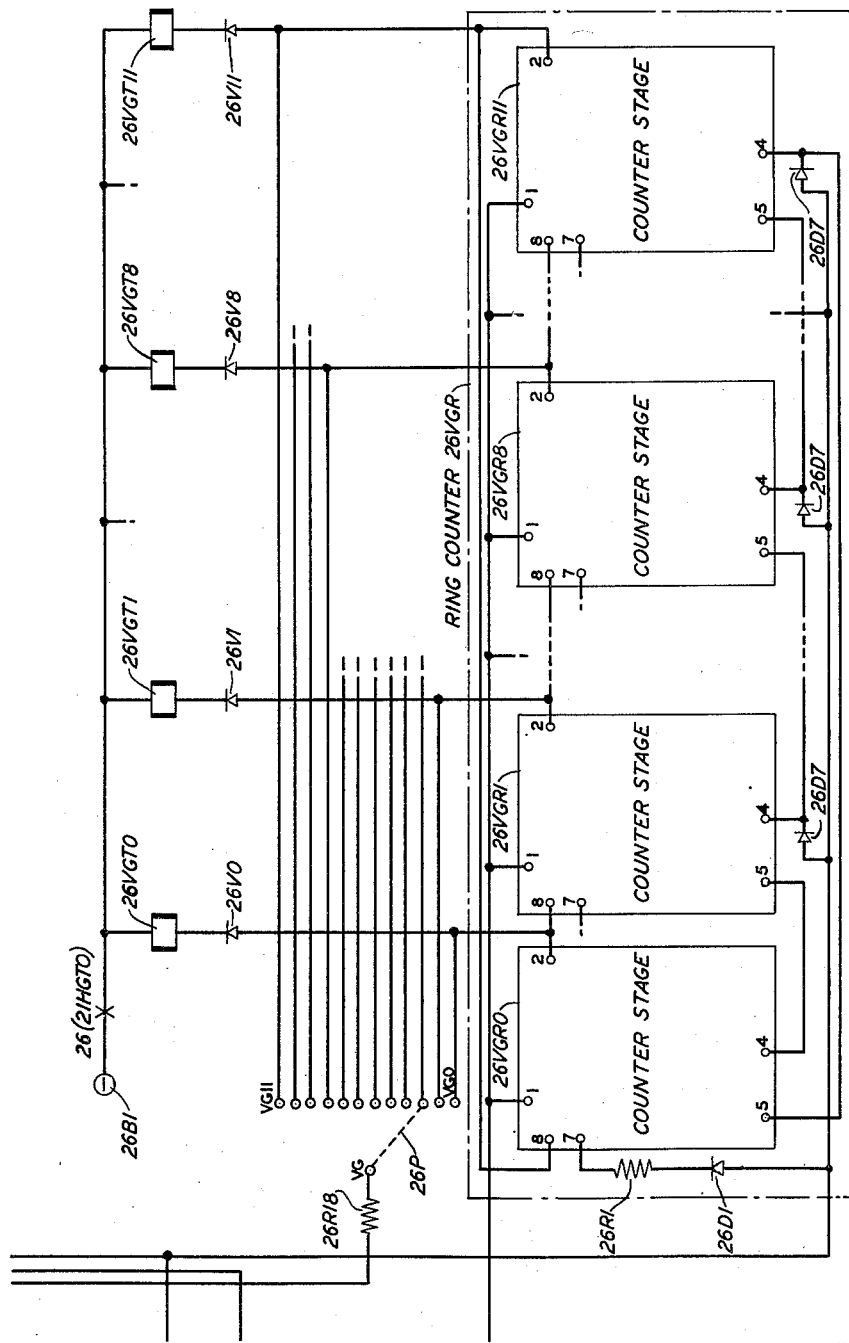

In the detailed circuit drawings shown in Figs. 2 through 26, when arranged in accordance with Fig. 27, the relay contacts are shown detached from the relay windings. The first digit of each reference number indicates the figure in the detailed circuit drawings in which the relay or component appears, and the letters indicate the function thereof. Relay 21HGT0, for example, is the horizontal group relay 0 and appears in Fig. 21. The designation of the contact of the relay generally includes in parentheses the relay reference number with the first digit before the parenthesis including the figure in which the contact appears. Contact 25(21HGT0), for example, appears in Fig. 25 and is a contact of the horizontal group relay 0 which appears in Fig. 21. When many contacts of the same relay are proximately located, only the relay designation is utilized for some of them. Contacts which are closed when the relay is deenergized are represented by a single short line perpendicular to the lines representing the connecting conductors, while contacts which are closed when the relay is operated are represented by an X crossing the connecting conductors. Contact 21 (19CT1), for example, is a contact which is closed when the relay is deenergized, and contact 25(21HGT0) is a contact which is closed when the relay is operated. The contacts are shown detached from the relay windings in order for each functional circuit path to be shown in the simplest feasible manner.

Normal scanning

The line concentrator 110 shown in Figs. 2 through 7 is located at a remote location from the central office equipment shown in Figs. 8 through 26. As described above, ten line concentrators 110-9 are connected to the central office equipment. Only the line concentrator 110 is shown in detail. The other nine concentrators 111-9 are shown as a box in Fig. 18. Each of the concentrators 110-9 provides for a connection from 60 subscriber lines to the central office. The line concentrator 110 provides a connection from the 60 subscriber substations 3S00-59, of which, only the substation 3S00 is shown. The effect of utilizing the line concentrator 110 is to place a part of the switching equipment of the central office at a distance therefrom in order to conserve outside plant facilities. The line concentrator 110 is connected to the central office by ten trunks 6T0-9 and three control pairs 14CP1-3. The trunks 6T0-9 provide talking paths between the line concentrator 110 and the central office, and the three control pairs 14CP-3 provide for signaling paths to and from the central office equipment.

With 60 subscriber lines, such as line 3L00, connected to each of the ten line concentrators 110-19, there are a total of 600 subscriber lines which are served by the central office equipment shown in Figs. 8 through 26. With all 600 subscriber lines idle, the central office continuously and synchronously scans the ten groups of 60 subscriber lines respectively connected to the ten line concentrators 110-19.

Figure 8:
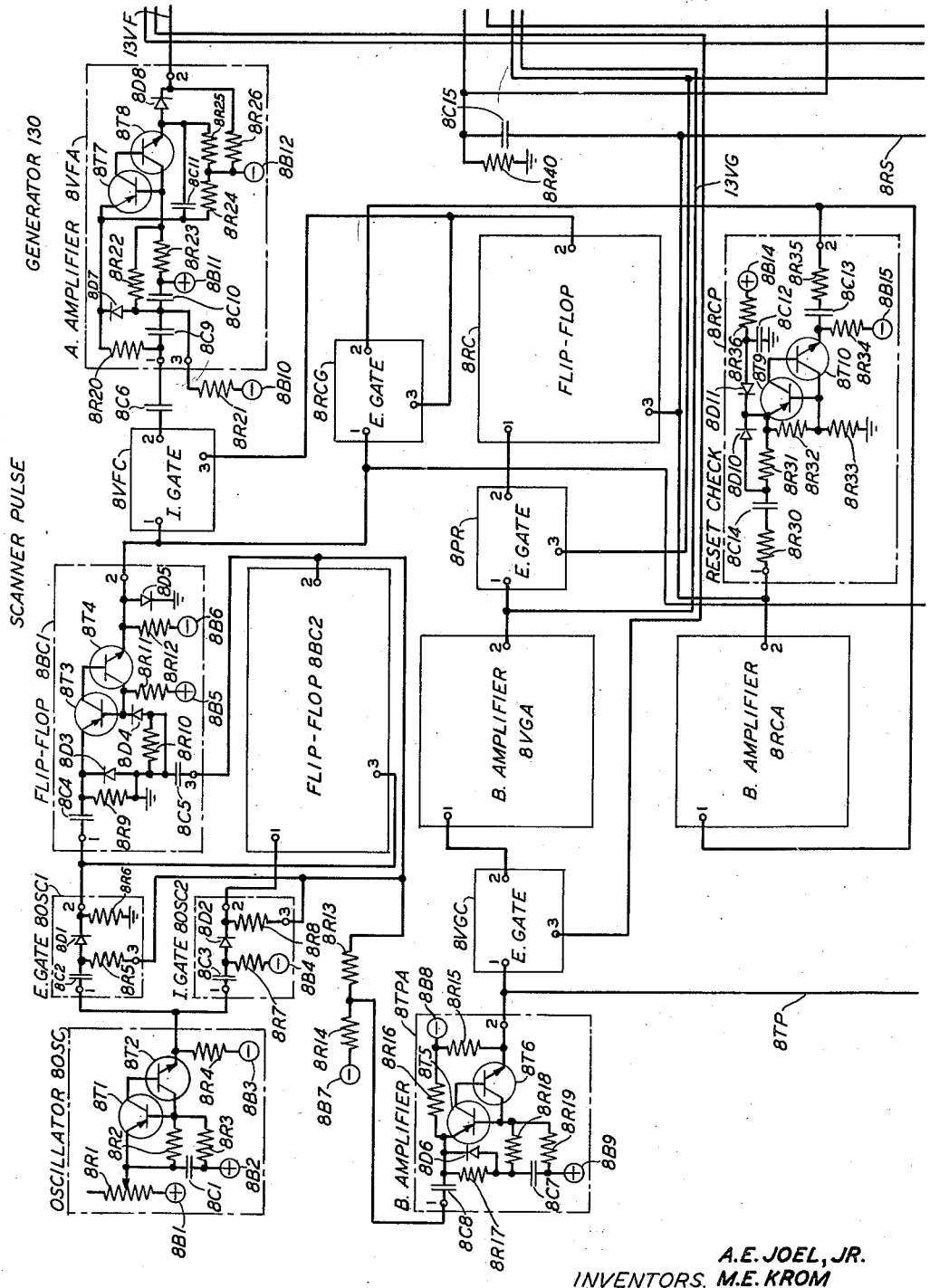
Figs. 8 and 13 illustrate the scanner pulse generator at the central office.
Figure 13:
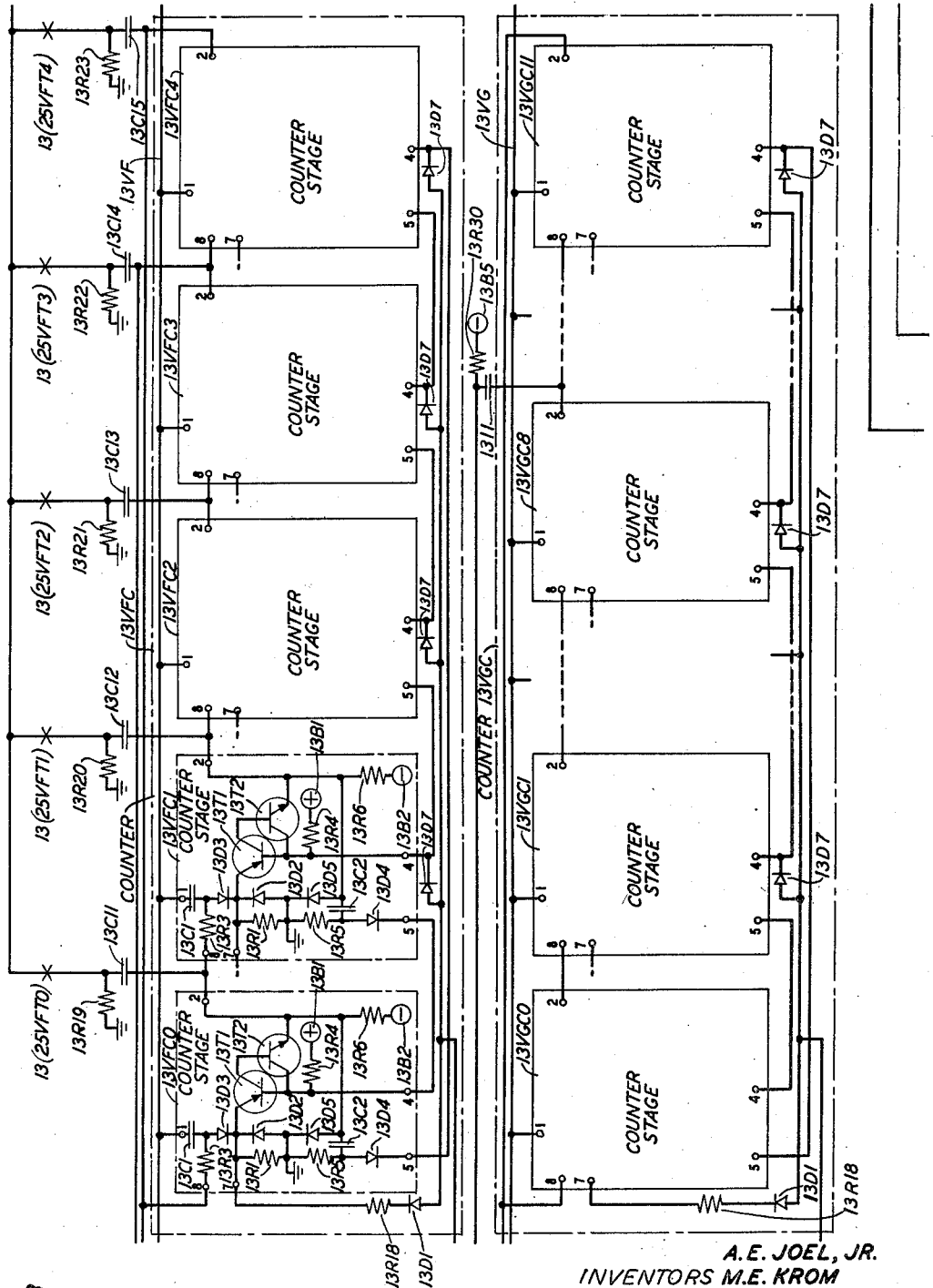
Figure 14:
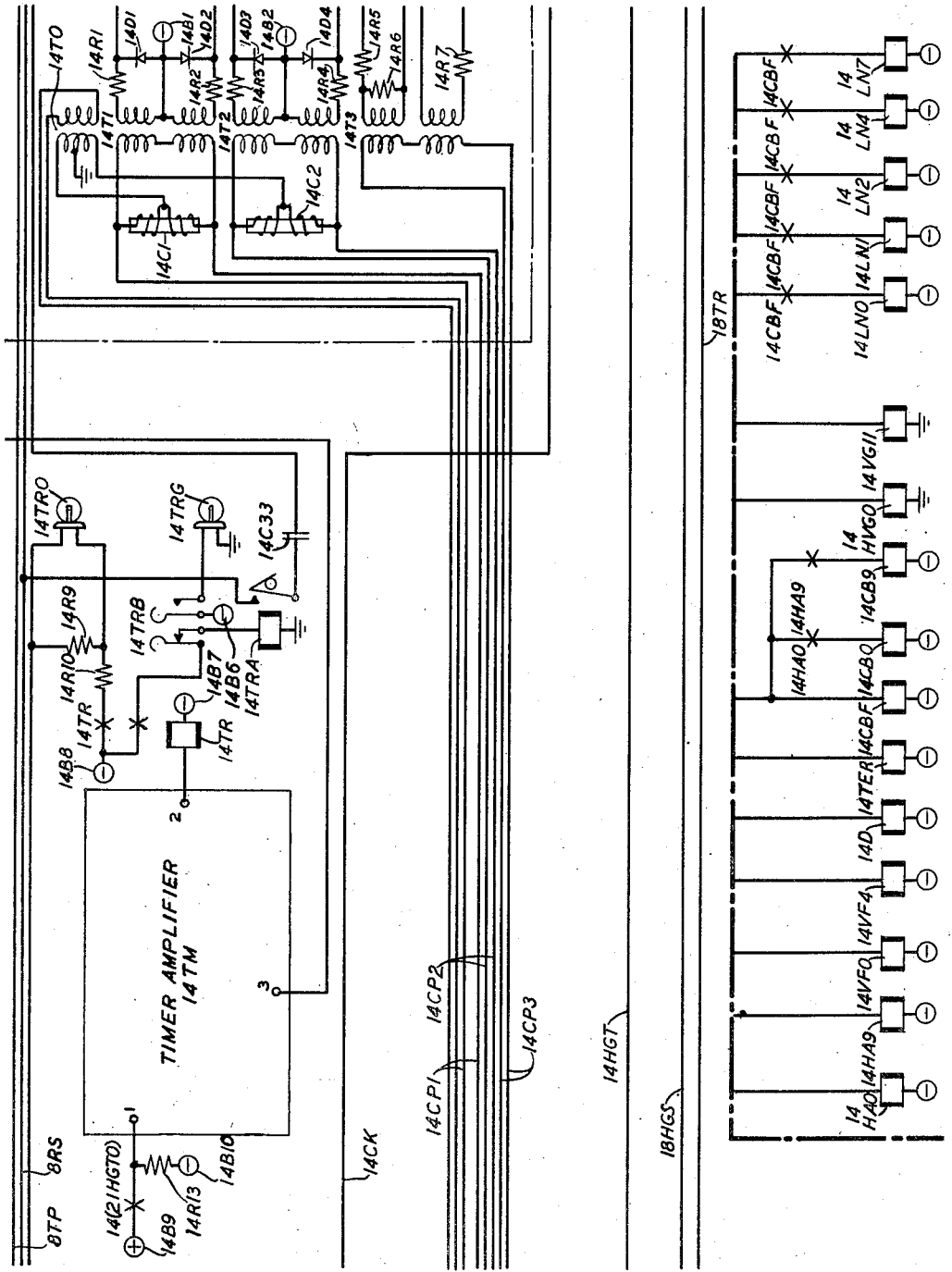
Figs. 14 and 15 illustrate the line, line link and connector circuit at the central office.
Figure 17:
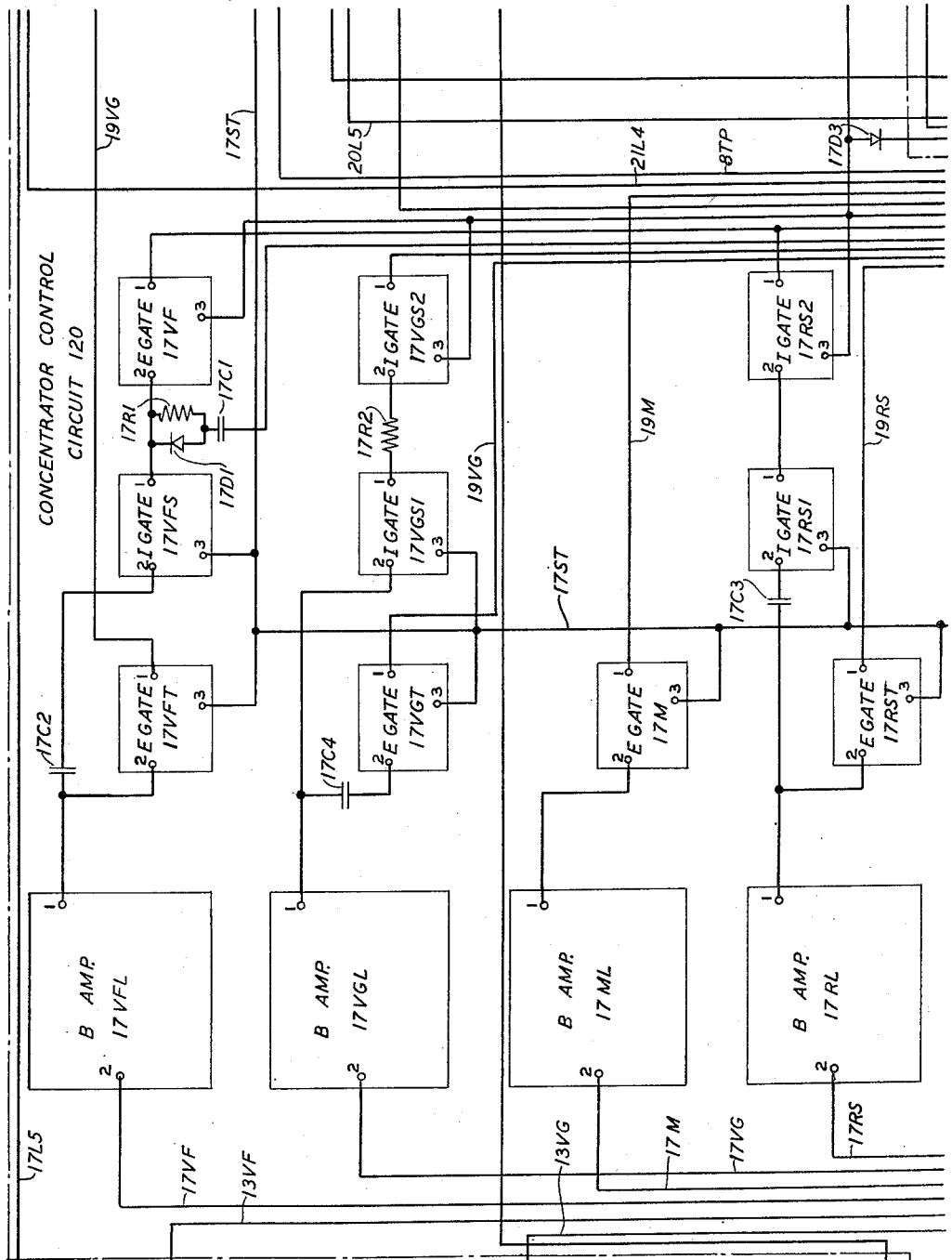
Figs. 17, 18 and 21 illustrate the line concentrator control circuit at the central office.
Figure 18:
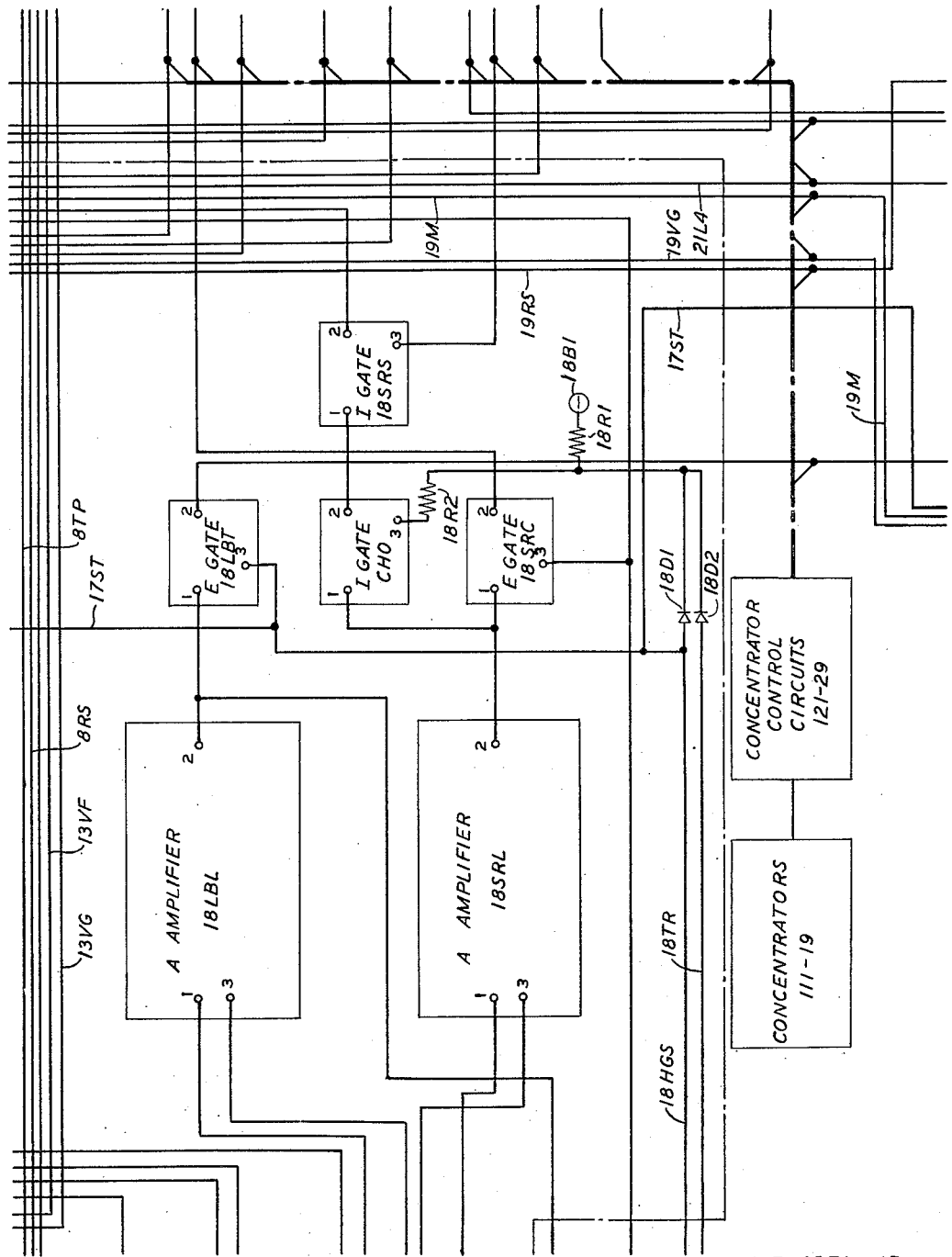
Figure 19:
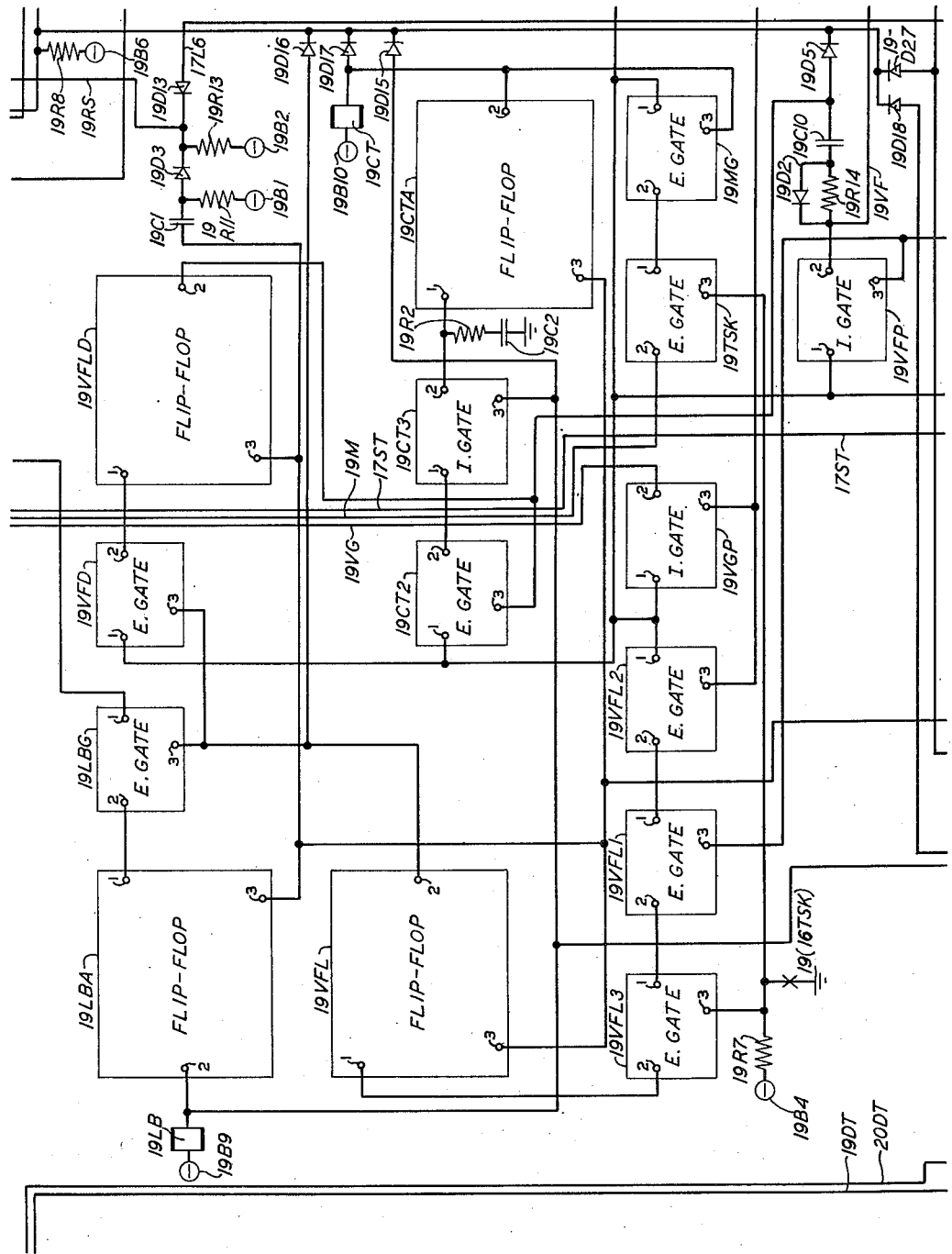
Figure 20:
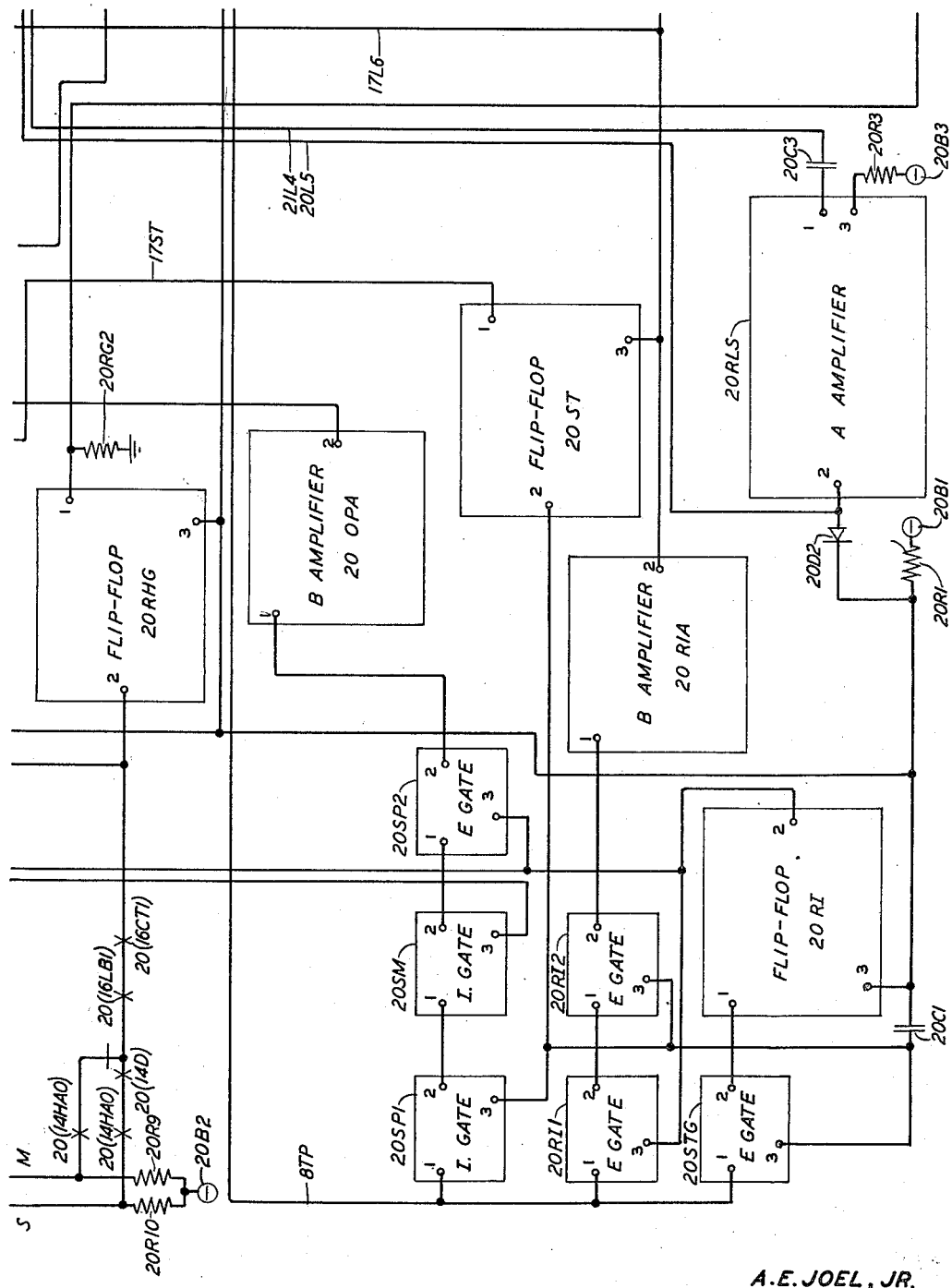
Figure 21:
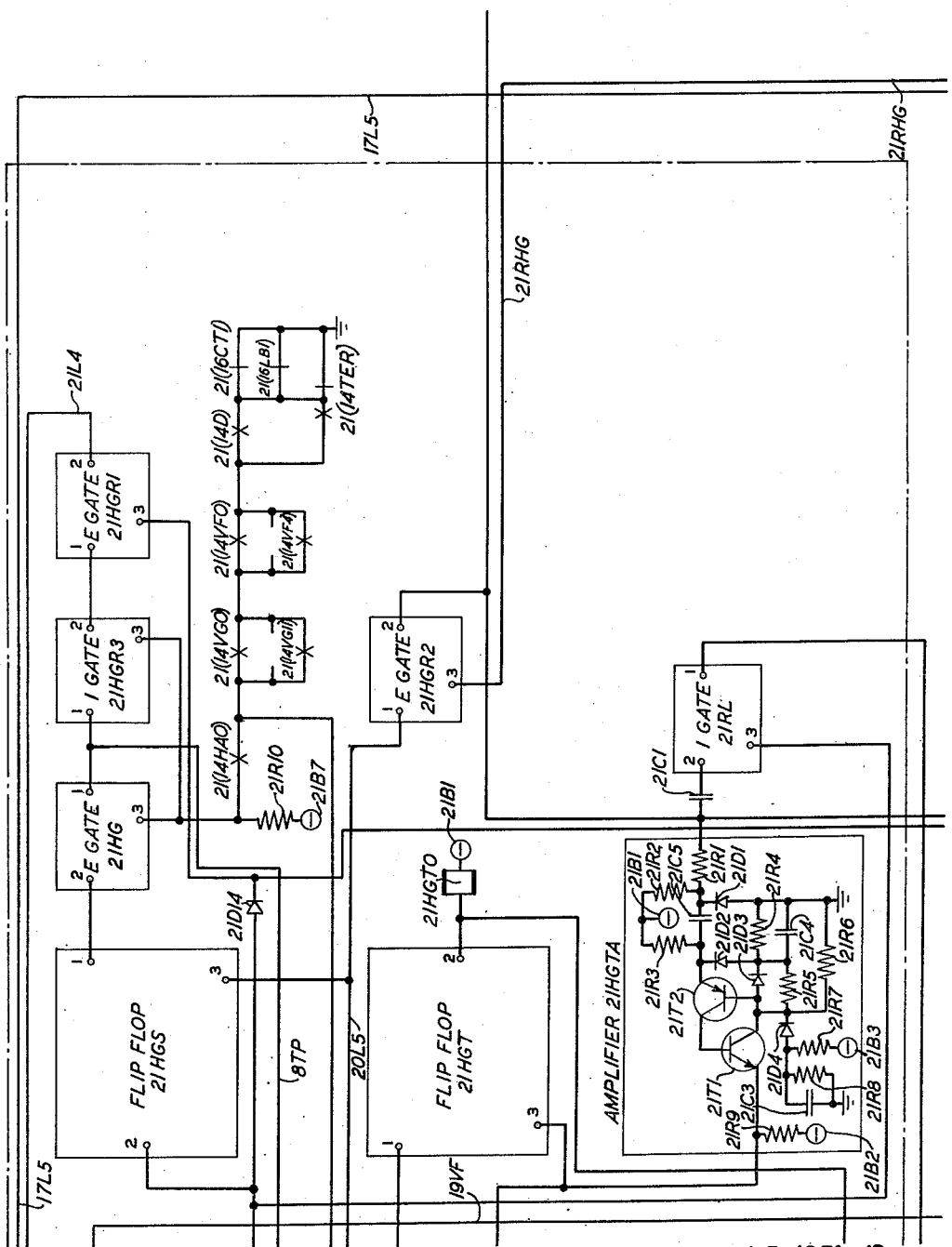
Figure 22:
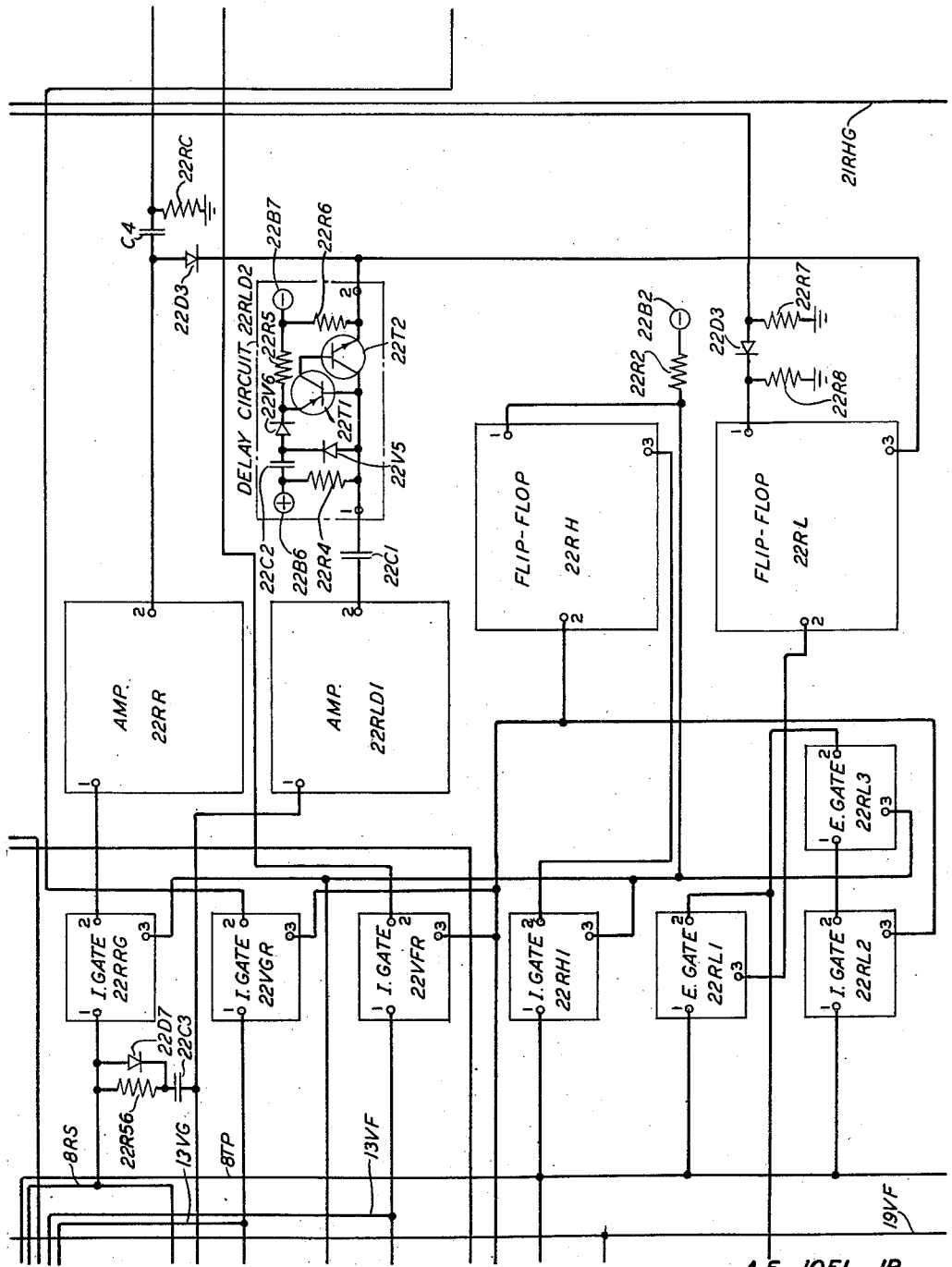
Figs. 22, 25 and 26 illustrate the concentrator originating call register at the central office.
Figure 24:
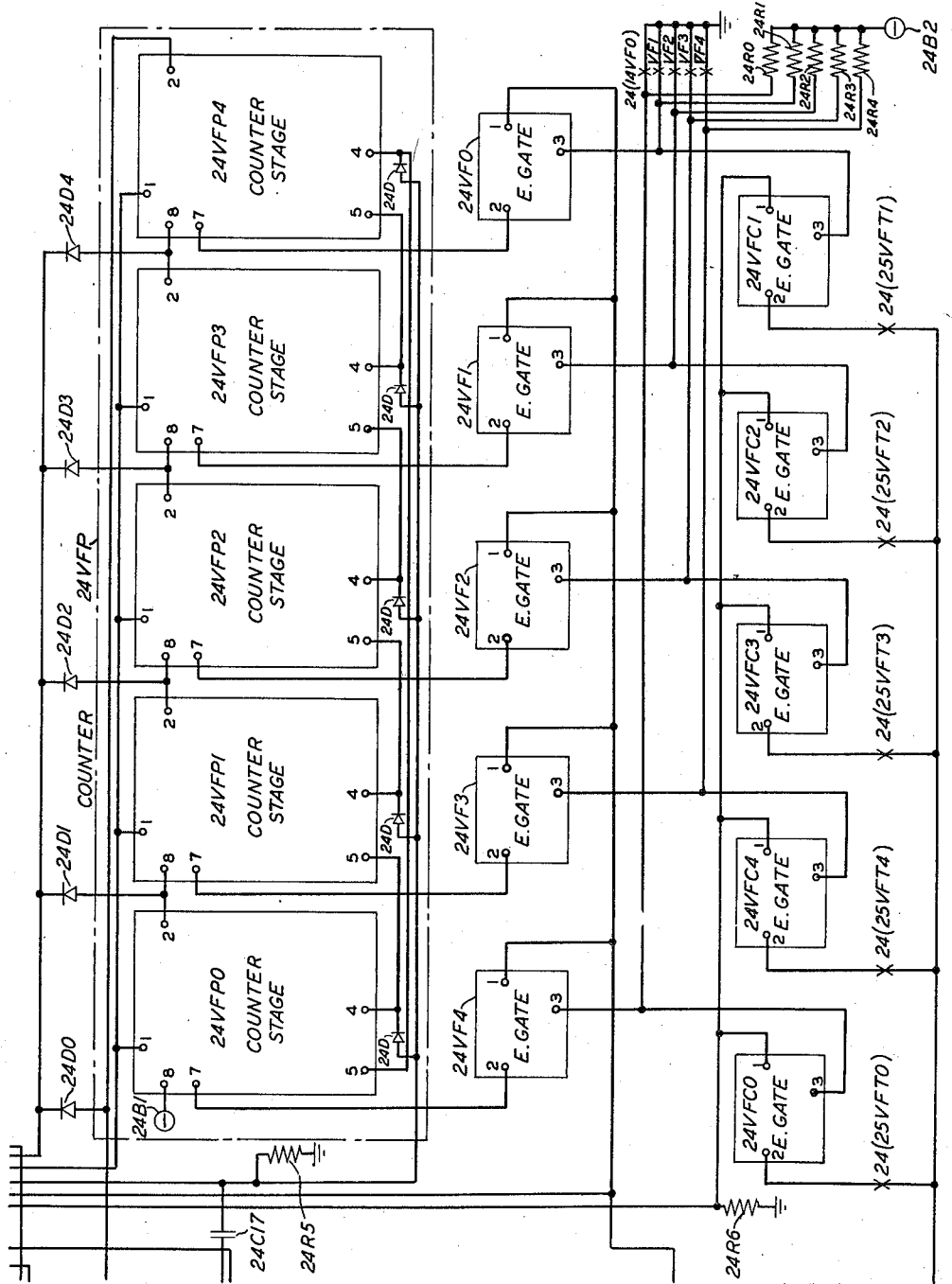

The ten line concentrators 110-19 are synchronously scanned under control of a scanner pulse generator 130 which is shown mainly in Figs. 8 and 13. The scanner pulse generator 130 simultaneously provides scanning pulses through the line concentrator control circuits 120-9 and the ten sets of control pairs 14CP1-3 to the ten line concentrators 110-19, respectively. Only one, the line concentrator control circuit 120, which is depicted mainly in Figs. 17, 18 and 21, is shown in detail. The other nine concentrator control circuits 121-9 are shown as a box in Fig. 18. The scanner pulse generator 130 also supplies the scanning pulses to the concentrator originating call register 131 which is shown mainly in Figs. 22, 25 and 26. The line concentrator control circuits 120-129 are individually associated with the concentrators 110-9. The rest of the equipment, including the scanner pulse generator 130 and the concentrator originating call register 131, are common control equipment for all ten concentrators 110-9. The ten line concentrators 110-9 and the register 131 are synchronously and cyclically operated under control of the scanning pulses from the generator 130.

The scanner pulse generator 130 supplies four types of pulses: vertical group pulses, vertical file pulses, reset pulses and timing pulses. These pulses are illustrated in the scanning pulse sequence diagram shown in Fig. 28. As in the ordinary crossbar telephone systems, the subscriber lines are arbitrarily arranged in groups designated vertical groups, vertical files and horizontal groups. All the subscriber lines connected to one of the ten concentrators 110-9 are in the same horizontal group which is subdivided into twelve vertical groups, each of which includes five vertical files. The vertical group pulses supplied by the scanner pulse generator 130 select a group of five lines connected to each of the line concentrators 110-19. The vertical group pulse is supplied simultaneously to the ten line concentrators 110-19 so that five times ten, or 50 subscriber lines are selected. Between two such vertical group pulses the scanner pulse generator 130 supplies five vertical file pulses to the concentrators 110-119 to select one subscriber line connected to each of the concentrators, or ten in all. In order to scan the 600 lines, the scanner pulse generator 130 provides to each of the ten line concentrators 110-9 and to the register 131, twelve 15-volt vertical group pulses spaced at intervals of 10 milliseconds and five 15-volt vertical file pulses spaced at intervals of 2 milliseconds between each pair of vertical group pulses. The vertical file and vertical group pulses are ½ millisecond pulses and the complete scanning cycle has a duration of 120 milliseconds.

In addition to the vertical group and the vertical file pulses, the generator 130 supplies one reset pulse at the beginning of the cycle to ensure the synchronous operation of the line concentrator scanning cycles and the originating call register cycle with that of the generator 130. The reset pulses, as hereinafter described, also functions as the first vertical file pulse so that only 59 vertical file pulses are provided instead of 60 for a single cycle.

To recapitulate, during one scanning cycle, the pulse generator 130 supplies one reset pulse, twelve vertical group pulses and 59 vertical file pulses. One vertical file pulse is provided for each of the 60 subscriber lines 3L00-59, if the reset pulse is included as a vertical file pulse. The scanner pulse generator 130 also provides 60 timing pulses which are utilized, as is hereinafter described, when a call to or from one of the 600 subscriber lines is being serviced.

Referring to Figs. 8 and 13, the scanner pulse generator 130 includes an oscillator 8OSC which supplies 1000 pulses per second to the gate circuits 8OSC1 and 8OSC2. The oscillator 8OSC has a P–N–P transistor 8T1 and an N–P–N transistor 8T2 which are interconnected in a hook arrangement to provide for a current amplification factor greater than one. Such hook arrangements are described, for example, in the Patent 2,623,102 which issued to W. Shockley on December 23, 1952. The emitter electrode of transistor 8T1 is connected to an emitter capacitor 8C1 which controls the duration of the kilocycle pulses. The capacitor 8C1 is connected to battery 8B2 and through the rheostat 8R1 to battery 8B1. The rheostat 8R1 is part of a voltage dividing network including the resistors 8R2 and 8R3. The emitter electrode of transistor 8T2, which is connected to battery 8B3 through resistor 8R4, is at a potential of −20 volts when the transistors 8T1 and 8T2 are not conductive, and at a potential of −2 volts when they are conductive. When the capacitor 8C1 charges, the emitter potential of transistor 8T1 is increased to cause transistors 8T1 and 8T2 to become conductive. When the transistors 8T1 and 8T2 become conductive, the output potential changes to −2 volts and the emitter potential of transistor 8T1 is decreased. When the emitter potential is decreased capacitor 8C1 discharges. The transistors 8T1 and 8T2 remain conductive and the output potential remains at −2 volts as long as the capacitor 8C1 discharges. When the capacitor 8C1 begins to recharge the transistors 8T1 and 8T2 become non-conductive and the output potential decreases to −20 volts. The output potential remains at −20 volts until the capacitor 8C1 recharges to raise the emitter potential of transistor 8T1 sufficiently over the base potential.

The free running oscillator 8OSC, in this manner, provides square-shaped kilocycle pulse to the two gates 8OSC1 and 8OSC2. The gate 8OSC1 is an enabling gate, which normally blocks pulses appearing at its input terminal 1, and the gate 8OSC2 is an inhibiting gate, which normally allows the passage of pulses appearing at its terminal 1. Similar enabling and inhibiting gates are utilized throughout the line concentrator system of the present invention.

The inhibiting gate 8OSC2 has three terminals 1–3, with terminal 1 being the input terminal, terminal 2 the output terminal and terminal 3 the control terminal. With −20 volts at its control terminal 3 the gate 8OSC2 functions to allow the passage of pulses from its input terminal 1 through to its output terminal 2. The −20 volt potential at terminal 3 forward-biases the varistor 8D2, which is connected thereto through the resistor 8R8. The varistor 8D2 is connected directly to terminal 2 and also through the capacitor 8C3 to terminal 1. The junction between capacitor 8C3 and varistor 8D2 is connected through the resistor 8R7 to the −20 volt battery 8B4. The forward-biased varistor 8D2 allows the pulses from oscillator 8OSC to appear across the load resistor 8R8. In its inhibiting state the terminal 3 is at a potential of −2 volts and the varistor 8D2 is reversed-biased with a potential of approximately 18 volts. The presence of a positive 18-volt pulse across the input resistor 8R7 is insufficient to overcome the reverse-biasing of varistor 8D2 so that an output pulse does not appear across the resistor 8R8. Terminal 3 of the gate 8OSC1 is connected to the output terminal 2 of the flip-flop circuit 8BC2 which provides, as is hereinafter described, the −20 volt normal potential and the −2 volt inhibiting potential.

The enabling gate 8OSC1 is a three-terminal device with an input terminal 1, an output terminal 2 and a control terminal 3. Normally with −20 volts at terminal 3 the gate 8OSC1 functions to prevent the passage of pulses from terminal 1 to terminal 2. Terminal 3 is connected to the varistor 8D1 through resistor 8R5, and varistor 8D1 is connected to terminal 2 and to terminal 1 through capacitor 8C2. With −20 volts at terminal 3, varistor 8D1, which is also connected to ground through resistor 8R6, is reverse-biased. When the potential at terminal 3 is changed to −2 volts varistor 8D1 becomes reverse-biased by only 2 volts to allow the passage of a pulse from the oscillator 8OSC. Terminal 3 of gate 8OSC1 is also connected to the output terminal 2 of the flip-flop circuit 8BC2. With the terminal 2 of the flip-flop circuit 8BC2 connected to the control terminals 3 of gates 8OSC1 and 8OSC2, one of the two gates is open and one of the two closed at any given time. When the control potential is normal, or at −20 volts the inhibiting gate 8OSC2 is open and the enabling gate 8OSC1 is closed, and when the control potential is −2 volts, the gate 8OSC2 is closed and gate 8OSC1 is open.

The pulses through the gate 8OSC1 are supplied to the flip-flop circuit 8BC1, and the pulses through the gate 8OSC2 are supplied to the flip-flop circuit 8BC2 which is similar to the flip-flop circuit 8BC1. The gates 8OSC1 and 8OSC2 and the flip-flop circuits 8BC1 and 8BC2 function together as a binary counter, which receives the 1000 cycle per second pulses from the oscillator 8OSC and divides them into two out-of-phase sources of 500 cycle per second pulses. The output terminals 2 of the gates 8OSC1 and 8OSC2 are connected, respectively, to the input terminals 1 of the flip-flop circuits 8BC1 and 8BC2.

The flip-flop circuit 8BC1 is a bistable transistor trigger circuit having two transistors 8T3 and 8T4 connected in a hook arrangement. An electrical pulse applied to the input terminal 1 triggers the circuit from one state to the other and leaves it there until a reset pulse to its terminal 3 triggers it back again to its former state. The flip-flop circuit 8BC1 is normal, or off, when its output terminal 2 is at a potential of −20 volts and off-normal, or on, when it has received a positive pulse through its input, or set, terminal 1 to change the potential at its output terminal 2 to −2 volts. A positive pulse through the reset terminal 3 restores the potential at its output terminal 2 to −20 volts. The time consumed in changing the output potential from one value to another is approximately 2/10 of a microsecond.

When the flip-flop circuit 8BC1 is in its off condition, a very small amount of current, somewhat less than 10 microamperes, is supplied from the +5 volt source 8B5 through resistor 8R11, transistor 8T3 and resistor 8R9 to ground. The transistor 8T3 represents almost all of the impedance in this circuit path. With a 5-volt potential across transistor 8T3 its emitter is back-biased so that the transistors 8T3 and 8T4 are in their low current quiescent condition. There is also a small current between the source 8B5 and a −20 volt source 8B6. This path is from source 8B5 through resistor 8R11, the base-to-collector path of transistor 8T3, the base-to-emitter path of transistor 8T4, in parallel with the collector-to-emitter path of transistor 8T4, through resistor 8R12 to battery 8B6. With transistor 8T4 being in its off or low current quiescent condition most of the potential drop is across it so that terminal 2 is at a potential of −20 volts.

When a positive pulse is supplied to terminal 1, of sufficient magnitude to raise the potential of the emitter electrode of transistor 8T3 above that of its base electrode, the transistor 8T3 becomes conductive. The input terminal 1 is connected through the capacitor 8C4 to the emitter electrode of transistor 8T3, and to ground through the resistor 8R9 and also through the varistor 8D3. When the transistors 8T3 and 8T4 are turned on, there is a low resistance path from ground through the varistor 8D3, the emitter-to-collector path of transistor 8T3, the base-toemitter path of transistor 8T4 and resistor 8R12 to battery 8B6. The increase in current through the resistor 8R12 causes an 18-volt drop across it to change the potential at terminal 2 to −2 volts. The voltage drop across the collector-to-emitter path of transistor 8T4 is very small so that the collector electrode thereof is effectively at the −2 volt potential. With the emitter electrode of transistor 8T3 effectively at ground potential it is therefore 2 volts more positive than its base electrode which is connected to the collector of transistor 8T4. This condition holds the transistors 8T3 and 8T4 on, to provide for the bistable operation. The flip-flop circuit 8BC1 includes a varistor 8D5 which is connected from the emitter electrode of transistor 8T4 to ground, to prevent the output terminal 2 from going positive or above ground potential.

The circuit 8BC1 remains in this stable condition until a positive pulse is received through the reset terminal 3. The reset terminal 3 is connected through the capacitor 8C5 and varistor 8D4 to the base electrode of transistor 8T3. The junction between capacitor 8C5 and varistor 8D4 is connected to ground through the resistor 8R10. The positive pulse to the base electrode of transistor 8T3 makes it more positive than its emitter electrode and thereby turns off the flip-flop circuit 8BC1.

The two similar flip-flop circuits 8BC1 and 8BC2 are alternatively turned on and off. The pulse provided when the potential at the output terminal 2 of flip-flop 8BC2 changes from −20 to −2 volts is utilized for four separate functions:

(1) It is supplied through the resistor 8R13 to the input terminal 1 of the B amplifier 8TPA as a timing pulse;

(2) It is utilized when, as is hereinafter described, the enabling gate 8VCG is open as a vertical group pulse;

(3) It is provided to the reset terminal 3 of the flip-flop circuit 8BC1; and (4) it changes the control potential at the terminals 3 of gates 8OSC1 and 8OSC2 so that the next pulse from oscillator 8OSC is provided to the flip-flop circuit 8BC1.

The next pulse from the oscillator 8OSC passes through the enabled gate 8OSC1, but not the inhibited gates 8OSC2, to the flip-flop circuit 8BC1 and also to the reset terminal 3 of the flip-flop circuit 8BC2. The pulse to the reset terminal 3 of flip-flop circuit 8BC2 causes the flip-flop circuit 8BC2 to reset and reverse the open and closed conditions of gates 8OSC1 and 8OSC2, so that the next pulse from oscillator 8OSC will pass through gate 8OSC2. The pulse to the input terminal 1 of flip-flop circuit 8BC1 causes it to turn on and supply a pulse through the inhibiting gate 8VFC, capacitor 8C6, and the A amplifier 8VFA to the ring counter 13VFC as a vertical file pulse. As is hereinafter described, when the gate 8VFC is closed, an enabling gate 8RCG is open and the pulse from flip-flop circuit 8BC1 functions as a reset pulse.

In this manner, the 1000 cycle per second pulses from oscillator 8OSC are divided into two sources of 500 cycles per second pulses. The pulses are positive square wave pulses, .5 millisecond in duration with 2 milliseconds between pulses.

As described above, the sequence of vertical file, vertical group, timing and reset pulses is shown in Fig. 28. The vertical file and reset pulses from flip-flop circuit 8BC1 are in phase, and the timing and vertical group pulses from flip-flop circuit 8BC2 are in phase. Assume that the scanning cycle starts with gate 8OSC1 closed and gate 8OSC2 open. The first pulse from oscillator 8OSC is supplied through gate 8OSC2 to set the circuit 8BC2. When circuit 8BC2 is set, it resets flip-flop 8BC1, enables gate 8OSC1, disables gate 8OSC2, and provides a pulse through the B amplifier 8TPA to lead 8TP.

The B amplifier 8TPA, which is a hook-type transistor pulse amplifier having transistors 8T5 and 8T6 connected in a hook arrangement, functions to supply square wave pulses of 15-volt amplitude and 500-microsecond duration. The illustrative embodiment of the present invention includes two types of amplifiers: a 500-microsecond pulse B amplifier and a 100-microsecond receiving A amplifier. Similar B and A amplifiers are utilized throughout the line concentrator system of the present invention. The B amplifier 8TPA is monostable and does not have to be reset after being triggered by an input pulse but returns to its original quiescent condition due to the internal circuit action. This is due to the fact that the potential on the emitter of transistor 8T6 returns to a predetermined negative biasing potential with respect to the base due to a biasing path from battery 8B9 through resistors 8R19 and 8R18, varistor 8D6, shunted by resistor 8R17, and the resistor 8R16 to battery 8B8. In its normal state the emitter electrode of transistor 8T6 is at a potential of 3.2 volts while the base thereof is at a potential of 4.42 volts. Thus, an input pulse which is just over 1.2 volts through terminal 1 and capacitor 8C8 from the flip-flop 8BC2 causes the amplifier 8TPA to trigger. The emitter-to-base potential determines the sensitivity of the amplifier. The input terminal 1 is negatively biased by battery 8B7 through resistor 8R14. The capacitor 8C7, which is connected between resistors 8R18 and 8R19, controls the duration of the output pulse supplied from the emitter of transistor 8T6 through terminal 2 of the amplifier 8TPA. The input pulse through terminal 1 triggers the amplifier 8TPA providing a charging path for capacitor 8C7 from the battery 8B9, on one side, and through varistor 8D6, transistors 8T5 and 8T6 and resistor 8R15 to battery 8B8, on the other side. After the capacitor 8C7 has charged it offers a high impedance path to the battery 8B8, allowing the biasing path, described above, to function as the capacitor 8C7 discharges to return the amplifier 8TPA to normal. The amplifier 8TP provides a pulse of fixed duration determined by the circuit time constant in response to a variable width pulse.

The amplifier pulse from amplifier 8TPA is supplied to the enabling gate 8VGC, and as a timing pulse through lead 8TP to the originating register 131 and to the ten line concentrator control circuits 120–129. The enabling gate 8VGC is opened, as is hereinafter described, after five vertical file pulses have been received by a ring counter 13VFC.

The second pulse from oscillator 8OSC is provided through gate 8OSC1 to set the flip-flop circuit 8BC1, and to reset the flip-flop circuit 8BC2. When circuit 8BC2 resets, it opens gate 8OSC2 and closes gate 8OSC1. When circuit 8BC1 sets, it provides a pulse to the enabling gate 8RCG, and also through the inhibiting gate 8VFC, and capacitor 8C6 to the A amplifier 8VFA. As is hereinafter described, the gate 8RCG is enabled once during each scanning cycle to allow the pulse from the flip-flop 8BC1 to function as a reset pulse.

The A amplifier 8VFA is substantially similar to the B amplifier 8TPA described above. The input terminal 1 is connected to a capacitor 8C9 and to the emitter electrode of transistor 8T7, through the resistor 8R20. The capacitor 8C9 is connected to the emitter electrode of transistor 8T7 through varistor 8D7, and also to battery 8B10 through terminal 3 and resistor 8R21. The input to the B amplifier 8TPA is a single terminal input whereas the input to the A amplifier 8VFA may be a double terminal input. An input is provided to the A amplifier 8VFA when terminal 1 becomes more positive than terminal 3. When a pulse is provided to the amplifier 8VFA, terminal 1 becomes positive with respect to terminal 3 causing the transistors 8T7 and 8T8 to trigger. The capacitor 8C9 functions as a filter to prevent reversal of the relative potentials of terminals 1 and 3 when transistors 8T7 and 8T8 become conductive. When the transistors 8T7 and 8T8 become conductive, the emitter potential of transistor 8T7 decreases. Without the filter capacitor 8C9, a relatively negative pulse would appear at terminal 1 to possibly interact in some circuit arrangements with other components. The emitter electrodes of transistors 8T7 and 8T8 are connected by a feedback capacitor 8C11 which makes the amplifier very sensitive. The amplifier 8VFA provides a pulse of shorter duration than that provided from the amplifier 8TPA due to the utilization of a small base capacitor 8C10. The capacitor 8C10 is connected on one side to battery 8B11 and on the other side to terminal 3. Battery 8B11 is connected through resistor 8R23 to the collector of transistor 8T8. The emitter electrode of transistor 8T8 is connected to the output terminal 2 through the varistor 8D8, which is connected to the battery 8B12 through the resistor 8R26. The resistor 8R26 and the varistor 8D8 function as an isolating circuit component between the amplifier 8VFA and the ring counter 13VFC. The varistor 8D8 is necessary to avoid false triggering through capacitor 8C11 due to noise or other disturbances appearing at terminal 2. The other circuit components in amplifier 8VFA are similar to the corresponding ones in amplifier 8TPA.

The pulses from amplifier 8VFA are provided to the five-stage ring counter 13VFC. A ring counter may be referred to as a walking circuit or a sequence circuit which advances one step for each input pulse supplied thereto. The vertical file pulses from the amplifier 8VFA are supplied to the input terminal 1 of each of the five stages 13VFC0–4. A single counter stage, such as the stage 13VFC0, is effectively a combination of an enabling gate and flip-flop circuit. A stage is referred to being gated when its gate is enabled, and is referred to as being "on" when its flip-flop circuit is set. A stage may be turned on only if its gate is enabled to allow the input pulse to set or turn on its flip-flop circuit. When a stage is turned on, the potential at its output terminal 2 changes from —20 volts to —2 volts to enable the gate of the succeeding stage. Assume for example that at the beginning of the scanning cycle the stage 13VFC0 has its flip-flop circuit set. Only one of the stages 13VFC0–4 is set at a time, and the stage succeeding the set stage is the only gated or enabled stage. The input terminal 1 is connected through the input coupling capacitor 13C1 and the varistor 13D3 to the emitter electrode of the transistor 13T1. The transistor 13T1 is one of two transistors 13T1 and 13T2 which are connected in a hook arrangement of the type described in the above-identified patent to W. Shockley. The emitter electrode of transistor 13T1 is connected to ground through the resistor 13R1 and through the varistor 13D2. The resistor 13R1 functions as a load resistor for the input pulse, and the varistor 13D2 provides a low resistance path for the emitter sustaining current and also functions to dissipate any negative pulses to ground. The base of transistor 13T1 is connected to the collector of transistor 13T2, to the +5 volt direct-current potential source 13B1 through the base resistor 13R4, and through the reset terminal 4 to the terminal 5 of the succeeding stage 13VFC1. The emitter electrode of transistor 13T2 is connected to the output terminal 2, and to the —20 volt battery 13B2 through resistor 13R6.

With the first stage 13VFC0 on, the output terminal 2 thereof is at a potential of —2 volts due to the current through the resistor 13R6. With a —2 volt potential at terminal 2 of stage 13VFC0, the varistor 13D3 of stage 13VFC1 is back-biased by only 2 volts. The terminal 2 of stage 13VFC0 is connected through the terminal 8 of stage 13VFC1 and resistor 13R3 to the varistor 13D3. With the varistor 13D3 in stage 13VFC1 back-biased by only 2 volts, the stage 13VFC1 is enabled so that an input pulse through terminal 1 thereof causes it to turn on. If stage 13VFC0 is not on and its terminal 2 is at a potential of —20 volts, varistor 13D3 in stage 13VFC1 is reversed-biased so that an input pulse through its terminal 1 does not turn it on.

When the first pulse is supplied to the terminals 1 of stages 13VFC0–4 from the amplifier 8VFA, it turns on the stage 13VFC1 through the enabled gate circuit which includes the varistor 13D3. The potential at terminal 2 of stage 13VFC1 changes from —20 volts to —2 volts to enable the stage 13VFC2 and to reset the stage 13VFC0. The terminal 2 of stage 13VFC1 is connected through the capacitor 13C2 of stage 13VFC1, varistor 13D4 and terminal 5 to terminal 4 of stage 13VFC0. Terminal 4 is connected, as described above, to the base electrode of transistor 13T1. When the potential at terminal 2 of stage 13VFC1 changes from —20 volts to —2 volts, the change in potential is provided to the base of transistor 13T1 in stage 13VFC0 causing the stage 13VFC0 to turn off. When the stage 13VFC0 is turned off, in this manner, the potential at its terminal 2 decreases from —2 volts to —20 volts disabling the gate circuit which includes the varistor 13D3 in the stage 13VFR.

To briefly recapitulate, the first pulse supplied to terminals 1 of stages 13VFC0–4 turns on the stage 13VFC1 which enables the stage 13VFC2 and resets or turns off the stage 13VFC0. When the stage 13VFC0 is turned off it disables the stage 13VFC1. After the first pulse, therefore, the stage 13VFC1 is the only stage that is on and the stage 13VFC2 is the only stage that is enabled.

The second pulse from flip-flop 8BC1 through amplifier 8VFA turns on the stage 13VFC2 which enables the stage 13VFC3 and turns off the stage 13VFC1. The stage 13VFC1 in turn disables the stage 13VFC2. The pulses supplied to the terminals 1 of the stages 13VFC0–4 in this manner advance the setting from stage to stage, with the sixth pulse being equivalent to the first pulse. The sixth pulse is equivalent to the first pulse because the stages 13VFC0–4 are connected in a ring, with the output terminal 2 of stage 13VFC4 being connected to terminal 8 of stage 13VFC0, and the terminal 5 of stage 13VFC0 being connected to the reset terminal 4 of stage 13VFC4. The above sequence continues from stage to stage in the counter 13VFC until the input pulses are blocked by the inhibiting gate 8VFC.

Every time stage 13VFC4 turns on, it enables or opens the gate 8VGC. Gate 8VGC is enabled therefore every fifth vertical file pulse and disabled by the succeeding vertical file pulse. The output terminal 2 of stage 13VFC4 is connected to the control terminal 3 of gate 8VGC. With the gate 8VGC enabled, the next pulse provided from terminal 2 of the flip-flop circuit 8BC2 passes through the B amplifier 8TPA, the gate 8VGC, and the B amplifier 8VGA, to the enabling gate 8PR, and also to a twelve-stage ring counter 13VGC. The gate 8PR is enabled, as is hereinafter described, when the stage 13VGC11 of counter 13VGC is turned on.

The vertical group counter 13VGC is similar to the counter 13VFC except that it has twelve stages instead of five. The first pulse through gate 8VGC turns on stage 13VGC1 and turns off stage 13VGC0. The next pulse from terminal 2 of the flip-flop circuit 8BC1 turns off stage 13VFC4 and turns on stage 13VFC0. When stage 13VFC4 is turned off, it removes the enabling potential from gate 8VGC causing it to close. The next four pulses from terminal 2 of the flip-flop circuit 8BC2 are blocked at gate 8VGC. When however, stage 13VFCA is turned on again another pulse is allowed to pass to the counter 13VGC. The two counters 13VFC and 13VGC are operated in this manner, with five pulses being provided to counter 13VFC for each pulse to counter 13VGC.

This sequence continues until the stage 13VGC11 is turned on. When stage 13VGC11 is turned on, it provides an enabling potential from its output terminal 2 to control terminal 3 of gate 8PR. The next vertical group pulse through gate 8VGC to counter 13VGC, also passes through the open gate 8PR to trigger the flip-flop circuit 8RC. The flip-flop 8RC is similar to the flip-flop circuit 8BC1, described above.

The flip-flop circuit 8RC is set, in this manner, at the same time that the amplifier 8VGA supplies a vertical group pulse to turn off stage 13VGC11 and turn on stage 13VGC0. When stage 13VGC11 is turned off it removes the enabling potential from gate 8PR.

When the flip-flop circuit 8RC is set it enables, or opens, the enabling gate 8RCG and closes the inhibiting gate 8VFC. The next pulse from the flip-flop circuit 8BC1 is supplied, as a reset pulse, through gate 8RCG instead of a vertical file pulse through gate 8VFC. The reset pulse is supplied from flip-flop circuit 8BC1 through gate 8RCG, and the B amplifier 8RCA to the reset terminal 3 of the flip-flop circuit 8RC. The amplified reset pulse from amplifier 8RCA is also supplied through capacitor 8C15, shunted to ground by resistor 8R40, and varistors 13D7 to the reset terminals 4 of stages 13VFC1–4 and 13VGC1–11. From the capacitor 8C15 a multiple is also provided, respectively, through varistors 3D1 and resistors 13R18 to the terminals 7 of stages 13VFC0 and 13VGC0. The reset pulse, provided in this manner, turns on stage 13VFC0 and turns off the stage 13VFC4 and also any of the others that may be on. The pulse effectively insures stages 13VFC1–4 and 13VGC1–11 being off and stages 13VFC0 and 13VGC0 being on at the beginning of the cycle.

When the flip-flop circuit 8RC is reset, it recloses gate 8RCG and reopens gate 8VFC, so that the next pulse from flip-flop circuit 8BC1 functions as a vertical file pulse instead of a reset pulse. During one complete cycle the counter 13VFC receives 59 vertical file pulses and one reset pulse. The first of 60 vertical file pulses is blanked and replaced by the reset pulse. The reset pulse functions as a vertical file pulse because it resets stage 13VFC4 and turns on stage 13VFC0. During one complete cycle the counter 13VGC receives twelve vertical group pulses and one reset pulse. The reset pulse insures the synchronism of counters 13VGC and 13VFC.

The output terminal 2 of amplifier 8RCA, through which the reset pulse is provided, is also connected to the reset check circuit 8RCP. Normally, the circuit 8RCP is a free running oscillator which oscillates at a frequency of approximately two cycles per second. In the absence of reset pulses, a capacitor 8C12 charges from battery 8B14 through resistor 8R36 until the emitter potential of transistor 8T9 is greater than its base potential. The hook connected transistors 8T9 and 8T10 trigger, and supply a positive pulse from capacitor 8C12 through varistor 8D11, transistors 8T9 and 8T10, capacitor 8C13, resistor 8R35 and the output terminal 2 to the input terminal 1 of amplifier 8RCA. When the transistors 8T9 and 8T10 trigger, the emitter potential of transistor 8T9 becomes negative and capacitor 8C12 starts to recharge. The wave of the capacitor potential has in this manner, a saw-tooth shape. The transistors 8T9 and 8T10 become nonconductive, when the capacitor 8C12 starts to recharge, to allow the output potential to decrease to −20 volts due to battery 8B15 which is connected to the emitter of transistor 8T10 through resistor 8R34. In the absence of input pulses, the check circuit 8RCP, therefore, provides two pulses per second to the amplifier 8RCA. If a reset pulse is not provided to the circuit 8RCP during a 500 milliseconds interval, the circuit 8RCP provides a pulse to the amplifier 8RCA to function as a reset pulse.

The reset pulses from amplifier 8RCA are supplied through terminal 1 of circuit 8RCP, resistor 8R30, capacitor 8C14 and varistor 8D10 to the emitter of transistor 8T9. The capacitor 8C14 is also connected through resistors 8R31, 8R32 and 8R33 to ground. The reset pulses are normally applied at a rate of 8 per second from the gate 8RCG. Each fourth reset pulse is effective to trigger the circuit 8RCP. The capacitor 8C12 inhibits triggering until it is near a potential sufficient to trigger the transistors 8T9 and 8T10. When the reset pulses are applied, therefore, the circuit 8RCP is triggered in synchronism every fourth reset pulse. If the fourth reset pulse fails to arrive, the circuit 8RCP triggers anyhow to provide a substitute reset pulse. The check circuit 8RCP, in this manner insures the synchronism of the counters 13VGC and 13VFC and counters in other parts of the system. The circuit 8RCP also functions to start the generator 130 when power is turned on.

The generator 130 is not stopped during the operating sequence of the line concentrating system of the present invention, but continuously and cyclically generates the 59 vertical file pulses, the twelve vertical group pulses, the reset pulse and the 60 timing pulses.

The 60 timing pulses, the vertical file pulses, the twelve vertical group pulses and the reset pulse for each cycle are supplied, respectively, through leads 8TP, 13VF, 13VG and 8RS to the originating call register 131 and to the ten control circuits 120–129. The leads 8TP, 13VF, 13VG and 8RS are connected, respectively, from the output terminals 2 of amplifiers 8TPA, 8VFA, 8VGA and 8RCA.

Figure 9:
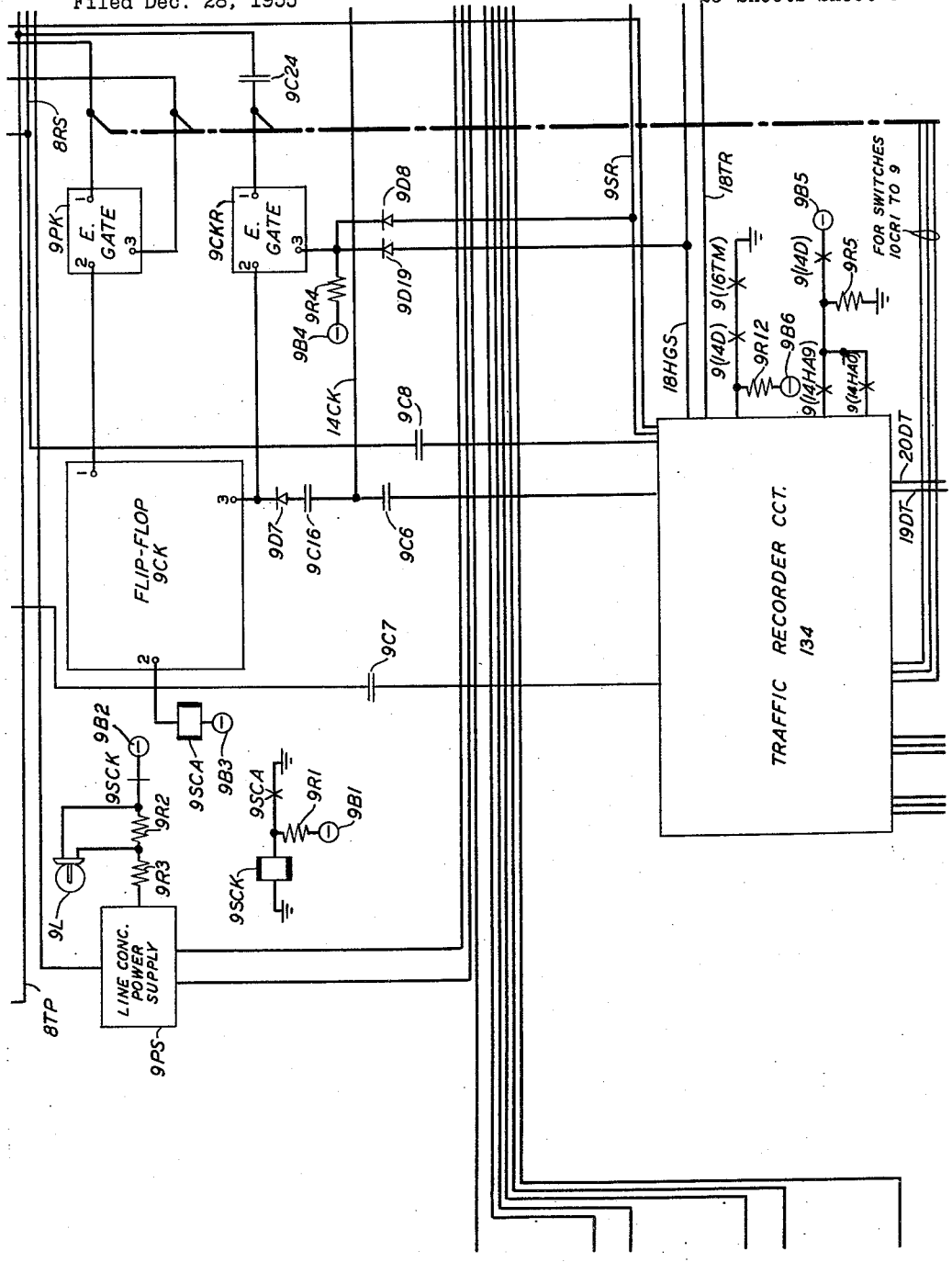
Fig. 9 illustrates the check circuit and traffic recorder at the central office.
Figure 10:
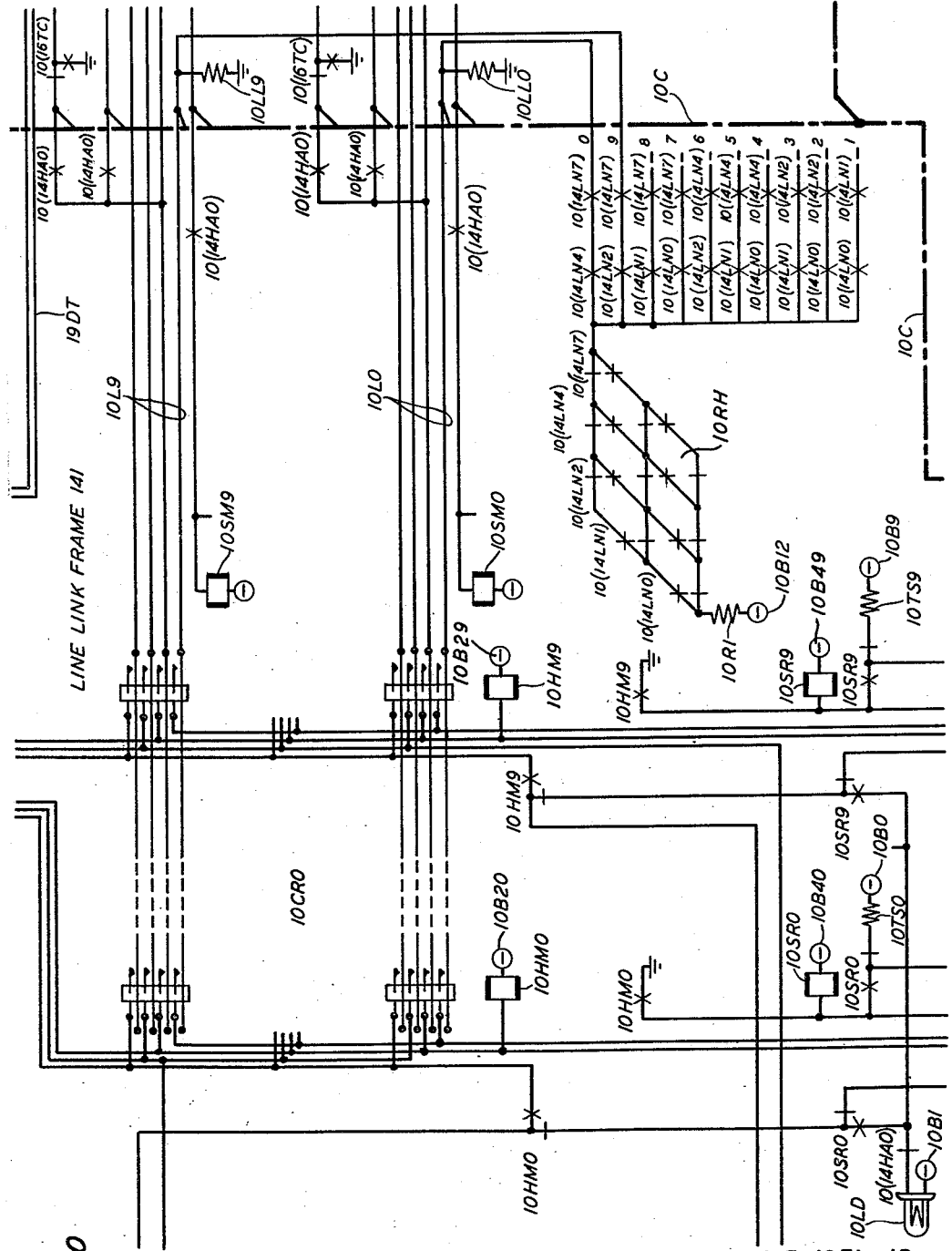
Fig. 10 illustrates the line link frame at the central office.

The scanner pulse generator 130, as is hereinafter described, supplies the timing pulses to a line selection and test circuit 132 and to a traffic recorder 134. The register 131 is shown mainly in Figs. 22, 25 and 26, the control circuit 120 is shown mainly in Figs. 17, 18 and 21, the select circuit 132 is shown mainly in Figs. 19, 20, 23 and 24 and the recorder 134 is shown in Fig. 9.

When stage 13VGC11 is turned on it supplies a pulse to the control terminal 3 of gate 8PR as described above, and in addition it also opens the enabling gate 9PK. The vertical group pulse provided from terminal 2 of stage 13VGC11 to terminal 3 of gate 9PK enables gate 9PK to ready a path from the output terminal 2 of stage 13VFC3 to the input terminal 1 of the flip-flop check circuit 9CK. Stage 13VFC3 is turned on after stage 13VGC11 is set when three vertical file pulses are provided to the counter 13VFC. When stage 13VFC3 is turned on, it, in turn, sets the circuit 9CK. When circuit 9CK is set, it initiates the operation of the slow-operate relay 9SCA which is connected to battery 9B3. If circuit 9CK remains set to allow relay 9SCA to operate, a trouble condition is indicated.

When relay 9SCA operates, it causes the release of the normally operated relay 9SCK by shunting it to ground through the operated contact 9(9SCA). The operating path for relay 9SK is through resistor 9R1 to battery 9B1. Relay 9SCK is a slow-release relay, taking 400 milliseconds to release. When relay 9SCK finally releases, it closes a path from battery 9B2 through its contact 9(9CK) and resistors 9R2 and 9R3 to the line concentrator power supply 9PS. The trouble indicator 9L, which is shunted across resistor 9C, is energized when relay 9SCK releases. The power supply 9PS, as is hereinafter described, is utilized to supply operating power to the ten line concentrators 110–9.

Relay 9SCK releases, however, only if circuit 9CK is not reset during a 400-millisecond interval. The reset terminal 3 of the flip-flop circuit 9CK is connected through diode 9D7, capacitor 9C16 and lead 14CK to the concentrator control circuit 120. As described above, the circuit 9CK is set when stage 13VFC3 is set after stage 13VGC11 is set. In other words, when line 3L58 at the concentrator 110 is scanned, the circuit 9CK is set. At the line concentrator 110, as is hereinafter described, the line 3L59 is permanently made busy to return a line busy pulse to the control circuit 120. The control circuit 120 provides a line busy potential to lead 14CK which resets the circuit 9CK. If a line busy pulse is not returned over lead 14CK after circuit 9CK has been set, a trouble indication is provided.

When scanning is halted to serve a call, line busy pulses are not returned to circuit 9CK. As is hereinafter described, however, the timing pulses through lead 8TP are utilized to reset circuit 9CK and prevent a false trouble indication.

There is one circuit 9CK and associated gates, relays and components for each of the ten concentrators 110-9. The other nine are shown functionally as part of the box 1200 in Fig. 12. The connections from circuits 121-9 to box 1200 for supplying the enabling potentials are not shown.

Returning now to the normal scanning sequence, the four types of pulses are supplied from generator 130 to the register 131. The originating call register 131 includes two ring counters 25VFR and 26VGR which are similar to the counters 13VFC and 13VGC, described above. When the central office is not serving a call, the scanner pulse generator 130 drives the originating call register 131 in synchronism therewith, by supplying the vertical file, vertical group and reset pulses to the counters 25VFR and 26VGR. The vertical file pulses are supplied through lead 13VF, and the open inhibiting gate 22VFR to the input terminals 1 of the stages 25VFR0-4 of counter 25VFR. The vertical group pulses are supplied through lead 13VG and the inhibiting gate 22VGR to the input terminals 1 of stages 26VGR0-11 of counter 26VGR. The reset pulses are supplied through lead 8RS, the inhibiting gate 22RRG, the B amplifier 22RR, and capacitor 22C4, shunted to ground by resistor 22RC, the varistors 25D7 and 26D7, respectively, to the reset terminals 4 of stages 25VFR1-4 and 26VGR1-11. The input terminal 1 of gate 22RRG is connected through varistor 22D7, shunted by resistor 22R56 amplifier 22RLD, and circuit 22RLDZ, capacitor 22C3 to the reset terminal 3 of circuit 22RL. The output terminal 2 of amplifier 22RR is also connected through varistor 22D3 to the terminal 3 of circuit 22RL. Circuit 22RL therefore receives two reset pulses, one delayed, whenever gate 22RRG is open. With gate 22RRG closed, the delayed reset pulse is still provided. The reset pulses are also supplied from capacitor 22C4, respectively, through the varistors 25D1 and 26D1 and the resistors 25R1 and 26R1 to the terminals 7 of stages 25VFR0 and 26VGR0.

The three gates 22VFR, 22VGR and 22RRG are closed, as is hereinafter described, when a service request is received from any one of the ten line concentrators 110-9, to block the reception of the vertical file, vertical group and reset pulses to the counters 25VFR and 26VGR. The counters 25VFR and 26VGR are, in this manner, stopped upon the reception of a service request from the line concentrators 110-9.

The vertical file, vertical group and reset pulses are provided to the register 131 and also through the ten line concentrator control circuits 120-9, to the line concentrators 110-9. Only circuit 120, which is depicted in Figs. 17, 18 and 21, of the ten circuits 120-9 is shown in detail. The leads 13VF, 13VG and 8RS are multipled to each of the circuits 120-9. In circuit 120, the vertical file pulse through lead 13VF from the generator 130 is coupled through capacitor 17C1, varistor 17D1, shunted by resistor 17R1, the open inhibiting gate 17VFS, capacitor 17C2, the B amplifier 17VFL, lead 17VF and resistor 14R1 to the upper primary of transformer 14T1. The center tap of the primary of transformer 14T1 is connected to battery 14B1 and to the oppositely poled varistors 14D1 and 14D2. The vertical group pulse, through lead 13VG, is coupled through the inhibiting gate 17VGS2, resistor 17R2, the inhibiting gate 17VGS1, the B amplifier 17VGL, lead 17VG and resistor 14R3 to the upper primary of transformer 14T2. The center tap of transformer 14T2 is connected to battery 14B2 and to the oppositely poled varistor 14D3 and 14D4. The reset pulse, through lead 8RS, is coupled through the inhibiting gates 17RS2 and 17RS1, capacitor 17C3, the B amplifier 17RS, lead 17RS and resistor 14R4 to the lower primary of transformer 17T2.

The three signal transformers 14T1-3 and the power transformers, or retard coils, 14C1 and 14C2 are part of the concentrator control circuit 120. The secondaries of transformers 14T1-3 are connected, respectively, through the three signal control pairs 14CP1-3 to the line concentrator 110. In this manner, the vertical file pulses are supplied through the control pair 14CP1, and the vertical group and reset pulses are supplied through the control pair 14CP2 to the line concentrator 110.

Briefly recapitulating, during the normal scanning cycle, the scanner pulse generator 130 continuously and cyclically provides vertical group, vertical file and reset pulses through leads 13VG, 13VF and 8RS, respectively, to the line concentrator originating call register 131 and also to the ten line concentrator control circuits 120-129. The originating call register 131 includes a vertical group ring counter 26VGR and a vertical file ring counter 25VFR which are cyclically and synchronously operated with the ring counters 13VGC and 13VFC in the scanner pulse generator 130. The ten concentrator control circuits 120-129 supply the vertical file, vertical group and reset pulses through sets of three control pairs 14CP1-3 to the ten line concentrators 110-9.

The vertical group vertical file and reset pulses, provided, in this manner, to each of the ten line concentrators 110-9, cyclically and synchronously operate ring counters 7VG and 4VF therein. Including the sets of counts 7VG and 4VF, the line concentrator system of the present invention includes twelve sets of synchronously operated ring counters: the generator counters 13VGC and 13VFC; the register counters 25VFR and 26VGR; and the ten sets of concentrator counters 4VF and 7VG. The system also includes two counters 23VGP and 24VFP in the line selection and test circuit 132 which are not ring counters. The counters 23VGP and 24VFP are not operated during the scanning cycle.

At the line concentrator 110, the control pairs 14CP1-3 are connected, respectively, to the secondaries of the transformers 5T1-3. The upper primary of the transformer 5T1, which is shunted by the resistor 5R1, is connected through resistor 5R2 to the input terminals 1 and 3 of the vertical file receiving type, or A, amplifier 5VF. The upper primary winding of the transformer 5T2, which is shunted by the resistor 5R6, is connected through resistor 5R4 to the input terminals 1 and 3 of the vertical group A amplifier 5VG. The lower primary winding of the transformer 5T2 is connected through the resistor 5R5 to the input terminals 1 and 3 of the reset amplifier 5RS. The amplifiers 5RS and 5VF and 5VG are all receiving or A-type amplifiers, similar to the A amplifier 8VFA described above. The amplifiers 5RS, 5VF and 5VG amplify the respective signals supplied thereto from the central office.

The circuit components of amplifiers 5RS, 5VF and 5VG are similar to the circuit components of amplifier 8VFA but the first digit of the designation is a 5 instead of an 8, and the power is externally supplied. Instead of including batteries such as 8B11 and 8B12 in amplifier 8VFA, the direct-current potentials are supplied to amplifiers 5RS, 5VF and 5VG through terminals 4 and 5 thereof. Terminals 4 of amplifiers 5RS, 5VF and 5VG are multiples to lead 2B1 which is connected to the power supply, or source 2PS, and terminals 5 are multipled to to lead 2B2 which is also connected to source 2PS.

The source 2PS, which is a rectifying and filtering network, receives alternating-current power, phantomed over the control pairs 14CP1-2 from the central office, and transforms it to the various direct-current potentials that are utilized in the line concentrator 110. All the power that is utilized in the line concentrator 110 is supplied from the central office through the control pairs 14CP1-2 and the power source 2PS.

At the central office a line concentrator power supply 9PS, mentioned above, provides 115-volt alternating current through the transformer 14T0, which has a grounded center tapped secondary, to the center taps of the retard coils 14C1 and 14C2. The coil 14C1 is connected across the central office end of the control pair 14CP1, and the coil 14L2 is connected across the central office end of the control pair 14CP2.

The control pairs 14CP1–2 are connected, respectively, at the line concentrator 110 to the retard coils 5L1 and 5L2, and the center taps of coils 5L1 and 5L2 are connected, respectively, through leads 2L1 and 2L2 to the power source 2PS. The use of retard coils may be avoided by connecting directly to the center taps of the secondaries of transformers 14T1–2 and 5T1–2. The alternating-current power is phantomed over the two control pairs 14CP1–2 and then returned to its original condition over leads 2L1 and 2L2. The phantomed power does not interfere with the scanning operation since both the tip and ring of each of the control pairs 14CP1–2 have the same, or in phase, power current.

The leads 2L1 and 2L2 are connected to the serially connected primaries of the power transformers 2P1–4. The transformers 2P1–4 may effectively be one transformer with a single primary and four secondaries. The transformers 2P1–4 supply power, respectively, for the +30, −65, −20 and +5 volt direct current supplies. The four alternating voltages are rectified by the bridges 2V1–4, regulated and filtered by the capacitors 2C1–4 and associated circuitry, and then supplied to leads 2B4–1. The total power consumption of one of the concentrators 110–9 at the central office is between 3 to 5 watts depending upon the number of connections being held and the insulation resistance of the connecting lines.

The bridges 2V1–4 each comprise four diodes 2D1–4, with the secondaries of transformers 2P1–4 being connected to the junction between varistors 2D1 and 2D2, and to the junction between varistors 2D3 and 2D4. The right junctions, or the junctions between varistors 2D2 and 2D3, of bridges 2V1–4 are the positive terminals and the left junctions are the negative terminals. Lead 2B1, which is connected to the right junction of bridge 2V4, is the +5 volt supply lead. The capacitor 2C4 which is connected between the right and left junctions of the bridge 2V4 regulates the voltage and suppresses ripples. The left junction of bridge 2V3 is connected through resistor 2R2 to the −20 volt lead 2B2. Lead 2B2 is connected through the filter consisting of capacitor 2C3 and resistor 2R3 to the left junction of bridge 2V4 which is a common junction point or ground. The left junction of bridge 2V2 is connected through resistor 2R5 to the −65 volt lead 2B3. Lead 2B3 is connected to another common junction point through varistor 2D5 and capacitor 2C2. The right junction of bridge 2V1 is connected to the +30 volt lead 2B4. Lead 2B4 is shunted to the second common junction point through the resistor 2R1 and the capacitor 2C1. One of the four capacitors 2C4–1 shunts each of the direct-current power leads 2B1–4 to a common junction point to filter ripples and to provide voltage regulation.

The leads 2B1 and 2B2, as described above, are connected to terminals 4 and 5, respectively, of the A amplifiers 5RS, 5VF and 5VG. With the exception, therefore, that the power is supplied externally from the central office, the A amplifiers 5RS, 5VF and 5VG are similar to the amplifier 8VFA described above.

Returning now to the normal scanning sequence the vertical file, vertical group and reset pulses are transmitted, respectively, through the control pairs 14CP1–2 to the amplifiers 5VF, 5VG and 5RS. The amplified vertical file pulses are supplied from the output terminal 2 of the A amplifier 5VF through lead 5L3 to the input terminals 1 of the five-stage vertical file ring counter 4VF. The counter 4VF is similar to the ring counters 25VFR and 13VFC, described above, with the exception that the power is supplied externally from the source 2PS. Stage 4VF0 of the ring counter 4VF is shown in detail. All the circuit components are the same as the stage 13VFC0 in counter 13VFC, with the first digit of each designation being 4 instead of 13. Terminal 9 of stage 4VF0 is connected through lead 3GSL to the first common junction point, or ground, of the power supply 2PS. Terminal 9 is, therefore, a ground connecting terminal. Terminal 6 of stage 4VF0 is connected through the lead 3B1 to the +5 volt lead 2B1 of the source 2PS, and terminal 3 of stage 4VF0 is connected through the −20 volt lead 7L1, and lead 5L4 to the −20 volt lead 2B2 of source 2PS. The ground, +5 and −20 volt potentials are, in this manner, supplied to stages 4VF0–4 of counter 4VF which is otherwise similar to counter 13VFC described above.

The vertical group pulses received by the vertical group amplifier 5VG are supplied from the output terminal 2 thereof through lead 5L5 to the terminals 1 of the stages 7VG0–11 of the vertical group ring counter 7VG. Except for the external potential sources, the counter 7VG is similar to the vertical group counter 13VGC, described above. Terminals 9 are connected to ground, terminals 6 to lead 2B1 and terminals 3 to lead 2B2 in a similar manner as described above in reference to the counter 4VF.

The amplified reset pulse from the amplifier 5RS is supplied from the output terminal 2 through lead 5L6, the capacitor 2RS, lead 2L4 and the varistors 4D7 and 7D7, respectively, to the reset terminals 4 of the stages 4VF1–4 and 7VG1–11. The reset pulse is also supplied from capacitor 2RS through the varistors 4D1 and 7D1, respectively, to the terminals 7 of stages 4VF0 and 7VG0.

Capacitor 2RS is also connected through varistor 2D7 to the reset terminal 3 of the flip-flop circuit 2M, which is similar to the flip-flop circuit 8BC1 described above. The function of circuit 2M is hereinafter described. The resistors 2RS1 and 4RS1 provide a recharge path to ground for the capacitor 2RS. The circuit 2M is similar to the circuit 8BC1 except that the designations are different and the power is externally supplied. Terminal 4 is connected to ground potential at the left junction of the bridge 2V4, terminal 5 is connected to the +5 volt lead 2B1 and terminal 6 is connected to the −20 volt lead 2B2.

The counters 4VF and 7VG are stepped, by the vertical group, vertical file and reset pulses in synchronism with the counters 13VFC and 13VGC and with the counters 25VFR and 26VGR. As long as there are no service requests from any of the 60 subscriber lines 3L00–59 connected to concentrator 110, or a terminating call thereto, the twelve sets of counters, two in the central office and one in each of the line concentrators 110–9, synchronously step through the count of 60 with a reset pulse being supplied at the beginning of each cycle to insure synchronization.

At each combination of operated counter stages 7VG0–11 and 4VF0–4 a pulse is directed to scan one of the 60 lines 3L00–59 by the line scanning units 3LS00–59. Only line 3L00 and unit 3LS00 are shown in the line concentrator 110. Each of the line scanning unit 3LS00–59 has two gating circuit components, one controlled by the counters 4VF and 7VG and the other controlled by the condition of the associated line. The first gating circuit component which includes the varistor 3D functions as an enabling or readying component for the scanning unit.

The ring counter 7VG functions to successively ready groups of five line scanner units at a time by changing the reverse bias across the varistor 3D from −20 volts to −2 volts. When the stage 7VG0, for example, is set, a positive pulse is provided from the output terminal 2 thereof through lead 7L2, resistor 3VG of the line scanner units 3LS00–4 to the respective varistors 3D. The five varistors 3D in the units 3LS00–4 become biased to allow the passage of pulses from the ring counter 4VF through capacitors 3VF. The varistors 3D in the other 55 units 3LS05–59 are reversed-biased by the −20 volt potential at terminals 2 of stages 7VG1–11.

The ring counter 4VF provides scanning pulses successively to twelve line scanning units at a time. When stage 4VF0, for example, is set, a positive pulse is provided from the terminal 2 thereof to the capacitors 3VF in the units 3LS00, 3LS05, 3LS10, 3LS15, 3LS20, 3LS25, 3LS30, 3LS35, 3LS40, 3LS45, 3LS50 and 3LS55. Of these, only the unit 3LS00, however, has been readied at this time by the ring counter 7VG. The positive pulse from terminal 2 of relay 4VF0, therefore, is supplied through the capacitor 3VF of the unit 3LS00, varistor 3D and capacitor 3C to the varistor 3S. The varistor 3S is part of the second gating circuit component which is controlled by the line condition.

Each line has associated therewith a resistor 3GS, which is connected from the tip lead T of the line to the +5 volt lead 2B1, and a resistor 3ES, which is connected from the ring lead R of the line through the varistor 2ES to the —20 volt lead 2B2. If the subscriber line 3S00 is open, the —20 volts on lead 2B2 functions to reverse-bias the varistor 3S so that the scanning pulse from the ring counter 4VF is not transmitted through the varistor 3S. When, however, the subscriber line 3L00 is in a calling condition, with the line closed, a circuit is completed from lead 2B1 through resistor 3GS, substation 3S00, resistor 3ES and varistor 2ES to lead 2B2. The potential at the junction between varistor 3S and capacitor 3C becomes sufficiently positive to allow the scanning pulse from the ring counter stage 4VF0 to pass through the varistor 3S and lead 3SR to the input terminal 1 of a service request B amplifier 2SR.

The amplifier 2SR and the line busy amplifier 2LB, which is shown in detail, are B-type amplifiers similar to the B amplifier 8TPA, described above. The components are similar but the designations have first digit of 2 instead of 8 and the +5 volt and —20 volt source is supplied externally from leads 2B1 and 2B2, respectively, through terminals 3 and 4. The input terminal 1 of the amplifier 2SR is connected to a grounded varistor 2SRV. The varistor 2SRV, which is shunted by the resistor 2SRR, functions to couple negative pulses or potentials to ground.

The scanning units 3LS00–59 in this manner allow the vertical file pulses to pass through as a service request pulse, when both gating circuit components are enabled. The first component, which includes varistor 3D, is enabled by the counter 7VG, and the second component, which includes varistor 3S, is enabled when the associated line is closed.

The service request pulses from the amplifier 2SR are supplied over the control pairs 14CP1–3 to the central office. In this manner, the vertical file pulse from the counter 4VF is transformed by the scanning unit 3LS00 to a service request pulse and returned to the central office.

If line 3L00 is connected to one of the trunks 6T0–9, and is therefore in a busy condition, the varistor 3S, as is hereinafter described, is reverse-biased. The vertical file pulse from stage 4VF0 is then supplied by the unit 3LS00 to the central office through the line busy amplifier 2LB.

The sequence of operations for returning the line busy pulse, is hereinafter described, after the sequence of operations for establishing a connection from the line 3L00 to one of the trunks 6T0–9 is described.

If all the lines 3L00–59 remain idled, the scanning sequence continues under control of the three sets of pulses, the vertical group, the vertical file and the reset pulses from the central office. Each vertical group pulse readies five line scanning units and each vertical file pulse scans one of the five readied line scanning units. In this manner the five readied line scanning units are successively scanned by the five vertical file pulses which occur between two of the vertical group pulses. At the time position for the first vertical file pulse the vertical file pulse is actually omitted, as described above, and a reset pulse is transmitted from the central office to insure that the counters 7VG and 4VF are in the start position. The stage 4VF0, however, is turned on by the reset pulse and supplies a pulse to the scanning unit 3LS00.

*Originating call*

When a call is initiated at one of the substations 3S00–59, a vertical file pulse from the ring counter 4VF is transformed by the scanning units 3LS00–59 to a service request pulse. If the call originates at line 3L14, the scanning unit 3LS14 functions to provide the service request pulse. The service request pulse is supplied through the amplifier 2SR and resistor 3R8 to the lower primary winding of transformer 5T3. The lower primary winding of transformer 5T3 is shunted by the varistor 5D2 and connected through lead 5L4 to the —20 volt lead 2B2. The secondary of the transformer 5T3 is connected through the control pair 14CP3 to the transformer 14T3 in the concentrator control circuit 120. The lower primary winding of transformer 14T3 is connected through the resistor 14R7 to the input terminals 1 and 3 of the A amplifier 18SRL. The amplified service request pulse is supplied from the output terminal 2 of the amplifier 18SRL through the open inhibiting gates 18CH0 and 18SRS to the input terminal 1 of the flip-flop circuit 21HGT.

In this manner, the service request pulse, from the line concentrator 110, is transmitted over the control pair 14CP3 to set the horizontal group flip-flop circuit 21HGT in the concentrator control circuit 120. The circuit 21HGT in circuit 120 is associated individually with the concentrator 110, and indicates at the central office which of the concentrators 110–9 have originated the call.

The gate 18CH0 is normally open having the battery 18B1 connected through resistors 18R1 and 18R2 to its control terminal 3. The gate 18CH0 is closed when a flip-flop circuit 21HGS is set to indicate that the control circuit 120 is serving a call. The operation of the circuit 21HGS is hereinafter described. Its output terminal 2 is connected to the control terminal 3 of gate 18CH0 through leads 17ST, varistor 18D1 and resistor 18R2. Gate 18CH0 is also opened under control of a traffic recorder 134, shown in Fig. 9, which may of the type disclosed in the application of W. R. Young, Jr., Serial No. 455,154, filed on September 10, 1954. The traffic recorder 134 periodically records the line conditions during a scanning cycle. When the traffic recorder 134 is recording, it provides an inhibiting potential through lead 18TR, varistor 18D2 and resistor 18R2 to the control terminal 3 of gate 18CH0. Periodically, therefore, the control circuit 120 is insensitive for a scanning cycle to service requests from the concentrator 110.

Returning now to the originating call sequence, when the flip-flop circuit 21HGT operates, it functions generally to stop the transmission of the vertical group pulses, but not the vertical file pulses to the concentrator 110, and to lock the register counters 25VFR and 26VGR, described above, to register the designation of the calling line. The vertical file pulses to the concentrator 110 are uninterrupted, so that the five lines in the vertical group, which includes the line requesting service, are scanned every 10 milliseconds. Each time the requesting line is scanned, another service request pulse is returned over the control pair 14CP3 to the central office. The successive detection of these service request pulses, as is hereinafter described, verifies the continuance of the service request. If a successive service request pulse is not detected it indicates that the service request has been abandoned. The successive detection feature prevents unnecessary central office equipment usages due to momentary closures on the line.

More specifically, the change from —20 volts to —2 volts at the output terminal 2 of the flip-flop circuit 21HGT performs the following functions:

(1) It opens the enabling gate 17VF to connect the reset pulses from the pulse generator 130 to the concentrator 110 as vertical file pulses. Reset pulses from the generator 130 are supplied through lead 8RS, gate 17VF, gate 17VFS, capacitor 17C2 and amplifier 17VFL to lead 17VF. The reset pulses are supplied as vertical file pulses because the vertical file pulse is blanked when the generator 130 supplies a reset pulse. To cyclically scan a vertical group, one vertical file pulse is provided for each of the five lines in the group. If the service request was initiated, for example at line 3L55, the vertical group counter 7VG is stopped, as is hereinafter described, at stage 7VG11. The next four vertical file pulses, following the service request, scan lines 3L56–9. The fifth vertical file pulse, however, is blanked, and the generator 130 provides a reset pulse instead. The reset pulse is made to function as the second and succeeding vertical file pulses for line 3L55. Successive detection of service requests is necessary at the central office so that the reset pulse is provided, in this manner, to the concentrator 110 as a vertical file pulse.

(2) Circuit 21HGT also opens the enabling gate 18SRC to direct subsequent service request pulses from the line concentrator 110 through the amplifier 18SRL, gate 18SRC, the B amplifier 22RLD1, capacitor 22C1, and the delay circuit 22RLD2 to the reset terminal 3 of the flip-flop circuit 22RL. The next service request from concentrator 110 indicates the continuation of the dial-tone request. As is hereinafter described, the circuit 22RL monitors the dial-tone request.

The delay circuit 22RLD2 is a monostable amplifier having transistors 22T1 and 22T2 connected in a hook arrangement. The output terminal 2 of amplifier 22RLD1 is connected through capacitor 22C1 and the input terminal 1 of circuit 22RLD2, directly to the base electrode of transistor 22T1, and also through the varistors 22V5 and 22V6 to the emitter electrode of transistor 22T1. The varistor 22V5 is reverse-biased by the capacitor 22C1, which is charged by the −20 volt battery, not shown, in amplifier 22RLD1. Varistor 22V6 is forward-biased by battery 22B7, which is connected thereto through resistor 22R5. Varistor 22V6 is also connected through capacitor 22C2 to battery 22B6, and to terminal 1 through resistor 22R4. The positive pulse provided by the differentiating capacitor 22C1 does not trigger circuit 22RLD2, as the emitter and base potentials are the same when varistor 22V5 is forward-biased. The trailing edge of the positive pulse from amplifier 22RLD1, however, provides a negative pulse to the base of transistor 22RLD2 causing circuit 22RLD2 to trigger. The delay provided for the second service request pulse is essentially the length of the pulse provided by amplifier 22RLD1, since the trailing edge thereof is utilized to trigger the circuit 22RLD2. Additional, though minor, delays are provided through the control pair 14CP3, but the additional delay provided by circuit 22RLD2 is necessary to allow for the complete operation of the flip-flop circuit 22RL. If the second service request pulse arrives during the triggering interval of circuit 22RL it is ineffective to reset the circuit 22RL, and results in an abandonment indication of the call. The emitter electrode of transistor 22T2 is connected to battery 22B7 through resistor 22R6 and to the output terminal 2. The succeeding service request pulses will be provided, in this manner, from the output terminal 2 of circuit 22RLD2 to the reset terminal 3 of the flip-flop circuit 22RL.

(3) Circuit 21HGT also closes the inhibiting gate 17VGS2 which blocks the vertical group pulsing from generator 130 to the line concentrator 110. The vertical group pulses were supplied to the concentrator 110 from the generator 130 through lead 13VG, the gates 17VGS2 and 17VGS1, amplifier 17VGL, lead 17VG, transformer 14T2 and the control pair 14CP2. At the concentrator 110 stage 7VG2 remains set when the service request is from line 3L14.

(4) Circuit 21HGT also closes the inhibiting gate 22RRG to block the reset pulses from resetting the ring counters 25VFR and 26VGR in the register 131. Reset pulses were supplied to the counters 25VFR and 26VGR from the generator 130 through lead 8RS, gate 22RRG and amplifier 22RR. As is hereinafter described, the register counters 25VFR and 26VGR remain set at the identity of the calling line.

(5) Circuit 21HGT also closes the inhibiting gate 17RS2 to block the transmission of the common reset pulses to the line concentrator 110 as reset pulses. Reset pulses were supplied to the concentrator 110 from generator 130 through lead 8RS, gates 17RS2 and 17RS1, capacitor 17C3, amplifier 17RL, lead 17RS, transformer 14T2 and control pair 14CP2. As described above, the reset pulses are supplied to concentrator 110 as vertical file pulses.

(6) Circuit 21HGT also causes the operation of the horizontal group relay 21HGT0 which is connected to battery 21B1.

(7) Circuit 21HGT also sets the flip-flop circuit 22RH, and closes the gate 22RH1. The output terminal 2 of circuit 21HGT is connected through varistor 17D3 to the input terminal 1 of circuit 22RH. Terminal 1 of circuit 22RH is also connected to battery 22B2 through resistor 22R2. The inhibiting gate 22RH1 provides a connection from the timing pulse lead 8TP, from generator 130, to the reset terminal 3 of the flip-flop circuit 22RH. Circuit 22RH is reset by the next timing pulse when the gate 22RH1 is open. With the gate 22RH1 closed, the timing pulses are not effective to reset circuit 22RH.

When the flip-flop circuit 22RH is set it performs a number of functions:

(1) It closes the inhibiting gates 22VGR and 22VFR to disconnect counters 25VFR and 26VGR from the generator 130 so that they register the identity of the calling line. The service request pulse is returned to the central office, and gates 22VGR and 22VFR are closed before the next vertical group or vertical file pulses are supplied from the generator 130. The register 131 remains set at the vertical group and vertical file identity of the service requesting line.

(2) It closes an inhibiting gate 18SRS in each of the concentrator control circuits 120–9. The gate 18SRS opens the input lead to the flip-flop circuit 21HGT. Circuit 21HGT in the concentrator control 120 however, remains set until a reset pulse is applied thereto. The inhibiting gate 18SRS remains closed until the central office is normal and ready to accept other service requests. It is possible that more than one of the circuits 21HGT will be set simultaneously as a resut of a coincidence in service requests from corresponding numbered lines at different concentrators. In such a case, the decision as to which of the concentrators 110–9 to be served is left to the marker 140, as it would normally decide which horizontal group to serve. It is impossible to have more than one circuit 21HGT operated due to differently numbered lines at different concentrators because they are scanned at different times. When the first circuit 21HGT operates, it insensitizes the others to service requests.

To briefly recapitulate, the effect of a service request pulse from the line concentrator 110 is to operate the flip-flop circuit 21HGT which stops the register counters 25VGR and 26VFR and the transmission of vertical group pulses to the line concentrator 110. It also stops the transmission of reset pulses to the line concentrator 110 as reset pulses, but sends them as vertical file pulses to the line concentrator 110. This is necessary since the generator 130 does not provide a vertical file pulse for line 3L00 and the reset pulse functions to provide a scanning pulse therefor at the concentrator 110. The generator 130 will provide a reset pulse as a vertical file pulse to the concentrator 110 once each 120-millisecond cycle.

When relay 21HGT0 operates, it connects the −20 volt battery 25B1 to one side of the windings of five relays 25VFT0–4. The windings of relays 25VFT0–4 are also connected, respectively, through the varistors 25V0–4 to the output terminals 2 of the stages 25VFR0–4 in the counter 25VFR. When relay 21HGT0 operates, it also connects the battery 26B1 through its contact 25-(21HGT0), to the windings of the twelve relays 26VGT0–11. The windings of relays 26VGT0–11 are connected, respectively, through the varistors 26V0–11 to the output terminals 2 of the stages 26VGR0–11. With the counters 25VFR and 26VGR stopped on the line location of the calling subscriber, a —2 volt potential is on the other side of the winding of one of the relays 25VFT0–4, and on the other side of the winding of one of the relays 26VGT0–11 causing them to operate. If the line 3L14 is the originating line, relays 25VFT4 and 26VGT2 are operated.

When one of the relays 25VFT0–4 operates, it closes a path from the corresponding one of stages 13VFC0–4 in generator 130 to the input terminal 1 of the flip-flop circuit 22RL. The output terminals 2 of stages 13VFC0–4 are connected, respectively, through capacitors 13C11–15, shunted to ground through resistors 13R19–23 to the contacts 13(25VFT0–4). With the relay 25VFT4 operated, when the stage 13VFC4 is set, a pulse is provided through contact 13(25VFT4), lead 17L5 and the varistor 22D3 to set the flip-flop circuit 22RL. The terminals of varistor 22D3 are connected to ground through the resistors 22R7 and 22R8. If the circuit 22RL remains set, it resets the circuit 21HGT to return the central office to normal.

The pulse generator 130 continues to supply the reset, vertical group and vertical file pulses. As described above, however, the only pulses that are sent to the line concentrator 110 are the vertical file pulses. Every time the vertical file pulse corresponding to the calling subscriber is sent, which is once every 10 milliseconds, a service request pulse is returned to the central office. As described above, the service pulse is supplied through the B amplifier 18SRL, the open gate 18SRC, the B amplifier 22RLD1 and delay circuit 22RLD2 to the reset terminal 3 of the flip-flop circuit 22RL. The circuit 22RL is set by the vertical file pulse corresponding to the calling line from counter 13VFC, and is reset by the service request pulse which is delayed by the circuit 22RLD2. If the subscriber abandons the call, and the succeeding service request pulses are not received, circuit 22RL remains set, keeping the enabling gate 22RL1 open, to allow the next timing pulse, through lead 8TP, to pass through gates 22RL1 and 21RL, capacitor 21C1, and the amplifier 21HGTA to reset the flip-flop circuit 21HGT.

The amplifier 21HGTA is of the type described in the copending application of Baker-Sumner, Serial No. 495,312, which was filed on March 18, 1955. The amplifier 21HGTA provides a relatively long pulse, having a duration of approximately 1000 microseconds to the reset terminal 3 of circuit 21HGT. A long pulse is required, when service denial is provided, to inhibit the circuit 21HGT during the time the denial is being established. The service denial feature is hereinafter described.

The pulse through gate 21RL and capacitor 21C1 is supplied through resistor 21R1 and capacitor 21C5 to the emitter electrode of transistor 21T2. Transistor 21T2 is connected in a hook arrangement with the transistor 21T1. The emitter electrode of transistor 21T2 is also connected through the relatively large resistor 21R3 to battery 21B1. The resistor 21R3 is large to allow for the provision of a long duration pulse. The resistor 21R1, together with resistor 21R2 and varistor 21D1, determine the sensitivity of the amplifier 21HGTA and prevent triggering due to minor disturbances. The varistor 21D1, which is connected between ground and battery 21B1, is normally forward biased. When a positive pulse is supplied to the amplifier 21HGTA, the varistor 21D1 becomes reverse biased to allow the emitter potential to increase.

The amplifier 21HGTA is a monostable trigger circuit, and includes pulse duration control elements which fix the termination point of the output pulse. A battery 21B3 is connected through resistor 21R7 and varistor 21D4 to the base electrode of transistor 21T1. The varistor 21D4 prevents negative excursions of the base potential below the clamping potential determined by battery 21B3. With the base potential clamped, in this manner, variation in the current amplification factor of the transistors 21T1 and 21T2 does not vary the termination point of the pulse. The resistor 21R7 is also connected to ground through resistor 21R8 and also capacitor 21C3. The base electrode of transistor 21T1 is also connected to the emitter electrode of transistor 21T2 through varistors 21D3 and 21D2, and to ground through resistor 21R6 and also through resistor 21R5 and the emitter capacitor 21C4. The emitter capacitor 21C4 partially determines the pulse duration. The output from the amplifier 21HGTA is supplied from the emitter of transistor 21T1 which is also connected to battery 21B2 through resistor 21B2.

The amplifier 21HGTA supplies the long pulse to the reset terminal of circuit 21HGT. When the flip-flop circuit 21HGT is reset, it causes the release of the relay 21HGT0, which, in turn, releases the operated ones of the relays 25VFT0–4 and 26VGT–11. When circuit 21HGT is reset, it also restores the various gates to their normal scanning condition. The next reset pulse from the generator 130 causes the counters 25VFR and 26VGR in the central office, and the counters 4VF and 7VG in the line concentrator 110, to return to normal, and another line scan starting with line 3L00 is started.

With the assurance however that there is a constant dial-tone request, the call proceeds in a normal manner. The successive detection of the service request pulses verifies the continuance of the request, since the succeeding service request pulses reset the circuit 22RL to disable the gate 22RL1. With gate 22RL1 open, the timing pulses from generator 130 do not pass to reset the circuit 21HGT.

As described above, when relay 21HGT0 operates, it in turn causes one of the relays 25VFT0–4 and one of the relays 26VGT0–11 to operate. When relay 21HGT0 operates, it also provides an indication of the horizontal group to a line link marker connector 135. Each of the concentrators 110–9, or concentrator control circuits 120–9, represents a horizontal group. There are ten relays 21HGT0–9, one in each of the ten circuits 120–9, so that when contact 15(21HGT0) closes an indication of the horizontal group 0, or line concentrator 110, is provided to the marker connector 135. The marker connector 135 and other functional circuits shown in Fig. 15, are of the type described in the above-identified patent to A. J. Busch.

When one of the relays 26VGT0–11 operates, it provides an indication through its contact 15(26VGT0–11) to the marker connector 135 of the vertical group identity which also functions as a start signal for the marker 140.

When the marker 140 is seized, it receives from the line link marker connector 135 the vertical group and horizontal group identity of the calling line and concentrator, respectively. The marker 140 seizes the line link connector 136 which is associated with the line link frame 141 associated with the ten concentrators 110–9. As described above, the ten concentrators 110–9 are connected by the ten sets of trunks 6T0–9 to the central office. At the central office, the ten sets of trunks 6T0–9 are connected, respectively, through the ten auxiliary crossbar switches 10CR0–9 of the primary of the line link frame to the ten crossbar switches 15CR0–9 of the secondary or junctor of the line link frame. Of the switches 10CR0–9, only the switch 10CR0 is shown. The switch 10CR0 is individually associated with the line concentrator 110, the other nine switches 10CR1–9, not shown, and their associated magnets are similar to the switch 10CR0. The other switches 10CR1–9 are included in the box 1200, shown in Fig. 12. The trunk connections from box 1200 to the concentrators 111–9, shown in Fig. 18, are not shown. In general, the line link or relay control equipment in Figs. 10, 11 and 12, which is to the left of the cable 10C, is individual to the concentrators and the equipment which is illustrated to the right of the cable 10C is common equipment. In the general description above, the switches 10CR0–9 and 15CR0–9 are considered part of the frame 141 and the rest of the equipment is part of a relay control and selector circuit 143.

When the line link connector 136 is seized, it operates a number of relays, as hereinafter described, to initiate the selection of one of the ten trunks 6T0–9 which connect the line concentrator 110 with the central office. The connector 136 also initiates an outpulsing operation over the three control paths 14CP1–3 to the concentrator 110 in order to establish a connection from the calling line 3L14 to the selected trunk.

When the line link connector 136 is seized, it operates one of the horizontal group relays 14HA0–9, the dial-tone relay 14D and one of the vertical group relays 14VG0–11. When the call is originating from the line 3L14 terminating at the concentrator 110, the horizontal group relay 14HA0 and the vertical group relay 14VG2 are operated. When the horizontal group relay 14HA0 operates, it supplies the vertical file identity to the marker 140 through the line link connector 136. The vertical file information is supplied over an operating path from ground through the operated contact 15(25VFT4) and the operated contact 15(14HA0) to the line link connector 136. The operation of relay 25VFT4 in the originating register 131, as described above, readied this path for supplying the vertical file information to the connector 136.

When the marker 140 receives the vertical file information, it causes the line link connector 136 to operate a corresponding one of the vertical file relays 14VF0–4. In the example described above, with the call being initiated from line 3L14, the vertical file relay 14VF4 is operated. The operation of the four relays 14HA0, 14VG2, 14VF4 and 14D gives the identity of the calling line and the concentrator and also the information that the call is an originating or dial-tone call. The operation of relays 14HA0 and 14VG2 indicates the class of service to the marker 140. Ground is connected through contacts 15(14VG2) and 15(14HA0), the class-of-service connection, and cable 15C to the connector 136.

When the horizontal group relay 14HA0 operates, it also supplies a connection from the windings of relays 10SM0–9 and from the sleeve lead of the horizontals or links 10L0–9 of the switch 10CR0 to the line link connector 136. For example, the winding of the select magnet 10SM9 is connected through the operated contact 10(14HA0), lead 15SM9 and cable 15C to the line link connector 136. The sleeve lead of the horizontal or link 10L9 of switch 10CR0 is connected through the operated contact 10(14HA0), the normal contact 10(16TC), lead 15LL9 and cable 15C to the line link connector 136. The sleeve lead is also connected to the line link connector 136 directly through contact 10(14HA0), lead 15LB0 and cable 15C. The ten sleeve leads of the switch 10CR0 can now be tested through leads 15LB0–9 for idle or busy condition by the marker 140. When, as is hereinafter described, the marker 140 selects an idle one of the horizontals 10L0–9, it operates the associated one of the select magnets 10SM0–9 by providing a ground connection on one of the leads 15SM0–9.

When relay 14D is operated, it in turn causes the operation of the trunk connect relay 16TC. The operating path for the relay 16TC is from battery 16B1 through the lamp 16TSL, the operated contact 16(14D), the serially connected normal contacts 16(16TS0–5) and the normal contact 16(14CBF) to the winding of relay 16TC. There are six trunk selecting relays 16TS0–5 which establish the trunk preference.

When the trunk connect relay 16TC operates, it opens the connection from the line link connector 136 through leads 15LL0–9 to the sleeve lead of the crossbar switch 10CR0 and grounds the leads 15LL0–9. The relay 16TC, however, remains operated only for a brief interval until one of the trunk selecting relays 16TS0–5 is operated. When any of the relays 16TS0–5 operates, it opens the operating path for the relay 16TC causing it to release, so that the connection from leads 15LL0–9 to the sleeve leads is soon reestablished.

When relay 16TC operates, it generally causes the operation of six trunk preference, or trunk select, relays 16TS0–5. The windings of relays 16TS4 and 16TS5 are connected directly to the contacts 11(16TC), and the windings of relays 16TS0–3 are connected, respectively, through the operated contact 16(14VG2) in accordance with the table shown in Fig. 29 to contacts 11(16TC). Fig. 29 indicates the contacts of the relays 14VG0–4 which are connected to the winding of relays 16TS0–3. For relay 14VG2, for example, contact 6 is connected to the winding of relay 16TS0, contact 2 is connected to the winding of relay 16TS1, contact 1 is connected to the winding of relay 16TS2, and contact 5 is connected to the winding of relay 16TS3. The contact numbers indicate the association with the trunks 6T0–9. Contact 6, for example, indicates the connection is for trunk 6T6. The eight contacts 1–8, to which the windings of relays 16TS0–3 are connectable, are in turn individually connected to eight contacts of relay 16TC. The windings of relays 16TS4–5 are also connected to contacts of relay 16TC, so that ten contacts of relay 16TC are utilized for establishing operating paths to the windings of relays 16TS0–5. Each of these ten contacts of relays 16TC is connected to one of the batteries 10B0–9. When relay 16TC operates, it extends, respectively, the paths from the windings of relays 16TS0–5 through the operated contacts 11(14HA0), the normal contacts 10(10SR0–9) and the resistors 10TS0–9 to the batteries 10B0–9. Since there are only six trunk select relays 16TS0–5, only six such connections are established. With relay 14VG2 operated, the windings of relays 16TS0–5 are connected, respectively, through the resistors 10TS6, 10TS2, 10TS1, 10TS5, 10TS8 and 10TS9 to the associated ones of the batteries 10B0–9. The windings of the six relays 16TS0–5 are, in this manner, respectively connected through the normal contacts of six of the slow release relays 10SR0–9 (10SR6, 10SR2, 10SR1, 10SR5, 10SR8 and 10SR9). The windings of relays 16TS4 and 16TS5 are always connected through the normal contacts of relays 10SR8 and 10SR9, and the windings of the other four relays 16TS0–3 are connected through normal contacts of four of the eight slow release relays 10SR0–7. The operation of the vertical group relays 14VG0–11 determines which four of the relays 10SR0–7 are to be utilized.

There is one set of slow release relays 10SR0–9 for each of the ten crossbar switches 10CR0–9. The operation of the relays 14HA0–9, as described above, determines which one of the crossbar switches 10CR0–9 is to be utilized to service the call. The relays 10SR0–9 are normal when the associated trunks 6T0–9 are idle because trunks 6T0–9 are connected to the verticals of the switch 10CR0. If trunk 6T6, for example, is busy, the hold magnet 10HM6 is operated, and a path is completed through the operated contact of relay 10HM6 for the relay 10SR6. With the relay 10SR6 operated, the operating path for the trunk select relay 16TS0, through the normal armature of relay 10SR6, is not completed. In this manner, the trunk select relays 16TS0–5 are operated upon the operation of relay 16TC only if the associated ones of the trunks 6T0–9 are idle. With all trunks 6T0–9 idle, as described above, all six trunk select relays 16TS0–5 are operated.

There are ten relays 10SR0–9, as described above, that are utilized, and only six trunk select relays 16TS0–5. The contacts of relays 10SR0–9 that are not connected to the windings of one of the relays 16TS0–5 are connected to one of the four resistors 16E–H. The resistors 16E–H terminate the connections from the four non-used contacts of relays 10SR0–9. Fig. 29 illustrates the connections of resistors 16E–H to the contacts of relays 14VG0–11. The resistors 16E–H function as locking paths for the four non-used ones of relays 10SR0–9. The paths through the windings of relays 16TS0–5 function as locking paths for the other six of relays 10SR0–9. The locking paths are utilized during the trunk selection operation to prevent the release of any operated ones of relays 10SR0–9 until the trunk selection operation is completed. When one of the hold magnets 10HM0–9 is released, the associated one of relays 10SR0–9 therefore remains operated during the trunk selecting operation. It is necessary to hold up the release of an operated one of relays 10SR0–9 to prevent sending a disconnect signal to the concentrator 110.

As described above, the windings of relays 16TS0–5 are connected through contacts of six of the ten relays 10SR0–9 which are associated individually with the trunks 6T0–9. The six associated ones of the ten trunks 6T0–9 are referred to as being in the same multiple. At the line concentrator 110, the calling line 3L14 is connectable to any one of the six trunks in the multiple but not to the other four. Fig. 30 illustrates the possible connections from line to trunk. For the line 3L14, for example, a connection may be established to any one of the trunks 6T1, 6T6, 6T2, 6T5, 6T8 and 6T9. A connection cannot be established from line 3L14 to any one of the trunks 6T3, 6T4, 6T7 and 6T0.

If all six trunks of the multiple are idle, all six relays 16TS0–5 are operated when relay 16TC operates. The relays 14VG0–11 effectively determine the multiple at the central office just as the line circuit connections do, as hereinafter described, at the concentrator 110. It is necessary, of course, for the multiple at each end to be the same.

When any one of the relays 16TS0–5 operates, it opens the operating path through its normal contact for the relay 16TC, causing it to release. When the relay 16TC releases, it in turn releases all except one of the relays 16TS0–5. The operated one of the relays 16TS0–5, which has the lowest designation, remains operated and the others release. When all six relays 16TS0–5 were operated, the release of relay 16TC in turn releases relays 16TS1–5 with the relay 16TS0 remaining operated. When relay 16TS0 operates, it locks to battery 16D1 through its operated contact and the closed contact 16(14D). In this manner, when relay 16TC releases, only one of the six trunk select relays 16TS0–5 remains operated. When the trunk select relay 16TS0 operated, it opened the locking paths for the other five trunk select relays 16TS1–5.

The relays 16TS0–5 provide for the preference selection of the six trunks connectable to the calling line 3L14. When relay 16TS0 is operated, it indicates that the preferred trunk, which is connectable to the calling line, is idle, and that a connection is to be established thereto. When the call is initiated at the subscriber line 3L14, the preferred trunk is trunk 6T6, as shown in Fig. 30. In the preference column of Fig. 30, the preference is from left to right. For line 3L14 the trunk preference is 6, 2, 1, 5, 8, 9.

During the time that the trunk selecting sequence of operation occurs, the marker 140 selects an idle connection through the trunk link frame 142 and switches 15CR0–9 to one of the horizontals or links 10L0–9 of the crossbar switch 10CR0. If the horizontal 10L9 is utilized, the line link connector 136 closes an operating path through cable 15C, lead 15SM9, and the contact 10(14HA0) to the winding of the select magnet 10SM9 causing it to operate and switch 15CR0 is operated. With only one of the trunk selecting relays 16TS0–5 operated, when the select magnet 10SM9 is operated, an operating path is provided for the trunk relay 16TSK. The operating path for relay 16TSK is from ground through the operated contact 16(10SM9), the normal contact 16(16TC), the operated contact 16(16TS0), the serially connected normal contacts 16(16TS1–5) and the winding of relay 16TSK to battery 16B2. Relay 16TSK, is this manner, operates after the completion of the selection of the preferred idle one of the trunks 6T0–9 by the relays 16TS0–5 and after the selection of an idle one of the links 10L0–9 by the operation of one of the select magnets 10SM0–9.

When relay 16TSK operates, it readies a path from the +100 volt marking battery 12B2 to the tip lead of the selected trunk 6T6. The operating path for supplying the connect potential is completed when the relay 16CT1 operates.

In this manner, when the marker 140 selects an idle one of the links 10L0–9, a path is readied to a preferred idle one of the six trunks connectable to line 3L14. If the switches 10CR0–9 are not utilized and the trunks 6T0–9 are connected directly to the links 10L0–9, random slip multipling cannot be utilized without substantially modifying the marker 140. Since the marker 140 selects any one of the idle links each trunk would have to be connectable to each line. By utilizing the switches 10CR0–9, trunk multipling is available with the accompanying reduction in the number of crosspoints. In addition, by utilizing the switches 10CR0–9, the crosspoints may be locked, so that outpulsing is unnecessary, as is hereinafter described, to establish a call-back connection. Relay 16CT1 is operated upon the completion of the outpulsing operation by the line selection and test circuit 132. The outpulsing sequence of operation is concurrent with the trunk selection sequence of operation described above. The outpulsing sequence is initiated when the connector 136 supplies the line and concentrator identification from the marker 140. When the connector 136 operates one of the horizontal group relays 14HA0–9, one of the vertical group relays 14VG0–11, one of the vertical file relays 14VF0–4, and either the dial-tone relay 14D or the terminating call relay 14TER, a path is readied for operating the flip-flop circuit 21HGS in the control circuit 120. The readied path is from ground through any one of the three normal contacts 21(16CT1), 21(16LB1) or 21(14TER), the operated contact 21(14D), the operated contact 21(14VF4), the operated contact 21(14VG2) and the operated contact 21(14HA0) to the control terminal 3 of the enabling gate 21HG. The enabling gate 21HG is normally closed due to the connection from the −20 volt battery 21B7 through the resistor 21R10 to the control terminal 3 of gate 21HG. The relays 14HA0–9 determine which one of the ten control circuits 120–9 is to be utilized and the vertical file relays 14VF0–4 and vertical group relays 14VG0–11 are multiplied to function merely as a check that one of each set is operated. In other words, when one of the twelve vertical group relays 14VG0–11 and one of the five vertical file relays 14VF0–4 is operated, a path is ready for opening the horizontal group gate 21HG. The same readying path, which is completed for opening the gate 21HG, also closes the inhibiting enabling gate 21HGR3. The inhibiting gate 21HGR3 is part of a reset path for the line select and test circuit 132 which is utilized after the outpulsing operation is completed. The reset path for the circuit 132 also includes an enabling gate 21HGR1 which is kept open as long as any component of the circuit 132 has not been released. The input terminals 1 of the gates 21HG and 21HGR3 are connected through the lead 8TP to the scanner pulse generator 130. After the gate 21HG is opened, the next timing pulse supplied from the scanner pulse generator 130 passes through the gate 21HG to set the flip-flop circuit 21HGS. There is one enabling gate 21HG in each of the concentrator control circuits 120–9. Only the gate 21HG in the circuit 120, however, has been opened, as described above, due to the selective operation of the horizontal group relay 14HA0. Only the flip-flop circuit 21HGS in the concentrator control circuit 120 therefore is set when the line link frame is seized by the marker 140.

The flip-flop circuit 21HGS switches the vertical file, vertical group and reset pulse paths to the control leads 14CP1-3 to come from the line selection and test circuit 132 instead of from the scanner pulse generator 130. More specifically, when the circuit 21HGS is set, it accomplishes the following functions:

(1) The circuit 21HGS opens the enabling gate 17VFT and closes the inhibiting gate 17VFS. The open enabling gate 17VFT provides a connection from the line selection and test circuit 132 through the lead 19VF to the vertical file amplifier 17VFL. The inhibiting gate 17VFS provided a connection from the scanner pulse 130 through the lead 8VF to the amplifier 17VFL. As described above, when the service request pulse is received at the concentrator control circuit 120, the vertical group and reset pulses are stopped, but the vertical file pulses are continued. When the flip-flop circuit 21HGS is set and closes gate 17VFS, the vertical file pulses are also stopped. Until the gate 17VFS is closed, the vertical file pulses are supplied from the scanner pulse generator 130 through the concentrator control 120 to the concentrator 110.

(2) The circuit 21HGS opens the enabling gate 17VGT and closes the inhibiting gate 17VGS1. The control terminals 3 of the gates 17VGT and 17VGS1 are connected through the lead 17ST to the output terminal 2 of the flip-flop circuit 21HGS. The enabling gate 17VGT now provides a connection from the line selection and test circuit 132 through the lead 19VG to the B amplifier 17VGL through the capacitor 17C4. The inhibiting gate 17VGS1 provided a connection from generator 130 through the lead 8VG to the amplifier 17VGL.

(3) The circuit 21HGS also supplies a control potential through lead 17ST to the control terminal 3 of the enabling gate 17RST and the inhibiting gate 17RS1. The open gate 17RST provides a connection from the line section and test circuit 132 through lead 17RS to the amplifier 17RL. The inhibiting gate 17RS1 provided a connection from the scanner pulse generator 130 through lead 8RS to the amplifier 17RL. As described above, the amplifiers 17VFL, 17VGL and 17RL are connected, respectively, through the leads 17VF, 17VG and 17RS to the primaries of the transformers 14T1-3, the secondaries of which are connected to the control paths 14CP1-3.

(4) The circuit 21HGS also provides a control potential through lead 17ST to the control terminal 3 of the enabling gate 17M causing it to open. The enabled gate 17M provides a connection from the line selection and test circuit 132 through lead 19M to the B amplifier 17ML. The output terminal 2 of the amplifier 17ML is connected through lead 17M to the lower primary of the transformer 14T1. The lower primary of the transformer 14T1 is shunted by varistor 14D2.

In this manner, when the circuit 21HGS is set, it readies a mark pulsing path from the line selection and test circuit 132 to the line concentrator 110. As is hereinafter described, when mark pulses are supplied to the concentrator 110, a connection is completed from the calling line 3L14 to the selected trunk 6T6.

(5) The flip-flop circuit 21HGS also opens the enabling gate 18LBT to allow any line busy pulse from the line concentrator 110 to be directed to the line selection and test circuit 132.

(6) The circuit 21HGS also closes the inhibiting gate 21RL to prevent the release of the circuit 120 due to the absence of a service request pulse. As described above, when a service request pulse is not received after the operation of the flip-flop circuit 22RL by the vertical file pulse, the flip-flop circuit 21HGT is reset to release the concentrator control 120 as an indication of an abandoned call. When the flip-flop circuit 21HGS is set therefore switchhook supervision is ignored. Until circuit 21HGS is set, the absence of a service request pulse indicates an abandoned call, and circuit 120 is released.

(7) The output terminal 2 of the flip-flop circuit 21HGS is also connected through leads 17ST and 18HGS to the traffic recorder 134. The change in potential from −20 volts to −2 volts on lead 18HGS indicates to the traffic recorder circuit 134 that the concentrator control circuit 120 has switched the connections from the scanner pulse generator 130 to the line selection and test circuit 132.

(8) The change in potential upon leads 17ST and 18HGS is also provided through varistor 18D1 and resistor 18R2 to the control terminal 3 of the inhibiting gate 18CH0. The gate 18CH0 is part of a service request path from amplifier 18SRL to the circuit 21HGT. The service request path was opened when circuit 21HGT was set and gate 18SRS opened. The gate 18SRS is also part of the service request path. Once the circuit 21HGS is set, therefore, the control circuit 120 is insensitive to service requests even though circuit 21HGT is reset to reopen gate 18SRS.

(9) The output terminal 2 of circuit 21HGS is also connected through varistor 21D14 to the control terminal of the enabling gate 21HGR1. As described above, the gate 21HGR1 is part of a path from the timing pulse lead 8TP to the reset lead 21L4 which is connected to the line selection circuit 132. The gate 21HGR3, however, which is also part of the path from lead 8TP remains open until the line link frame is released by the marker 140. The gate 21HGR1 remains closed as long as circuit 21HGS or circuit 132 is not reset or normal.

(10) Finally, when the circuit 21HGS is set, it in turn sets the flip-flop circuit 20ST through the lead 17ST to commence the outpulsing sequence in the line selection and test circuit 132.

When the flip-flop circuit 20ST is set, it opens the read-in enabling gate 20RI2, it opens the enabling gate 20STG and it closes the inhibiting gate 20SP1. All three gates 20SP1, 20RI2 and 20STG are included in signal paths from the scanner pulse generator 130 through the timing pulse lead 8TP. In other words, the timing pulse lead 8TP from the scanner pulse generator 130 is connected to the input terminals 1 of the three gates 20SP1, 20RI2 through gates 20RI1, and 20STG.

When the flip-flop circuit 20ST is set to open gates 20RI2 and 20STG and close gate 20SP1, it also functions as a reset pulse through the capacitor 20C1 to the flip-flop circuits 20R1, 20RHG, 19VFL, 19LB, 19CTA and 19VFLD and is also sent out through capacitor 19C1, diode 19D3, lead 19RS, gate 17RST and amplifier 17RL to lead 17RS. When the flip-flop circuit 20ST is set, therefore, it insures that the line selection and test circuit 132 is normal and ready to begin outpulsing and it provides a reset pulse to the line concentrator 110 to reset the ring counters 7VG and 4VF. The reset pulse from the line selection circuit 132 is provided through lead 17RS, transformer 14T2, control pair 14CP2, transformer 5T2, amplifier 5RS, lead 5L6, capacitor 2RS, lead 2L4 to the ring counters 7VG and 4VF. When circuit 20ST is set, therefore, it in turn resets the concentrator counters 4VF and 7VG. It is necessary to reset the counter 4VF because it may have been stopped at any vertical file when gate 17VFS was opened by circuit 21HGS.

Terminal 3 of the flip-flop circuit 20RI is connected to battery 20B1 through the resistor 20RI.

With the gate 20STG opened by the circuit 20ST, the next timing pulse from the generator 130 is supplied through the gate 20STG to the input terminal 1 of the read-in flip-flop circuit 20RI. When the flip-flop circuit 20RI is set, the line selection and test circuit 132 is ready for reading-in or supplying the vertical file and vertical group information, respectively, into the counters 24VFP and 23VGP. The flip-flop circuit 20RI opens the gates 20SP2 and 20RI1 and provides an additional control potential through varistor 19D18 for the gate 21HGR1 which was opened, as described above, when the flip-flop circuit 21HGS was set.

The timing pulses from the scanning pulse generator 130 are supplied directly through lead 8TP to the line selection and test circuit 132 and to the originating register 131. The leads 8RS, 13VF and 13VG from the generator 130 are connected to the ten concentrator control circuits 120–9 and to the originating register 131, but not to the line selection and test circuit 132. The entire outpulsing operation which occurs in the line selection and test circuit 132 is under control solely of the timing pulses through lead 8TP. The timing pulses as described above and as shown in Fig. 28 are spaced at intervals of 2 milliseconds. The operation of the line selector and test circuit 132, in effect, steers the timing pulses from lead 8TP to the concentrator 110 to function first as vertical file and vertical group pulses, and then as a series of mark pulses to complete the establishment of the connection from the calling line 3L14 to the selector trunk 6T6.

As described above, when the read-in flip-flop circuit 20RI is set, the selector and test circuit 132 is readied to read in the vertical file and vertical group information to the counters 24VFP and 23VGP. After circuit 20RI is set, the next timing pulse through lead 8TP is supplied through the open enabling gates 20RI1 and 20RI2 to the read-in B amplifier 20RIA. The amplified timing pulse from the amplifier 20RIA performs the following functions:

(1) The amplified timing pulse is supplied to the concentrator 110 to insure the resetting of the counters 7VG and 4VF to line 3L00. The counters 7VG and 4VF were reset, as described above, upon the operation of the flip-flop circuit 20ST. The amplified timing pulse from amplifier 20RIA insures the resetting of counters 4VF and 7VG. The amplified timing pulse is supplied from terminal 2 of the amplifier 20RIA through lead 17L6, varistor 19D13, lead 19RS, gate 17RS2, amplifier 17RL, lead 17RS, transformer 14T2, control pair 14CP2, transformer 5T2, reset amplifier 5RS, lead 5L6, capacitor 2RS and lead 2L4 to the ring counters 7VG and 4VF.

(2) The amplified timing pulse is utilized to read in the vertical file and vertical group information to the coutners 24VFP and 23VGP. The vertical group counter 23VGP and the vertical file counter 24VFP are not really ring counters. The individual stages are the same as the stages of the ring counters 13VFC and 13VGC, described above, but after the last stage 23VGP11 is turned on, the next pulse does not turn on the stage 23VGP0. In a similar manner after the last stage 24VFP4 has been turned on, the next pulse does not turn on the stage 24VF0. The output of the stages 23VGP11 and 24VFP4 performs other functions as hereinafter decsribed.

The counters 23VGP and 24VFP are set by pulses which are supplied, respectively, through one of the enabling gates 23VG0–11 and one of the enabling gates 24VF0–4. The output terminal 2 of amplifier 20RIA is connected to the input terminals 1 of gates 24VF0–4 and 23VG0–11. The gates 23VG0–11 and 24VF0–4 are selectively opened under control of the relays 14VF0–4 and 14VG0–11, described above.

The control termianls 3 of gates 24VF0–4 are connected, respectively, through resistors 24R1–4 and 24R0 to the —20 volt battery 24B2, and the control terminals 3 of gates 23VG0–11 are connected, respectively, through resistors 23R0–11 to battery 23B2. The gates 24VF0–4 and 23VG0–11 are, therefore, normally closed. Each of the control terminals 3 of gates 24VF0–4 and 23VG0–11 is also connected to one of the contacts 24(14VF0–4) and 23(14VG0–11) which were operated when the line link frame was seized by the marker 140. The vertical file enabling gate having a designation of one less than that of the registered vertical file indication is opened. When relay 14VF4 is operated, the enabling gate 24VF3 is opened by the connection of ground to its terminal 3 through the closed contact 24(14VF4). The enabling gate having a designation of one less than that of the vertical file of the calling subscriber is opened instead of the enabling gate having the same designation, because, as is hereinafter described, one less pulse than the number of pulses corresponding to the vertical file are supplied to the concentrator 110 by the counter 24VFP. The last vertical pulse is not sent from the counter 24VFP, but is supplied from a flip-flop circuit 19VFL. The vertical group relay 14VG2, however, opens its corresponding enabling gate 23VG2 and not one having a smaller designation. The terminal 3 of the enabling gate 23VG2 is connected to ground through the closed contact 23(14VG2).

The amplified read-in pulse from amplifier 20RIA is therefore supplied through the open gates 24VF3 and 23VG2 to the associated counter stages 24VFP1 and 23VGP9. The counters 24VFP and 23VGP are set to count a number of pulses corresponding, respectively, to one less than the vertical file and to the vertical group. With a vertical file of 4, the stage 24VFP1 is set so that a count of 3 will turn on the last stage 24VFP4. With a vertical group of 2, the stage 23VGP9 is set so that a count of 2 will turn on the last stage 23VGP11.

The read-in pulse provided through the enabling gate 23VG2 is also provided through the operated contact 23(26VGT2), shunted to ground through resistor 24R6, the enabled gate 24VFC4, the operated contact 24(25VFT4), shunted to ground through resistor 20RG2 to the input terminal 1 of circuit 20RHG. The relays 26VGT2 and 25VFT4 were operated, as described above, when the calling line identity was registered by register 131. The gate 24VFC4 was opened when relay 14VF4 operated. The control terminals 3 of the five gates 24VFC0–4 are connected, respectively, to contacts 24(14VF0–4). When circuit 20RHG is set by the read-in pulse it provides an additional enabling potential through varistor 19D27 to the gate 21HGR1 and it provides a potential source for supplying an indication of the establishment of a dialing connection to the traffic recorder 134. The path to the recorder 134 is completed, as is hereinafter described, when the dialing connection is completely established.

When circuit 20RHG is set, it also provides an enabling potential through lead 21RHG to the gate 21HGR2. With gate 21HGR2 open, a path is readied for resetting circuit 21HGT when circuit 120 is returned to normal.

Only one timing pulse is supplied through the read-in amplifier 20RIA and the gates 24VF3 and 23VG2 to the counters 24VFP and 23VGP. The read-in pulse supplied through the amplifier 20RIA also resets the flip-flop circuit 20ST which disables the read-in path to the counters 24VFP and 23VGP by disabling the gate 20RI2. When the flip-flop circuit 20ST is reset, it also opens the gate 20SP1, and closes the gate 20STG.

When the inhibiting gate 20SP1 is opened by the flip-flop circuit 20ST, an outpulsing path is completed from the lead 8TP through the gates 20SP1, 20SM and 20SP2 to the outpulsing B amplifier 20OPA. The inhibiting gate 20SM is normally open due to the connection from its control terminal 3 through the winding of the line busy relay 19LB to the —20 volt battery 19B9. The enabling gate 20SP2 was opened when the read-in flip-flop circuit 20RI is set. The circuit 20RI remains set when the flip-flop circuit 20ST is reset and provides a negative pulse to the reset terminal 3 of circuit 20RI. A positive reset pulse is necessary to reset the flip-flop circuit 20RI.

The timing pulses are supplied from the amplifier 20OPA to the counters 23VGP and 24VFP and also through the concentrator control circuit 120 and the control paths 14CP1–3 to the line concentrator 110. The counters 23VGP, 24VFP, 4VF and 7VG are simultaneously advanced, step by step, by the pulses supplied from the outpulsing amplifier 20OPA. The output terminal 2 of the outpulsing amplifier 20OPA is connected directly to the input terminals 1 of the counter stages 23VGP0–11 and 24VFP0–4. The timing pulses are also supplied from the output terminal 2 of the amplifier 20OPA through the inhibiting gate 19VFP, lead 19VF, the enabling gate 17VFT, amplifier 17VFL, lead 17VF, transformer 14T1, and the control path 14CP1 to the line concentrator 110. The timing pulses are also supplied from the output terminal 2 of the amplifier 20OPA through the inhibiting gate 19VGP, lead 19VG, the enabling gate 17VGT, capacitor 17C4, amplifier 17VGL, lead 17VG, transformer 14T2 and the control path 14CP2 to the line concentrator 110. In this manner, simultaneous vertical group and vertical file pulses are supplied to the line concentrator 110. The counters 23VGP and 24VFP are simultaneously stepped each time the vertical file and vertical group pulses are provided to the concentrator 110. Since stage 23VGP9 was set by the read-in amplifier 20RIA, after two pulses are supplied to the counter 23VGP, the stage 23VGP11 is set. After two pulses, the stages 4VF2, 7VG2 and 24VFP3 as well as the stage 23VGP11 are set. When the last counter stage 23VGP11 is set, it supplies a control potential through lead 23L1 to open the gate 19VFL2 and to close the gate 19VGP. When the gate 19VGP is closed, the vertical group pulsing to the concentrator 110 is stopped. The gate 19VFL2 is part of a path, hereinafter described, which is utilized to set the flip-flop circuit 19VFL. The next timing pulse is supplied to the counters 23VGP and 24VFP and as a vertical file pulse to the concentrator 110. The counter 24VFP steps to turn on the stage 24VFP4, but the counter 23VGP does not step. The counters 23VGP and 24VFP are not ring counters because when the last stage is set another pulse does not turn on the first stage. This is due to the fact that the output terminal 2 of stage 23VGP11 is not connected to the input terminal 8 of the counter stage 23VGP0. Terminals 8 of stages 23VGP0 are connected, respectively, to batteries 23B1 and 24B1. With counter stage 23VGP11 on, the next pulse supplied to counter 23VGP does not step or change the setting of the stages 23VGP0–11.

When the counter stage 24VFP4 is turned on, it opens the gate 19VFL1 and closes the gate 19VFP. When the gate 19VFP is closed, the vertical file pulsing is stopped to the line concentrator 110. Only three vertical file pulses have been supplied to the line concentrator 110. The counters 7VG and 4VF are set, respectively, at vertical group 2 and vertical file 3. The last vertical file pulse is supplied as a line busy test pulse of the calling line 3L14. The next timing pulse from lead 8TP is supplied through the amplifier 20OPA and the open gates 19VFL2, 19VFL1 and 19VFL3 to set the flip-flop circuit 19VFL. The enabling gate 19VFL3 was opened when the relay 16TSK operated after the trunk selection sequence operation is completed. The control terminal 3 of the enabling gate 19VFL3 is connected to the —20 volt battery 19B4 through the resistor 19R7 and also to ground through the operated contact 19(16TSK). The flip-flop circuit 19VFL is set by a timing pulse only after the three gates 19VFL1–3 have been opened. The gates 19VFL1–3 are opened after the completion of the vertical group and vertical file pulsing and the trunk selection. The gate 19VFL1 is opened upon the completion of the vertical file pulsing, the gate 19VFL2 is opened upon the completion of the vertical group pulsing and the gate 19VFL3 is opened upon the completion of the trunk selection.

As described above, the last vertical file pulse is not sent from the ring counter 24VFP, but is supplied when the flip-flop circuit 19VFL is set. The reason for the delay in supplying the last vertical file pulse is due to the fact that this pulse is utilized as a line busy test. Before the last vertical file pulse is supplied to the concentrator 110, it is necessary to open the line busy gate 19LBG to ready the line selection and test circuit 132 for recognizing a line busy condition on the line 3L14. The last vertical file pulse which is supplied from the flip-flop circuit 19VFLD is utilized as a line busy test pulse only on terminating calls. This feature is unnecessary for an originating call from one of the lines 3L00-59. On a terminating call, as hereinafter described, if the line is busy the flip-flop circuit 19LBA is operated to prevent further progress in setting up the call. On an originating call, a line busy indication is never received because the line 3L14 is not in a busy condition when it initiates a service request indication. Initiating a service request indication is incompatible with initiating a line busy condition at this time. Once outpulsing is commenced, however, the same sequence of operaton is utilized for both originating and terminating calls. The last vertical file pulse is, therefore, delayed for an originating call as well as for a terminating call.

When the flip-flop circuit 19VFL is set, it opens the enabling gates 19LBG and 19VFD. The next amplified timing pulse from the amplifier 20OPA is supplied through the open enabling gate 19VFD to set the flip-flop circuit 19VFLD. When the flip-flop circuit 19VFLD is set, it supplies the last vertical file pulse through the capacitor 19C10 and varistor 19D2 which is shunted by the resistor 19R14, lead 19VF, the enabling gate 17VFT and amplifier 17VFL to the line concentrator 110. When the flip-flop circuit 19VFLD is set, it also opens the enabling gate 19CT2 to prepare a path from the outpulsing amplifier 20OPA to the flip-flop circuit 19CTA. The last vertical file pulse sets the counter 4VF to the vertical file of the calling line 3L14. A line busy pulse is not returned to the central office. The next timing pulse supplied through the amplifier 20OPA passes through the open gates 19CT2 and 19CT3 to set the circuit 19CTA. When the flip-flop circuit 19LBA is normal, the inhibiting gate 19CT3 is open. The output terminal 2 of the gate 19CT3 is connected to the input terminal 1 of the flip-flop circuit 19CTA and also to ground through the resistor 19R2 and capacitor 19C2. When the flip-flop circuit 19CTA is set, it opens the enabling gate 19MG, causes the operation of the relay 19CT and provides an additional control potential through the varistor 19D17 to the gate 21HGR1. The winding of relay 19CT is connected between the output terminal 2 of circuit 19CTA and the battery 19B10. When relay 19CT operates, it in turn causes the operation of the relay 16CT1. The operating path for relay 16CT1 is from ground through the closed contact 16(19CT), and the winding of relay 16CT1 to battery 16B6.

When relay 16CT1 is operated, a connect potential is provided, as is hereinafter described, over the tip lead of the selected trunk 6T6 to the concentrator 110.

When the gate 19MG is opened by circuit 19CTA, a path is prepared from the amplifier 20OPA to the amplifier 17ML for supplying mark pulses to the line concentrator 110. The mark pulses are utilized at the line concentrator to operate the line unit 3LU14 for establishing a connection from the line 3L14. With the gate 19MG open, the timing pulses are supplied from the amplifier 20OPA through the gate 19MG and the open enabling gate 19TSK, lead 19M, gate 17M, amplifier 17ML, lead 17M, transformer 14T1, and the control path 14CP1 to the concentrator 110. The gate 19TSK is opened when contact 19(16TSK) is closed upon completion of the trunk selection sequence of operation. In other words, if the line selection and test circuit 132 is ready to supply mark pulses to the concentrator 110, but relay 16TSK has not as yet been operated, the mark pulses are delayed. The line selection and test circuit 132 delays supplying the mark pulses until after the relay 16TSK operates.

At the concentrator 110 the mark pulses are supplied through the transformer 5T1, resistor 5R3, the A amplifier 5MK to the flip-flop circuit 2M and also to the trunk circuits 6TR0–9 which are individually associated with the trunks 6T0–9. The circuit 2M is similar to the circuit 8BC1, described above, except that the potential source is supplied from the power supply 2PS. The component designations are mainly the same except that the first digit is 2 instead of 8. When the circuit 2M is set by the first mark pulse, it causes the operation of relay 4M. The output terminal 2 of circuit 2M is connected through lead 3M, the winding of relay 4M, lead 7L1, to the −20 volt lead 5L4 of the power supply 2PS. When relay 4M operates, it connects the −20 volt lead 5L4 to the windings of relays 4F0-4 and 7G0-11. The −20 volt potential is provided through leads 5L4 and 7L1 and the closed contact 4(4M) to the windings of relays 4F0-4 and 7G0-11. The windings of relay 4F0-4 are connected, respectively, through varistors 4V0-4 to the output terminals 2 of the stages 4VF0-4 of the counter 4VF. The windings of relays 7G0-11 are connected, respectively, through varistors 7V0-11 to the output terminals 2 of stages 7VG0-11 of the counter 7VG. Due to the outpulsing sequence of operation at the line selection and test circuit 132, the stages 4VF4 and 7VG2 are set at this time. Terminals 2 of stages 4VF4 and 7VG2 are therefore at a potential of −2 volts. When the −20 volt lead 5L4 is connected to the winding of the relays 4F0-4 and 7G0-11, relays 4F4 and 7G2 operate.

With one of the relays 4F0-4 and one of 7G0-11 operated, a −65 volt potential is connected to one of the line circuits 3U00-59. The circuits 3U00-59 are connected, respectively, to the lines 3L00-59. Only the circuit 3U00 is shown. The −65 volt lead 2B3 from the supply 2PS is connected through the closed contact of relay 4F4, and the closed contact of relay 7G2 to the circuit 3U14. The −65 volt lead potential is, in this manner, selectively applied to the line circuit 3U14 which is individually associated with the calling line 3L14. Each of the line circuits 3U00-59 has six crosspoints, or line units 3LU0-5, which are connected to the associated one of the lines 3L00-59. The sixty sets of line units 3LU0-5, one for each of the circuits 3U00-59, provide for connections between the lines 3L00-59 and the trunks 6T0-9.

With only six crosspoints for each line, each line is connectable to only six of the ten trunks 6T0-9. Fig. 30 illustrates the connections from the line units 3LU0-5 in each of the circuits 3U00-59 to the trunks 6T0-9. The subscriber lines which are in the same vertical group are connectable to the same six trunks. For example, the five lines 3L10-14, which are in the vertical group 2, are connectable to the trunks 6T1, 6T6, 6T2, 6T5, 6T8 and 6T9: The line unit 3LU0 of the circuit 3U14 is connected to the trunk 61; the line unit 3LU1 of circuit 3U14 is connected to trunk 6T6, etc. As described above, the trunks which are utilized for a vertical group are referred to as a multiple. All twelve multiples, one for each vertical group, are different in order to distribute the load carried by any one trunk. Such a distribution system of multiples is referred to as a slip multiple. The lines 3L00-59 are connectable, therefore, to the trunks 6T0-9 on a slip multiple basis. As shown in the line unit 3LU0, each of the line units 3LU0-5 includes a serially connected relay 3C0 and gas tube 3CT0. When one of the relays 3C0 in circuit 3U14 is operated, a connection is provided from the associated line 3L14 to one of the six trunks in the trunk multiple. When the relays 4F4 and 7G2 are operated, as described above, a −65 volt potential is provided to the line circuit 3U14. The −65 volt potential is provided to the line side of the windings of the six relays 3C0 in the line circuit 3U14. The anodes of the gas tubes 3CT0 in the units 3LU0-5 of the circuit 3U14 are connected to six of the ten trunk circuits 6TR0-9. The connection, for example, from the anode of the tube 3CT0 in unit 3LU0 is through a varistor 6D3 and resistors 6R4 and 6R5, respectively, to the ring and tip of one of the trunks 6T0-9. The unit 3LU0 of the line circuit 3U00, which is shown in the drawings, is connected through the trunk circuit 6TR0 to the trunk 6T0. The tube 3CT0 does not ionize and the associated relay 3C0 does not operate until hte crosspoint, or line unit 3LU0, is marked on both the line and the trunk side. One of the six line units 3LU0 in the circuit 3U14 is, therefore, not operated until a connect potential is provided over one of the six trunks 6T1, 6T6, 6T2, 6T5, 6T8 and 6T9 from the central office. A path for providing the connect potential from battery 12B2 is readied, as described above, when the relay 16TSK was operated to indicate the selection of one of the six trunks in the trunk multiple connected to the calling line 3L14. When relay 16CT1 operates as an indication of the completion of the outpulsing operation, it completes the path from battery 12B2 for supplying the +100 volt connect potential over the selected trunk 6T6 to the concentrator 110, and it also initiates the operation of the slow release relay 10SR6. Battery 12B2 is now connected through lamp 12C, the normal contact 12(19LB1), the operated contact 12(16CT1), the operated contact 12(16TSK) which is connected to ground through resistor 12DIS, the operated contact 12(16TS0), the operated contact 12(14VG2), the cross-connection in accordance with Fig. 31, the operated contact 12(14HA0), the normal contact 10(10SR6), the normal contact 10(10HM6), over the tip lead of the selected trunk 6T6 to the trunk circuit 6TR6 in the line concentrator 110. Fig. 31 illustrates the connections from the contacts of relay 14VG0-11 to contacts of relay 14HA0-9. Only the contacts of relay 14HA0 are shown in the drawing. The contacts of relays 14HA1-9 are included in box 1200. As indicated in Fig. 31, the 0 contact of relay 14VG2 is connected to contact 6 of relay 14HA0. The 0 contacts of relay 14VG0-11 are connected to contacts of relays 16TS0, and the contacts 0-7 of relay 14HA0 are connected, respectively, to the contacts 10(10SR0-7). Fig. 31 does not illustrate connections when the relays 16TS4-5 are used because they always select the two least preferred trunks 6T8-9 for all vertical groups. The contacts of relays 16TS4-5 are connected, therefore, directly to the contacts 10(10SR8-9). The operation of the vertical group relay 14VG2 and the relay 16TS0 determines the selection of the trunk 6T6.

At the concentrator 110, the tip lead of trunk 6T6 is connected through the resistor 6R5 and varistor 6D3 to the anode of tube 3CT0 of unit 3LU1 in circuit 3U14. The connect potential is also provided from the trunk circuit 6TR0 to the other line units served by the same trunk. Fig. 30 illustrates which of the lines 3L00-59 are served by each of the trunks 6T0-9. Specifically the trunk 6T6 is connectable to the lines in all vertical groups except groups 1, 3, 5, 7 and 10. The only one of the circuits 3U00-59, however, that has been marked or connected to a −65 volt potential source is the circuit 3U14. The combination of the −65 volts at the cathode of tube 3CT0 and the +100 volts at the anode of the tube 3CT0 of unit 3LU1 in circuit 3U14 causes the ionization of the tube 3CT0. When the tube 3CT0 ionizes, relay 3C0 operates to establish a connection through the crosspoint 3LU1 from the calling line 3L14 to the selected trunk 6T6.

When the crosspoint 3LU1 of circuit 3U14 is closed, the mark pulses, which are still being supplied from the line selection and test circuit 132, are returned to the central office as line busy pulses. More specifically, when relay 3C0 operates it forward-biases a varistor 6D4 in the trunk circuit 6TR6 to allow for the passage of the mark pulses. The diode 4D4 is normally reversed-biased due to its connection through resistor 6R1, varistor 6D5 and resistor 6R2 to the +30 volt lead 2B4 from the power supply 2PS. The other terminal of varistor 6D4 is connected to ground potential through the resistor 6R6 and to the output terminal 2 of the amplifier 5MK through the capacitor 6C1. When relay 3CT0 operates, it locks to lead 2B4 through its operated contact, varistor 6D5 and resistor 6R2. The current through resistor 6R2 causes the potential at varistor 6D4 to decrease to allow the passage of mark pulses through the circuit 6TR6. With the varistor 6D4 back-biased only slightly the succeeding mark pulses from the central office are supplied through the amplifier 5MK, the capacitor 6C1, varistor 6D4 and capacitor 6C2 to the input terminal 1 of the line busy amplifier 2LB. The input terminal 1 is connected to the potential lead 5L4, through the parallel circuit comprising the resistor 2LB1 and the capacitor 2LB2. The output terminal 2 of the line busy amplifier is connected through the resistor 5R7, transformer 5T3 and a control pair 14CP3 to the central office. In this manner, when the crosspoint 3LU1 is operated, the trunk circuit 6TR6 routes succeeding mark pulses back to the central office as line busy pulses as an indication that the crosspoint relay 3CT0 is operated.

When relay 3C0 operates, lead 5L4 is connected through the inductor 6BT and an operated contact relay 3CT0 to reverse-bias the varistor 3S in the line scanning unit 3LS14. As described above, when normal scanning is resumed, the line 3L14 does not initiate a service request when the varistor 3S is reverse-biased. The varistor 3S is reversed-biased when the line 3L14 is connected to one of the trunks 6T0–9 or when the line 3L14 is in an idle condition. When scanning is resumed the scanning pulses from the counter 4VF are directed through capacitor 3VF of the scanner circuit 3LS14, varistor 3D, capacitor 3C, the operated contact of relay 3CT0 of unit 3LU1 in circuit 3U14, and varistor 6D7 of the circuit 6TR6 to the amplifier 2IB. The scanner circuit 3LS14, therefore, functions when the varistor 3S is reversed-biased, by the operation of the unit 3LU1, to steer the scanning pulses back to the central office as line busy pulses.

Returning to the crosspoint closure, at the central office the converted mark pulses, which indicate the crosspoint closure, are provided through the control 14CP3, transformer 14T3, line busy amplifier 18LBL, open enabling gates 18LBT and 19LBG to the flip-flop circuit 19LBA.

When the flip-flop circuit 19LBA is set it causes the operation of the line busy relay 19LB and closes the gate 19CT3 and the gate 20SM. The gates 19CT3 and 20SM are normally open due to the connection of their control terminals 3 through the winding of relay 19LB to battery 19B9. When the flip-flop circuit 19LBA is set it also provides a control potential through the diode 19D15 to the control terminal 3 of the gate 21HGR1 in the line concentrator control circuit 120. The gate 21HGR1 remains open as long as the circuit 19LBA is set.

When relay 19LB operates it in turn causes the operation of the relay 16LB1. The operating path for relay 16LB1 is from ground through the contact 16(19LB) and the winding of relay 16LB1 to battery 16B6.

When relay 16LB1 operates, it locks to ground through its closed contact and the contact 16(19CT) and provides a locking path for the relay 16CT1. Both of the relays 19CT and 19LB must operate in order to release the relays 16CT1 and 16LB1. When relay 16LB1 operates, it also disconnects the 100-volt potential source 12B2 from the tip lead of the selected trunk 6T6. As described above, the battery 12B2 is connected to the tip lead of the selected trunk 6T6 through the normal contact 12(19LB1). With relay 19LB1 operated, this path is opened. The crosspoint 3LU1 of circuit 3U14 remains closed, as described above, due to the locking path through the closed contact of relay 3C0.

When relay 16LB1 operates, it also causes the operation of magnet 10HM6 to complete the operation of switch 10CR0 and connect trunk 6T6 to link 10L9. The operating path for the hold magnet 10HM6 is from ground on lead 15LH4 at the connector circuit 136, the closed contact 12(14VF4), the closed contact 12(16CT1), the closed contact 12(16LB1), the closed contact 12(16TS0), the closed contact 12(14VG2), the cross-connection in accordance with Fig. 31, the closed contact 6 of relay 12(14HA0), and the winding of the hold magnet 10HM6 to battery.

Figure 11:
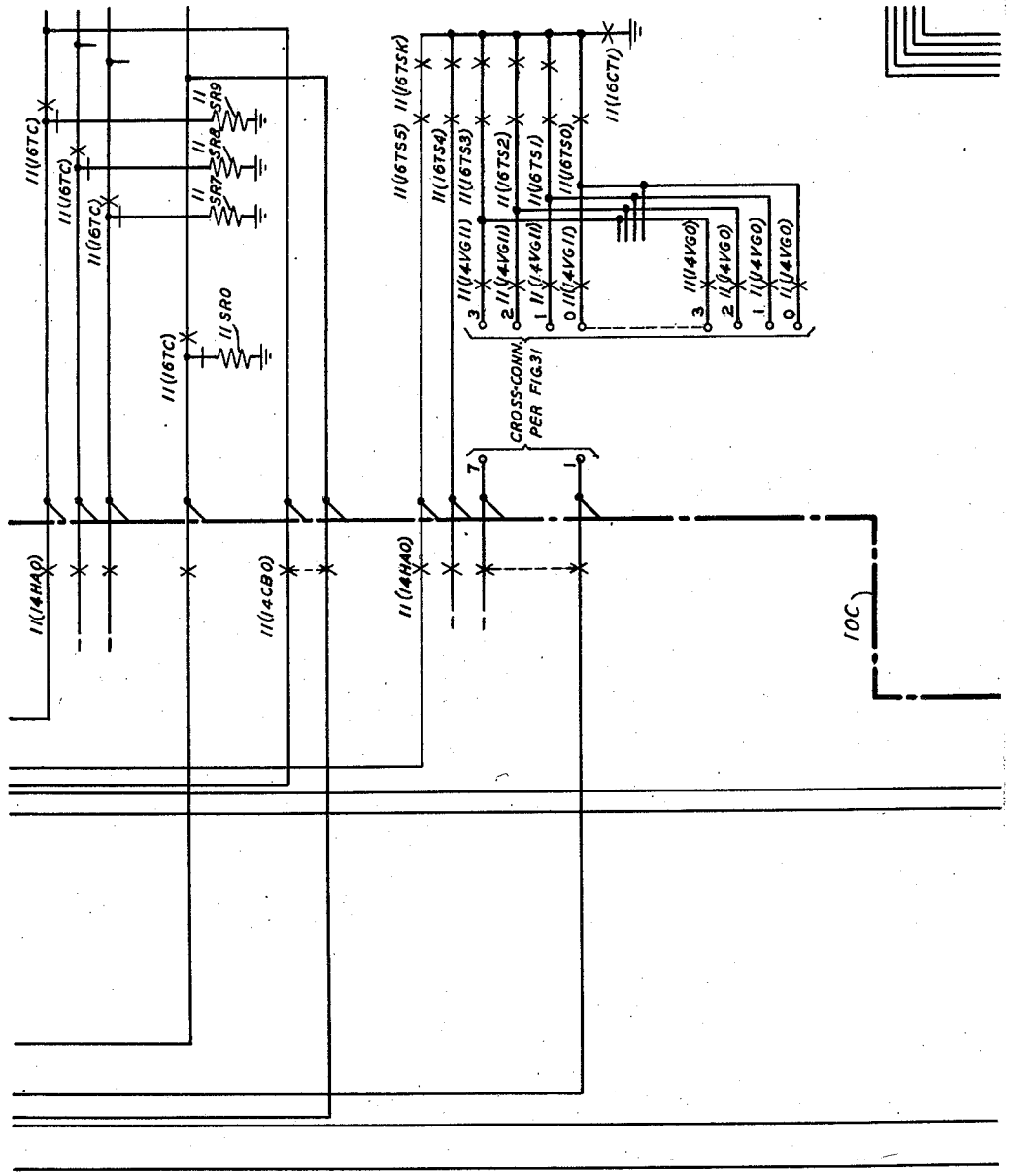
Figs. 11, 12 and 16 illustrate the relay control and selector circuit which is associated with the line link frame at the central office.
Figure 12:
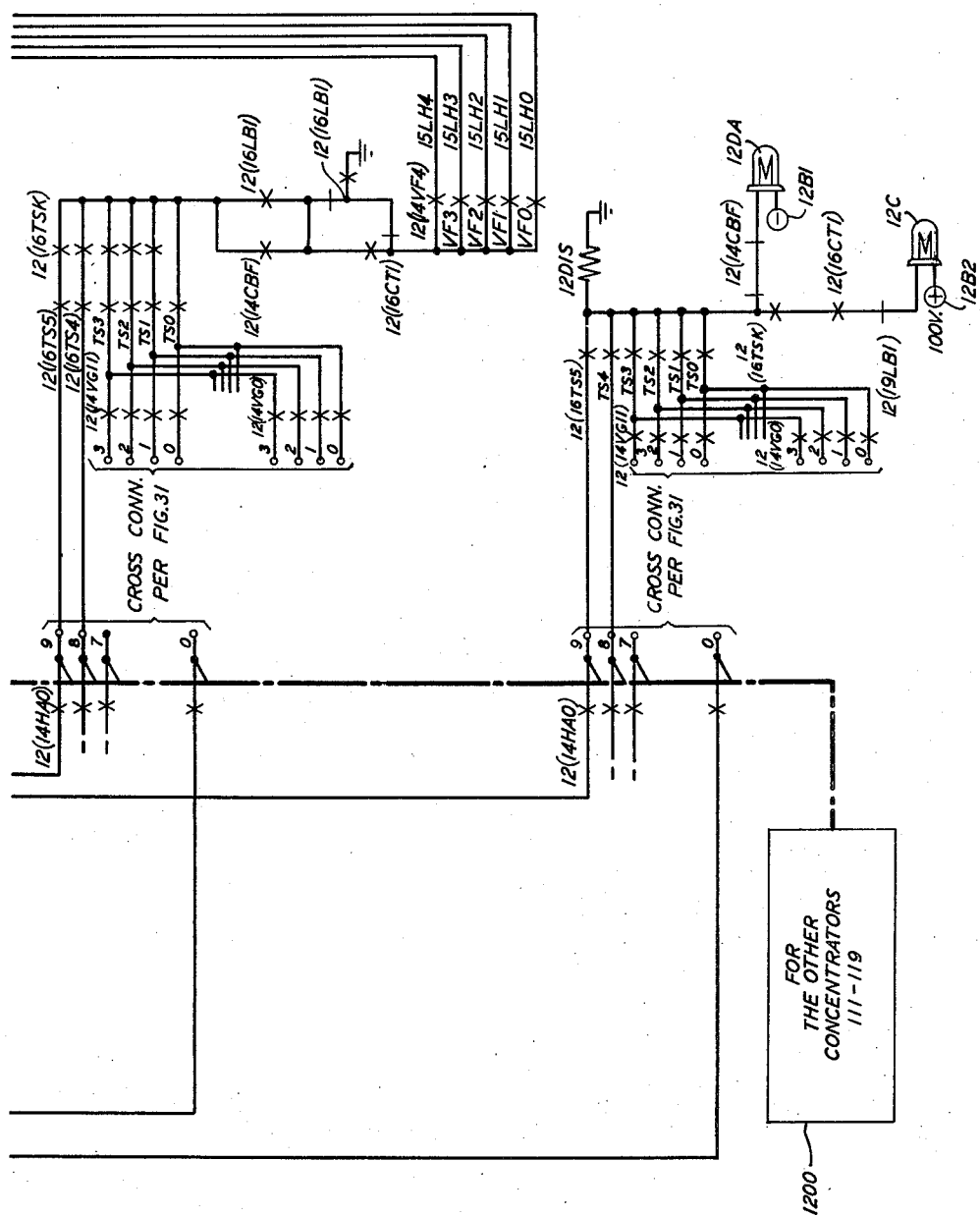

Fig. 31 illustrates the connections from contacts of relays 14HA0 to contacts of relays 14VG0–11. The set of contacts 0–9 of relay 14HA0 which are utilized for operating the hold magnets 10HM0–9 are different than the set of contacts 0–9 of relay 14HA0 that are used for applying the connect potential to the tip lead of trunk 6T6. In other words, relays 14HA0 have a number of sets of contacts 0–9, two of which are illustrated in Fig. 12 and one of which is illustrated in Fig. 11. Fig. 31 illustrates the connections for all three sets of contacts.

When the hold magnet 10HM6 operates, the select magnet 10SM9 has already been operated, as described above, so that a connection is established from the trunk 6T6 to the link 10L9. The hold magnet also provides a locking path for its associated slow release relay 10SR6.

Relay 10SR6 is slow to operate as well as slow to release. An operating path was closed for relay 10SR6, as described above, when relay 16CT1 operated to supply the connect potential to the concentrator 110. Relay 10SR6, however, does not operate until after the crosspoint closure indication is received at the central office. The operating path for relay 10SR6 is from ground through the contact 11(16CT1), the closed contact 11(16TS0), the closed contact 11(14VG2), the cross-connection in accordance with Fig. 31, the closed contact 11(14HA0), and the winding of the relay 10SR6 to battery. It is necessary to early initiate the operation of the slow relay 10SR6 in case the marker 140 fails to provide ground to operate the hold magnet 10HM6. The disconnect path, hereinafter described, from battery 10BD through the operated contact 10(10SR6) should be ready in the event of such a failure.

The hold magnet 10HM6 is operated only after relay 16LB1 is operated to indicate the completion of the crosspoint closure at the line concentrator 110. In this manner the crosspoint is closed at the concentrator 110 first and then the switch 10CR0 is operated to extend the connection from the selected trunk 6T6 to the horizontal or link 10L9.

When the switch 10CR0 operates, the ground supplied to the winding of the relay 10HM6 is extended through the closed switch 10CR0 on the sleeve lead of the horizontal 10L9. The sleeve lead is connected through the closed contact 10(14HA0) and the normal contact 10(16TC), lead 15LL9 and cable 15C to the line link connector 136. When the marker receives this indication of the operation of switch 10CR0, it proceeds to release the line link connector 136 which in turn releases the identifying relays 14HA0, 14VF4, 14VG2 and 14D. When any one of the relays 14HA0, 14VG2, 14VF4 and 14D release, the path from ground to the control terminals 3 of gates 21HG and 21HGR3 is opened. With gate 21HG closed and gate 21HGR3 open, the next timing pulse supplied from the pulse generator 130 through lead 8TP is passed through the open gate 21HGR3, the open enabling gate 21HGR1, lead 21L4 and capacitor 20C3 to the input terminal 1 of the A amplifier 20RLS. The other input terminal 3 of the amplifier 20RLS is connected to battery 20B3 through the resistor 20R3. Until gate 21HGR3 opens, and gate 21HG closes, the timing pulses are supplied through the circuit 132 to the concentrator 110 as mark pulses. The output terminal 2 of the release amplifier 20RLS is connected through the varistor 20D2 and resistor 20R1 to battery 20B1. The amplified reset pulse is utilized to reset all the flip-flop circuits and counters in the line selection and test circuit 132, to return the circuit 120 to normal and to reset the concentrator counters 4VF and 7VG. The reset pulse is provided from the amplifier 20RLS through varistor 20D2 to the reset terminals 3 of the flip-flop circuits 20RI, 20RHG, 19VFL, 19LBA, 19VFLD, 19CTA and through the capacitor 24C17 to the counters 24VFP and 23VGP. The release pulse is also provided through a capacitor 19C1, varistor 19D3, lead 19RS, gate 17RST, amplifier 17RL, lead 17RS, transformer 14T2, control pair 14CP2, transformer 5T2, amplifier 5RS, lead 5L6, capacitor 2RS and lead 2L4 to the reset terimnals 4 of stages 7VG1–11 and 4VF1–4. The reset pulse is also provided from capacitor 2RS to the set terminals 7 of stages 7VG0 and 4VF0.

The counters 4VF and 7VG are set, in this manner, to line 3L00. The reset pulse is also provided from capacitor 2RS through varistor 2D7 to the reset terminal 3 of circuit 2M. When circuit 2M is reset, it in turn releases relay 4M. When relay 4M releases, it in turn releases relays 4F4 and 7G2. The crosspoint 3LU1 of the circuit 3U14 remains, however, closed. The locking path for relay 3C0 in crosspoint 3LU1 is from the ground potential at the left junction of bridge 2V1, resistor 3CT, the winding of relay 3C0, the operated locking contact of relay 3C0, varistor 6D5 and resistor 6R2 to the lead 2B4. The concentrator 110 is now ready for normal scanning to resume. The only thing changed by the originating call connection is the operated crosspoint 3LU1 of circuit 3U14.

The reset pulse from the amplifier 20RLS is also provided, as described above, to the counters 23VGP and 24VFP. All the counter stages 23VGP0–11 and 24VFP0–4 are turned off. The counters 23VGP and 24VFP are not ring counters so that when the circuit 132 is normal none of the stages 23VGP0–11 and 24VFP0–4 is set.

The reset pulse from the amplifier 20RLS is also supplied through lead 20L5 to the reset terminal 3 of circuit 21HGS. When circuit 21HGS is reset it closes gates 17VFT, 17VGT, 17RST, 17M, 17LBT and 21HGR1, it opens gates 17VFS, 17VGS1, 17RS1, 21RL and 18CH0 and it removes the −2 volt potential on lead 18HGS to the traffic recorder 134. The gate 21HGR1 remains open as long as any of the flip-flop circuits in the circuit 132 are set. The output terminal 2 of each flip-flop circuit in the line selection circuit 132 as well as that of circuit 21HGS is connected to the control terminal 3 of gate 21HGR1. The gate 21HGR1 functions, in this manner, as an "or" circuit allowing timing pulses through to lead 21L4 as long as the circuits 120 and 132 are not normal. The reset pulses through lead 21L4 are supplied to circuit 132 as long as gate 21HGR1 is open.

The reset pulses from amplifier 20RLS are also supplied through the gate 21HGR2 and amplifier 21HGTA to the reset terminal of circuit 21HGT.

When the circuit 21HGT is reset, it releases relay 21HGT0 which in turn releases relays 25VFT4 and 26VGT2. When relay 21HGT0 releases, it also resets circuit 2ZRH.

When the circuit 120 is returned to normal upon the release of the circuit 21HGS, the vertical group, vertical file and reset pulses from the generator 130 are supplied to the concentrator 110. The outpulsing paths from the circuit 132 are simultaneously opened. Normal scanning is, therefore, resumed as soon as the circuit 21HGS is reset. Whenever line 3L14 is scanned, a line busy pulse is now returned to the central office. Normal scanning continues during dialing and even during the establishment of a call-back connection. The originating call connection from line 3L14 is through the crosspoint 3LU1 of circuit 3U14, the trunk circuit 6TR6, trunk 6T6, switch 1OCR0, link 1OL9, switch 15CR0 and the trunk link frame 142 to the originating register 147.

Call back

When the calling subscriber has completed dialing, the originating call register 147 seizes the marker 140 through the register connector 148. The marker 140 receives the dialing information from the register 147 and utilizes it to establish a connection from the calling line 3L14 through the trunk link frame 142 to the outgoing trunk 146.

When the marker 140 receives the dialing information, it seizes the line link frame 141 through the line link connector 136 to initiate the establishment of a line-to-outgoing trunk connection. The line-to-outgoing trunk connection may be to any trunk connected to the trunk frame 142. As described above, when the dialing connection is established, the concentrator crosspoint 3LU1 of circuit 3U14 is locked operated and is not released until a disconnect potential is applied to the tip of the trunk 6T6. The call-back connection from the calling line 3L14 to the outgoing trunk 146 is therefore through the same concentrator trunk 6T6. The identity of the concentrator trunk utilized for the dialing connection is not supplied to the originating register 148 or to the marker 140. During the establishment of the call-back connection, therefore, it is necessary to establish the identity of the concentrator trunk utilized for the dialing connection so that the hold magnet 1OHM6 in the switch 1OCR0 corresponding thereto will be operated after one of the links 1OL0–9 is selected. The marker 140 does not proceed to select an idle channel from the switch 1OCR0 to the outgoing trunk 146 until it has received an indication that the identity of the concentrator trunk 6T6 utilized for the dialing connection has been determined. The identity of the concentrator trunk 6T6 is determined before the originating register 146 releases and allows the hold magnet 1OHM6 of the switch 1OCR0 to release. The operated contacts of the hold magnet 1OMH6 are utilized in determining the identity of the concentrator trunk 6T6.

When the line link connector 136 is seized by the marker 140 for a call-back call, it operates the relay 14HA0 to identify the concentrator 110, the relays 14VF4 and 14VG2 to identify the calling line 3L14 and the relay 14CBF to indicate that the call is for a call back. When the relay 14HA0 operates, it causes the operation of a corresponding call-back relay 14CB0. When the relay 14CBF operates, it closes operating paths to supply the link identity utilized on the dialing connection on a two-out-of-five basis from the connector 136. The operating paths are closed through the contacts 14(14CBF) to the windings of two of the five relays 14LN0, 14LN1, 14LN2, 14LN4 and 14LN7. The line link connector 136 supplies the identity of the link 1OL9 through cable 15C causing the operation of the relays 14LN2 and 14LN7. When relays 14LN2 and 14LN7 are operated, an operating path is completed for one of the six trunk select relays 16TS0–5 to indicate which concentrator trunk was utilized for the dialing connection. The dialing connection is not released until after one of the six relays 16TS0–5 is operated. Trunk 6T6, as described above, is the preferred trunk in the trunk multiple which is connected to the calling line 3L14. The trunk select relay 16TS0 is therefore operated when the vertical group relay 14VG2 is operated to indicate that the preferred trunk 6T6 was utilized. The operating path for relay 16TS0 is from ground through the winding of relay 16TS0, and a closed contact 16(14VG2) in accordance with the table shown in Fig. 29. As shown in Fig. 29, the winding of relay 16TS0 is connected to contact 6 of relay 14VG2. The contact number indicates the trunk association. Contact 6 of relay 14VG2 is connected through an associated closed contact 11(14CB0), the operated crosspoint between trunk 6T6 and link 1OL9, the control lead of link 1OL9 shunted to ground through resistor 1OLL9, the closed contacts 10(14LN7) and 10(14LN2), the two-out-of-five check network 1ORH and resistor 1OR1 to battery 1OB12. The network 1ORH provides a path from battery 1OB12 to one of the links 1OL0–9 when two of the five relays 14LN0, 14LN1, 14LN2, 14LN4, and 14LN7 are operated. With relays 14LN2 and 14LN7 operated to indicate the utilization of the link 1OL9 for the dialing connection, the control lead of link 1OL9 is connected through the operated contacts 10(14LN7), 10(14LN2) and 10(14LN7), the normal contact 10(14LN4), the operated contact 10(14LN2) and the normal contacts 10(14LN1) and 10(14LN0) to battery 1OB12.

In this manner with switch 10CR0 still operated, when the marker 140 supplies the link identity to the line link frame, the identity of the talking trunk 6T6 utilized for the dialing connection is established. The operation of relay 16TS0, when the vertical group relay 14VG2 is operated, indicates that the preferred one of the six multipled trunks for vertical group 2 was utilized for the dialing connection. As indicated in Fig. 30, trunk 6T6 is preferred for vertical group 2.

When relay 16TS0 operates, it locks to battery 16B1 through the operated contacts 16(16TS0), 10(14CBF) and the lamp 16TSL.

When relay 16TS0 operates, it also provides an indication to the marker 140 that the identity of the trunk 6T6 utilized for the dialing connection has been determined. Ground is connected through resistor 15HGK0, the operated contacts 15(14HA0), 15(16TS0) and 15(14CBF), the normal contacts 15(14D), 15(14TER) and cable 15C to the line link connector 136. When the marker 140 receives the indication of the dial trunk determination, it releases the register 147 and makes a channel test to select an idle channel, including one of the links 10L0–9 to the outgoing trunk 146 for the call-back call.

When the originating register 148 is released, it in turn releases a portion of the dialing connection from the calling line 3L14. The crosspoint 3LU1 of circuit 3U14 at the line concentrator 110 remains operated, being locked locally, but the switches 10CR0 and 15CR0 release. These switches 10CR0 and 15CR0 are released after the marker 140 has received an indication due to the operation of the trunk select relay 16TS0 that the identity of the trunk 6T6 has been determined. The hold magnet 10HM6 of switch 10CR0 and the hold magnet 15HM0 of switch 15CR0 are released when the trunk link frame 142 removes the sleeve ground potential under control of the marker 140.

When the originating register 147 is released, the marker 140 operates the select magnet of the link selected for the call-back call. If, for example, link 10L0 is selected, the select magnet 10SM0 is operated by the provision of a ground connection through cable 15C, lead 15SM0 and the operated contact 10(14HA0) to the winding of the magnet 10SM0.

When the select magnet 10SM0 is operated, an operating path is completed for the relay 16TSK. The operating path for relay 16TSK is from ground through the operated contact 16(10SM0), the normal contact 16(16TC), the operated contact 16(16TS0), the serially connected normal contacts 16(16TS1–5) and the winding of relay 16TSK to battery 16B2. When relay 16TSK operates, it in turn generally readies an operating path for the preselected hold magnet of switch 10CR0 to connect the calling line through the frame 142 to the outgoing trunk 146. When, however, relay 16TS0 is operated and not one of the relays 16TS1–5, the operating path for the hold magnet does not include the contact of relay 16TSK. The contact of relay 16TSK is unnecessary because when relay 16TS0 operates, it remains operated whereas if one of the relays 16TS1–5 operates, it is necessary for relay 16TSK to operate after all but one of the relays 16TS1–5 releases to determine if it is to remain operated. This preference determination is described in detail above.

After the marker 140 operates the select magnet 10SM0, it applies ground through cable 15C to lead 15LH4. The lead 15LH4 is connected through the operated contact 12(14VF4), the normal contacts 12(16CT1) and 12(16LB1), the operated contacts 12(14CBF) and 12(16TS0), the operated contact 12(14VG2) in accordance with Fig. 31, the operated contact 12(14HA0) to the winding of the hold magnet 10HM6 which is connected to battery 10B26. When the hold magnet 10HM6 reoperates, in this manner, it extends the connection from line 3L14 through trunk 6T6 to the link 10L0 which has been connected through switch 15CR9, frame 142, and the outgoing trunk to the called subscriber line (not shown).

When the switch 10CR0 operates, the battery 10B26 is connected through switch 10CR0, the sleeve lead of link 10L0, the operated contact 10(14HA0), the normal contact 10(16TC), lead 15LL0 and cable 15C to the connector 15C. The marker 140 thereupon releases the connector 136 which in turn releases relays 14HA0, 14VF4, 14VG2, 14CBF and the select magnet 10SM0. When relay 14HA0 releases, it in turn releases relay 14CB0 and when relay 14CBF releases, it in turn releases relays 14LN2, 14LN7 and 16TS0. When relay 16TS0 releases or when the select magnet 10SM0 is allowed to release, the operating path for relay 16TSK is opened. In this manner the line link frame is returned to normal with only the switches 10CR0 and 15CR9 operated to hold the talking connection.

Normal scanning continues during the establishment of the call-back connection. It is uninterrupted during the time the dialing connection is released and the line-to-trunk connection is established. Should a service request originate while a call-back call is in progress, the concentrator control circuits 120–9 recognize the service request as usual. The originating call proceeds until the attempt is made to seize the line link marker connector 135. The connector 135 locks out originating calls when a terminating or call-back call is in progress. The subscriber waits until a connector 135 is available.

*Terminating call*

The operation of the line concentrator telephone system of the present invention is substantially the same for a terminating call as for an originating call. When a terminating call is initiated, the marker 140 obtains the calling information from a number group circuit 150 through connector 151. When the marker 140 receives the called line identity from the circuit 150, it seizes the line link frame through the line link connector circuit 136. A ground connection is provided from the connector 136 through cable 15C to the winding of relay 14TER to indicate that the call is a terminating call. The marker 140 also supplies the called line identity by operating one of the horizontal group relays 14HA0–9, one of the vertical group relays 14VG0–11 and one of the vertical file relays 14VF0–4. If the called subscriber's line is line 3L14, for example, relays 14HA0, 14VG2 and 14VF4 are operated. With the identifying relays operated, a ground connection is provided to close the inhibiting gate 21HGR3 and to open the enabling gate 21HG. A similar ground connection was provided, as described above, for the originating call when relay 14D operated. With relay 14TER operated, ground is provided through either the normal contact 21(16CT1) or 21(16LB1), the contact 21(14TER), contact 21(14VF4), contact 21(14VG2), and contact 21(14HA0) to terminals 3 of the gates 21HG and 21HGR3.

With gate 21HG open the next timing pulse from the pulse generator 130 through lead 8TP sets the flip-flop circuit 21HGS. The flip-flop circuit 21HGS switches the pulsing leads to the line concentrator 110 to the line selection and test circuit 132 instead of to the pulse generator 130. The function of the flip-flop circuit 21HGS was described in detail above during the description of an originating call. Briefly, when the flip-flop circuit 21HGS is set, the following functions are performed:

(1) Gate 17VFT is opened and gate 17VFS is closed to transfer the vertical file pulsing to the line concentrator 110 from the pulse generator 130 to the circuit 132;

(2) Gate 17VGT is opened and gate 17VGS1 is closed to transfer the vertical group pulsing to be supplied from the circuit 132 instead of the generator 130. For a terminating call the vertical group pulsing from generator 130 is stopped when gate 17VGS1 is closed. For an originating call the vertical group pulsing is stopped when a service request pulse is received, which occurs before gate 17VGS1 is closed;

(3) Gate 17RST is opened and gate 17RS1 is closed to transfer the reset pulsing from the circuit 132 instead of from the generator 130;

(4) The gate 17M is opened to ready the mark pulsing path to the concentrator 110;

(5) Gate 18LBT is opened to allow any line busy pulses from the line concentrator 110 to be directed to the line selection and test circuit 132;

(6) The gate 21RL is closed to prevent a false abandonment;

(7) An indication of the initiation of a call to one of the concentrators 110–9 is provided to the traffic recorder 134;

(8) Gate 18CH0 is closed to inhibit the recognition of service requests from lines 3L00–59;

(9) Gate 21HGR1 is opened to ready a reset path for the line selection and test circuit 132 and the circuit 120; and

(10) Circuit 20ST is set to commence the outpulsing sequence in the line selection and test circuit 132.

The outpulsing sequence in the line selection circuit 132 is substantially identical for terminating and originating calls. A reset pulse is provided to the counters 7VG and 4VF in the concentrator 110 and the terminating call identity is read into the counters 24VFP and 23VGP. The flip-flop circuit 20RHG, however, is not set when the called line identity is read into the counters 24VFP and 23VGP because relays 25VFT4 and 26VGT2 in the register 131 have not been operated. The register counters 25VFR and 26VGR are stopped when the pulsing paths are switched to the line selection circuit, but none of the relays 25VFT0–4, 26VGT0–11 and 21HGT0–9 operates. Relay 21HGT0 operates only when circuit 21HGT is set upon the reception of a service request pulse. When the circuit 20RHG is set, as described above, it readies a path to the traffic recorder 134.

The line identity is outpulsed in the same manner as for an originating call. The line busy check, which does not have significance for an originating call, is a necessary check for a terminating call. It is only included in the originating call sequence so that the outpulsing for both types of calls is the same. If line 3L14 is busy, a line busy pulse is returned to the circuit 132 which initiates the release of circuit 120 and provides a busy indication to the marker 140. The line busy sequence was described above in the description of the originating call. Briefly, the last vertical file pulse, which is the pulse supplied from the circuit 19VFLD, is transformed at the scanning unit 3U14 to a line busy pulse. The line busy pulse is returned through the circuit 120 to set the flip-flop circuit 19LBA in circuit 132. When circuit 19LBA is set it operates relay 19LB, and closes the gates 19CT3 and 20SM to prevent the transmission of the trunk connect potential, and to prevent sending mark pulses.

When relay 19LB operates it in turn operates relay 16LB1 which provides an indication of the busy condition of the called line 3L14 to the marker 140. When relay 16LB1 operates, ground is connected through the operated contact 12(16LB1), the normal contact 12(16CT1), the operated contact 12(14VF4), lead 15LH4 and cable 15C to the connector 136.

The marker 140 thereupon returns a busy condition to the calling subscriber and releases the relays 14HA0, 14TER, 14VF4 and 14VG2. With these relays released, the reset path through gate 21HGR3 is opened so that the timing pulses are steered through amplifier 21RLS to reset the circuits 120 and 132.

If line 3L14 is idle, the circuit 19LBA is not set and the next timing pulse sets circuit 19CTA to operate in sequence relays 19CT and 16CT1. When relay 16CT1 is operated, it readies a path for supplying the trunk connect potential to the concentrator 110.

During the outpulsing sequence, the trunk selecting sequence was taking place as for an originating call. Briefly the operation of relay 14TER operates in sequence the relay 16TC and then some of the relays 16TS0–5. The lowest designation of the operated ones of relays 16TS0–5 opens the operating paths for the others so that only one remains operated. When any of the relays 16TS0–5 operate, relay 16TC is released, and when all but one release relay 16TSK operates, if an idle link has been selected. When relay 16TSK operates it allows circuit 132 to supply the last vertical pulse, described above, and it readies the trunk connect potential path which is completed when relay 16CT1 operates. The sequence thereafter for a terminating call is identical to that of an originating call. A line-to-trunk connection is established with the various concentrator and central office circuit returned to normal when the marker 140 releases relays 14TER, 14HA0, 14VG2 and 14VF4.

Disconnect

When the calling and called parties disconnect, the talking connection, held under control of the outgoing trunk 146, is released. The outgoing trunk 146 releases the talking connection through the switches 15CR9 and 10CR0 by removing the holding ground potential from the sleeve lead of link 10L0 and from the operated hold magnet 15HM98 of switch 15CR9. The removal of the ground potential on the sleeve lead of link 10L0 causes the hold magnet 10HM6 to release. When the hold magnet 10HM6 releases, it opens the operating path for the associated slow release relay 10SR6. The relay 10SR6 is a slow-release relay so that a disconnect potential is provided from battery 10BD through lamp 10LD, the normal contact 10(14HA0), the operated contact 10(10SR6) and the normal contact 10(10HM6) to the tip lead of the trunk 6T6. The disconnect potential is applied to the tip lead of trunk 6T6 as long as the relay 10SR6 remains operated. If another call is in progress when the disconnect takes place relay 14HA0 will be operated so that a disconnect potential cannot be provided. The relay 10SR6, however, is held operated as long as relay 14HA0 is operated. Relay 10SR6 is held operated over a path from ground through resistor 11SR6, the normal contact 11(16TC), the operated contact 11(14HA0), the operated contact 10(10SR6), and the winding of relay 10SR6 to battery 10B46. If relay 16TC is operated the locking path from the winding of relay 10SR6 is through the operated contacts 11(14HA0), 11(16TC) and 10(14VG2). The contacts of relays 14VG0–11 are connected in accordance with Fig. 29 to ground through one of the windings 16TS0–5 or one of the resistors 16E–H. With relay 14VG2 operated, the winding of relay 10SR6 is connected to ground through the winding of relay 16TS0.

When relay 14HA0 releases, after the disconnect interrupting call has been served, the battery 10BD is connected to the tip lead of trunk 6T6 and relay 10SR6 is allowed to release.

At the line concentrator 110, the −130 volt disconnect potential is provided to the cathode of the disconnect tube 6DIS in the trunk circuit 6TR6. The tip lead of trunk 6T6 is connected through resistor 6R5 and varistor 6D1 to the cathode of tube 6DIS. The anode of the gas tube 6DIS is connected through resistor 6R2 to the +30 volt lead 2B4 from source 2PS. When tube 6DIS in circuit 6TR6 ionizes, it shunts the local holding circuit of the operated crosspoint 3LU1 of circuit 3U14 causing it to release. When tube 6DIS ionizes, varistor 6D5 becomes reverse-biased to functionally open the connection from the winding of relay 3CT0 in crosspoint 3LU1 of circuit 3U14 to the +30 volt lead 2B4. The crosspoint side of varistor 6D5 is connected through resistor 6R1, varistor 6D4, and resistor 6R6 to ground at source 2PS. The other side of the winding of relay 3CT0 is also connected to ground so that relay 3CT0 releases. When relay 3CT0 releases, it removes the reverse-biasing potention from varistor 3S of the scanner circuit 3LS14, it opens the line busy path to the trunk circuit 6TR6 and it disconnects line 3L14 from trunk 6T6. When relay 10SR6 in the central office finally releases, the —130 volt disconnect potential is removed from the tip lead of trunk 6T6 allowing tube 6DIS in circuit 6TR6 to return to normal.

MISCELLANEOUS FEATURES

Traffic recorder 134

To measure the amount and characteristics of the traffic handled by the concentrators 110–9, a traffic recorder 134 is utilized. The traffic recorder 134 is of the type disclosed in the above-identified disclosure by W. R. Young, Jr. The traffic recorder 134 records the service condition of the lines 3L00–59, etc. and of the ten sets of trunks 6T0–9 once each 15 seconds.

The recorder 134 is driven by the 500 clock pulses per second from the counter 8BC1 in the generator 130 through the capacitor 9C7, and by the reset pulses through lead 8RS and capacitor 9C8. Once each 15 seconds, the recorder 134, upon the reception of a reset pulse, provides an inhibiting potential to lead 18TS which is connected to terminal 3 of the gates 18CH0 in circuits 120–9. When gate 18CH0 is opened, the circuit 120 is insensitive to the recognition of service requests from lines 3L00–59. Gate 18CH0 is kept open for 120 milliseconds, or for one scanning cycle. The traffic recorder 134 is readied before the reset pulse by a pulse supplied from stage 13VGC8 of counter 13VGC. The output terminal 2 of stage 13VGC8 is connected through capacitor 13C11 and resistor 13R30 to battery 13B5. Capacitor 13C11 is also connected to the traffic recorder 134. With gate 18CH0 open the traffic recorder 134 records the condition of trunks 6T0–9 to which it is directly connected and also any line busy pulses received through amplifier 18LBL, lead 14CK and capacitor 9C6. There is a separate lead 14CK for each of the control circuits 120–9.

In addition to determining which of the lines and trunks are being used each 15 seconds, the recorder 134 measures the speed with which each originating call receives dial tone. When a service request pulse is received and the circuit 21HGT is set, a service request indication is supplied from the circuit 21HGT through lead 14HGT to the traffic recorder 134. When the marker 140 seizes the line link frame, battery 9B5 is connected through the operated contact 9(14D), connected to ground through resistor 9R5, and one of the contacts 9(14HA0–9). When the circuit 21HGS is set, an indication is provided through lead 18HGS to the traffic recorder 134. Finally when a crosspoint closure check is received and relay 16LB1 operated, an indication of dial-tone reception is provided from terminal 2 of circuit 20RHG, through the operated contacts 20(16CT1), 20(16LB1), 20(14D), 20(14HA0) and lead 19DT to the recorder 134. Lead 19DT is also connected through resistor 20R10 to battery 20B2. Circuit 20RHG is set, as described above, only for originating a call. If relay 14D is normal, a path is provided through lead 20DT to the recorder 134. The lead 20DT is connected to battery 20B2 through resistor 20R9.

In this manner, the recorder 134 records each step of serving in the sequence of providing dial tone.

The recorder 134, finally, also receives an indication of all trunks busy when relay 16TM operates. Ground is connected through contacts 9(16TM) and 9(14D) to the recorder 134. The contact 9(14D) is connected to battery 9B6 through resistor 9R12.

Service denial

In most systems denial of originating service for non-payment of telephone service charges, for trouble interception and for permanent signals caused by cable failures or prolonged receiver off-hook conditions may be treated at the central office. To avoid visiting the concentrators 110–9 and to enable the prompt clearing of trouble conditions which tie up concentrator trunks, a service denial feature at the central office is utilized. The service denial is provided for by utilizing patch panels 25P and 26P. The patch panels 25P and 26P, as shown by the dotted connection, are set to deny service to line 3L14. Each time stage 13VGR2 is set a potential is provided through resistor 26R18 to forward-bias the varistor 25D9. The varistor 25D9 is normally reverse-biased due to its connection to battery 21B1 in the amplifier 21HGTA. With varistor 25D9 forward-biased, the next vertical file pulse 4 from stage 25VFR4 is supplied through the patch panel 25P, capacitor 25C18, varistor 25D9 and amplifier 21HGTA to the reset terminal of circuit 21HGT. Amplifier 21HGTA provides a relatively long pulse, as described above, so that circuit 21HGT is insensitive to an input or service request pulse from line 3L14. Line 3L14 cannot, therefore, originate a call because circuit 21HGT is disabled each time line 3L14 is scanned. In this manner, service requests can be ignored and originating call service on particular lines is prevented until a trouble locating or other administrative procedure has been invoked. Service denial can be provided to any number of lines merely providing additional connections at the panels 25P and 26P.

All trunks busy

If all the trunks 6T0–9 are busy a slow-to-operate relay 16TM is allowed to operate. The relay 16TM normally does not operate when a trunk is available. When a trunk is available the relay 16TC will operate and release before the relay 16TM, which is connected to battery 16B3, has a chance to operate. If relay 16TM does operate a ground is extended through the resistor 15HGK0, contact 15(14HA0), contact 15(16TM) and one of the three contacts 15(14CBF), 15(14D) or 15(14TER) through cable 15C to the line link connector 136. The operated relay 16TC makes all links 10L0–9 on the line link frame 141 appear busy and the marker 140 will encounter a failure to match. The sleeve lead of the links 10L0–9 are connected through contacts 10(16TC), 10(14HA0–9), leads 15LL0–9 and cable 15C to the connector 136. The ground through resistor 15HGK0 to the line link connector 136 prevents a marker failure by indicating a busy condition.

When relay 16TM operates, it also provides to the recorder 134, as described above, an indication that all trunks are busy.

Check circuit and timing circuit

The line 3L59 is permanently made busy at the concentrator 110, and a continuous check of the line busy pulsing is made. The line 3L59 is made busy by providing a connection, not shown, from the capacitor 3C of the scanning circuit 3LS59 to the input terminal 1 of the line busy amplifier 2LB. Whenever line 3L59 is scanned, a line busy pulse is returned to the central office. At the central office the line busy pulses from line 3L59 are monitored. If a line busy pulse from line 3L59 is not returned a trouble indication is provided.

Each time the stage 13VGC11 of counter 13VGC is set, it provides an enabling potential to the gate 9PK. The input terminal 1 of gate 9PK is connected to the output terminal 2 of stage 13VFC3. The vertical file pulse 58 is therefore provided through gate 9PK to set the circuit 9CK. When the circuit 9CK is set, it energizes the slow-to-operate relay 9SCA which is connected to battery 9B3. When relay 9SCA operates, it shorts relay 9SCK. Before relay 9SCK can release, circuit 9CK is reset by the line busy pulse from line 3L59. The line busy pulse is provided through the amplifier 18LBL, lead 14CK, capacitor 9C16 and varistor 9D7 to the reset terminal 3 of circuit 9CK.

In this manner, the circuit 9CK is set each time the vertical file pulse 58 is sent to the concentrator 110, and is reset by the line busy pulse from line 3L59. If the line busy pulse fails to arrive, relay 9SCA operates and shunts the winding of relay 9SCK to ground. The winding of relay 9SCK is connected through resistor 9R1 to battery 9B1. When relay 9SCK releases it closes a path from battery 9B2 through resistors 9R2 and 9R3 to bring in an alarm. A trouble indicator 9L is connected across resistor 9R2.

If scanning is interrupted, the line busy pulse cannot be returned to reset the circuit 9CK. When a call is being served, however, timing pulses through lead 8TP, capacitor 9C24 and gate 9CKR are provided to the reset terminal 3 of circuit 9CK. Gate 9CKR is normally closed due to the connection of its terminal 3 through resistor 9R4 to battery 9B4. When circuit 21HGT is set for an originating call or circuit 21HGS for a terminating call an enabling potential is provided through varistors 9D8 and 9D19, respectively, to open gate 9CKR.

Another feature is provided to check for failure to get a marker 140 on an originating call. When a service request pulse is received and relay 21HGT0 operated, battery 14B9 is connected to the amplifier 14TM which is normally off due to the connection of terminal 1 through resistor 14R13 to battery 14B10. The amplifier 14TM includes a delay circuit, not shown, which delays the operation of relay 14TR for 12 to 15 seconds. The winding of relay 14TR is connected between terminal 2 and battery 14B7. Before relay 14TR operates, however, dial tone is normally provided to the calling subscriber and the circuit 120 returned to normal. The reset pulse provided to reset circuit 21HGT is also provided to inhibit the operation of the amplifier 14TM. It is provided to the base of the first transistor, not shown.

If the circuit 21HGT is not reset, relay 14TR is allowed to operate and connect battery 14B8 through resistors 14R10 and 14R9. Battery 14B8 is also connected through key 14TRB to operate relay 14TRA. When relay 14TRA operates, it connects the reset lead 8RS through capacitor 14C33 to the reset terminal 3 of circuit 21HGT. In this manner, if circuit 21HGT is not reset, the next reset pulse from generator 130 functions to return circuit 120 to normal.

The above-described circuit arrangements are illustrative of the application of the principles of the invention. Numerous other arrangements may be devised by those skilled in the art without departing from the spirit and scope of the invention. For example, instead of three-pair signaling circuits, two-pair signaling circuits could be utilized. For two-pair signaling bidirectional signaling over one of the two pairs would be utilized. The vertical group and reset pulses are then provided to the concentrators and the line busy and service request pulses are provided to the central office over the same control pair. The vertical file and mark pulses are provided to the concentrator over the other control pair. To provide for the bidirectional signaling, blocking amplifiers may be utilized at the central office to inhibit false reception when pulses are transmitted. The reset pulses are provided in the vertical group time slot instead of the vertical file time slot to avoid the possibility of a service request or line busy pulse from a reset pulse. In addition to avoid possible interference, first the vertical group outpulsing would take place, and then the vertical file outpulsing would take place instead of the simultaneous outpulsing operation described above.

Other possible modifications, by way of further example, are to vary the number of lines or trunks connected to each concentrator, or to vary the number of concentrators for each line link frame. It is evident, therefore, that numerous other arrangements may be devised by those skilled in the art without departing from the spirit and scope of the invention.

What is claimed is:

1. A line concentrator telephone system comprising a plurality of subscriber lines, a central office, a plurality of trunks less in number than said plurality of subscriber lines and extending from said central office, an automatic line concentrator having access to said trunks and controlled by said central office for establishing connections between said lines and said trunks, and a signaling arrangement located partially at said concentrator and partially at said central office and effective upon the operation of said concentrator for providing an indication to said central office of the establishment of the connection from one of said lines to one of said trunks.

2. A line concentrator telephone system comprising a plurality of subscriber lines, a central office, a plurality of trunks less in number than said plurality of subscriber lines and extending from said central office, an automatic line concentrator having access to said trunks and controlled by said central office for establishing connections between said lines and said trunks, and a signaling arrangement located partially at said concentrator and partially at said central office for providing an indication to said central office of the establishment of a connection of one of said lines to one of said trunks, said concentrator having a plurality of crosspoints with each connected on one side to one of siad lines and on the other side to one of said trunks, said signaling system including means for supplying a marking potential to the line side of all of said crosspoints connected to any one of said lines, means for supplying a connect potential over one of said trunks to the trunk side of one of said marked crosspoints, and means responsive to the simultaneous application of mark and connect potentials to any one of said crosspoints for supplying an indication thereof to said central office.

3. A line concentrator telephone system comprising a plurality of subscriber lines, a central office, a plurality of trunks less in number than said plurality of subscriber lines and extending from said central office, an automatic line concentrator having access to said trunks and controlled by said central office for establishing connections between said lines and said trunks, and a signaling arrangement located partially at said concentrator and partially at said central office for providing an indication to said central office of the establishment of a connection of one of said lines to one of said trunks, said signaling system including means at said central office for supplying a series of mark pulses to said concentrator, means at said concentrator responsive to the one of said mark pulses for operating said concentrator to establish a connection between one of said lines and one of said trunks, and means effective upon the operation of said concentrator operating means for returning the following mark pulses to said central office as line busy pulses to indicate the establishment of the connection.

4. A line concentrator telephone system comprising a plurality of subscriber lines; a central office; a plurality of talking trunks less in number than said plurality of lines extending from said central office; and an automatic line concentrator for connecting said lines and said trunks having means for connecting said lines with said trunks on a random slip basis, scanning means for cyclically determining the condition of said lines and for pulsing an indication of said condition to said central office, and means for providing an indication of the establishment of a line-to-trunk connection to said central office; said central office having timing means for controlling said scanning means, and preference circuit means controlled by said scanning means for selectively connecting said trunks associated with one of said lines in a predetermined order of preference with said one line and for providing an indication of said preference to said connecting means in said concentrator.

5. A line concentrator telephone system comprising a plurality of subscriber lines, a plurality of talking trunks less in number than said plurality of lines, a central office, and a remotely located line concentrator controlled by said central office for establishing connections between said lines and said trunks, an originating register at said central office for registering dial pulses, means at said concentrator responsive to the service request condition of any one of said lines for supplying the identity of said service requesting line to said central office, means at said central office controlled by said supply means for selecting an idle one of said trunks and for initiating the operation of said concentrator to connect said service requesting line to said selected trunk, means at said central office controlled by said select and initiating means for connecting said selected trunk to said register, means controlled by said register upon the completion of dialing for disconnecting said register from said selected trunk while maintaining the connection from said service requesting line to said selected trunk, an outgoing trunk at said central office, and means controlled by said register upon completion of dialing for establishing a connection for said selected trunk to said outgoing trunk which is still connected to said service requesting line.

6. A line concentrator telephone system in accordance with claim 5 comprising in addition means at said concentrator for cyclically scanning said plurality of subscriber lines, means responsive to the service request condition of any one of said lines for halting the operation of said scanning means, means effective upon the establishment of a connection from said service requesting line to said selected trunk by said concentrator for resuming the operation of said scanning means, and means for maintaining the operation of said scanning means during the operation of said register disconnect means and the operation of said outgoing trunk connection establishing means.

7. In a telephone system, a central office, a plurality of lines, a plurality of trunks less in number than said plurality of lines and connected to said central office, a line concentrator for establishing connections from any one of said lines to an idle one of said trunks, means for registering dial pulses, means responsive upon the initiating of a calling condition on any one of said lines for operating said line concentrator and for completing a dial connection from the connected one of said trunks to said register means, and means responsive upon the completion of dialing for disconnecting said register means from said connected trunk and for extending the talking connection from said connected trunk in accordance with the dialed digits.

8. A line concentrator telephone system comprising a plurality of subscriber lines; a central office; a plurality of talking trunks less in number than said plurality of lines and extending from said central office; and an automatic line concentrator for connecting said lines and said trunks having means for connecting said lines with said trunks on a random slip basis, scanning means for cyclically determining the condition of said lines and for supplying an indication of said condition to said central office, and means for providing an indication of the establishment of a line-to-trunk connection to said central office; said central office having timing means for controlling said scanning means, and means for establishing a call-back connection without interrupting the operation of said scanning means.

9. A line concentrator telephone system in accordance with claim 8 wherein said call-back connection establishing means comprises means for determining which one of said trunks was connected to said line for the dialing connection.

10. A line concentrator telephone system in accordance with claim 9 wherein said central office comprising in addition a register connectable to any one of said lines, means controlled by said scanning means for connecting said register to any one of said lines, and means for releasing said register after the operation of said determining means.

11. In a common control telephone system, a plurality of subscriber lines arranged in concentrator groups, a line concentrator for each of said groups of lines, a central office, a plurality of trunks for each of said concentrators being smaller in number than the number of lines in said group connected to the said concentrator and extending from said central office, means at said central office effective during both originating and terminating calls for outpulsing the identity of one of said lines to the associated one of said concentrators, means at said central office concurrently operating with said outpulsing means for selecting and marking one of said trunks associated with said associated concentrator, and means at each of said concentrators for establishing line-to-trunk connections under the dual control of said outpulsing means and said selecting means.

12. An automatic telephone system comprising a central office, remote stations, a switching network at said office and at each of said stations, trunks interconnecting said station networks with said office network, lines connected to each of said stations, means at each of said stations effective upon the origination of a call on one of said lines connected thereto for supplying an indication thereof to said central office, means at said central office responsive to the reception of an originating call indication for identifying the station to which said originating line is connected and to identify said originating line, means at said central office effective upon the initiation of a terminating call to any one of said lines for identifying the station to which said terminating line is connected and for identifying said terminating line, and common control means at said central office controlled by either of said identifying means for operating said network at said identified station to establish a line-to-trunk connection.

13. An automatic telephone system in accordance with claim 12 wherein each of said stations includes means for supplying an indication of the connection establishment to said central office.

14. An automatic telephone system comprising a central office, remote stations, a switching network at said office and at each of said stations, trunks interconnecting said station networks with said office network, lines connected to each of said stations, means at each of said stations effective upon the origination of a call on one of said lines connected thereto for supplying an indication thereof to said central office, means at said central office responsive to the reception of an originating call indication for identifying the station to which said originating line is connected and to identify said originating line, means at said central office effective upon the initiation of a terminating call to any one of said lines for identifying the station to which said terminating line is connected and means at each of said stations for supplying an indication of the connection establishment by the associated one of said networks to said central office, and means operative during the establishment of a call-back connection for allowing the operation of said central office network while preventing the release or operation of said station networks.

15. An automatic telephone system comprising a central office, remote stations, a switching network at said office and at each of said stations, trunks interconnecting said station networks with said office network, lines connected to each of said stations, means at each of said stations effective upon the origination of a call on one of said lines connected thereto for supplying an indication thereof to said central office, means at said central office responsive to the reception of an originating call indication for identifying the station to which said originating line is connected and to identify said originating line, means at said central office effective upon the initiation of a terminating call to any of said lines for identifying the station to which said terminating line is connected, and means at said central office for inhibiting the operation of said originating call identifying means for any of said lines.

16. In a telephone system, a central office, a subsidiary office, a plurality of subscriber lines at said subsidiary office having idle and busy and service request conditions, a plurality of talking trunks connecting said central office and said subsidiary office, a line scanner at said subsidiary office for cyclically determining the service condition of said lines and for providing an indication thereof to said central office, means at said central office for starting and stopping the operation of said line scanner, means at said central office responsive upon the reception of a service request indication from said scanner for causing said start-stop means to stop the operation of said line scanner, means at said subsidiary office for connecting any one of said lines to a selected one of said trunks, means at said central office responsive upon the reception of a service request indication from said scanner for selecting an idle one of said trunks and initiating the operation of said connecting means, means at said subsidiary office responsive upon the operation of said connecting means for supplying an indication of the establishment of a line-to-trunk connection to said central office, and means at said central office responsive upon the reception of said line-to-trunk connection establishment indication for causing said start-stop means to restart the operation at said scanner.

17. A remote line concentrator telephone system comprising a plurality of telephones, a subscriber line connected to each of said telephones, a central office, a plurality of concentrator trunks being less in number than the number of said lines and extending from said central office, a switching network interconnecting said lines and said trunks having means defining crosspoints between said lines and said trunks capable of defining conducting paths on application of marking potentials thereto, means at said central office for supplying marking potentials to all of said crosspoints associated with one of said trunks, means at said central office for supplying a series of mark pulses to all of said crosspoints associated with one of said lines whereby one of said crosspoints is operated, and means at said switching network responsive upon the operation of any one of said crosspoints for returning said series of mark pulses to said central office as an indication of crosspoint operation.

18. A line concentrator telephone system comprising a plurality of subscriber lines, a central office, a plurality of trunks less in number than said plurality of subscriber lines and extending from said central office, and an automatic line concentrator controlled by said central office for establishing connections between said lines and trunks for terminating and for originating calls, a line scanner at said concentrator for cyclically determining the condition of said lines and for supplying an indication of said condition to said central office, means at said central office and controlled by said line scanner when a service request indication is received for halting the operation of said line scanner and for registering the identity of said service requesting line, means at said central office controlled by said halting means for selecting an idle one of said trunks and for supplying the identity of said service requesting line back to said line scanner, and means at said concentrator controlled by said selecting means and said line scanner for establishing a connection from said service requesting line to said selected trunk.

19. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cyclically selecting each of said lines and for determining the service condition thereof, a line selection circuit at said central office and connectable to said line scanner for outpulsing the identity of one of said lines to said line scanner at a faster rate than the rate of scanning pulses from said source, and means at said central office and controlled by said line scanner for disconnecting said source from said line scanner and for connecting said line selection circuit to said line scanner.

20. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cyclically selecting each of said lines and for determining the service condition thereof, a line selection circuit at said central office and connectable to said line scanner for outpulsing the identity of one of said lines to said line scanner at a faster rate than the rate of scanning pulses from said source, and means at said central office effective upon the initiation of a terminating call to any one of said lines for disconnecting said line scanner from said source and for connecting said line scanner to said line selection circuit.

21. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cyclically selecting each of said lines and for determining the service condition thereof, a line selection circuit at said central office and connectable to said line scanner for outpulsing the identity of one of said lines to said line scanner at a faster rate than the rate of scanning pulses from said source, means at said central office controlled by said line scanner for selecting an idle one of said trunks and for providing an indication thereof to said concentrator, means at said concentrator and controlled by said line scanner and said trunk selecting means for establishing a line-to-trunk connection, and means at said central office for delaying the completion of the outpulsing operation by said line selection circuit until the completion of the operation of said trunk selecting means.

22. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cyclically selecting each of said lines and for determining the service condition thereof, a line selection circuit at said central office and connectable to said line scanner for outpulsing the identity of one of said lines to said line scanner at a faster rate than the rate of scanning pulses from said source, means at said concentrator for providing an indication to said central office of the establishment of the line-to-trunk connection, and switching means at said central office responsive upon the reception of a connection establishment indication from said concentrator for disconnecting said line selection circuit from said line scanner and for reconnecting said source to said line scanner.

23. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cyclically selecting each of said lines and for determining the service condition thereof, a line selection circuit at said central office and connectable to said line scanner for outpulsing the identity of one of said lines to said line scanner at a faster rate than the rate of scanning pulses from said source, means at said central office controlled by said line scanner for selecting an idle one of said trunks and for providing an indication thereof to said concentrator, means at said concentrator and controlled by said line scanner and said trunk selecting means for establishing a line-to-trunk connection, and means at said concentrator for providing to said central office an indication of the line-to-trunk connection establishment.

24. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cylically selecting each of said lines and for determining the service condition thereof, a line selection circuit at said central office and connectable to said line scanner for outpulsing to said line scanner a series of pulses comprising the identity of one of said lines, and means at said central office responsive upon the initiation of a terminating call to any one of said lines for disconnecting said line scanner from said source and for connecting said line scanner to said line selection circuit, said line selection circuit including means for making a line busy test before the completion of its outpulsing operation.

25. A line concentrator telephone system in accordance with claim 24 wherein said line busy test means includes means for delaying the last pulse of said series of pulses representing the identity of said line, and means for utilizing said last pulse as a line busy test pulse as well as part of the line identity pulses.

26. A line concentrator telephone system comprising a plurality of subscriber lines, a plurality of talking trunks less in number than said plurality of lines, a central office, and a remotely located line concentrator controlled by said central office for establishing connections between said lines and said trunks, a source of scanning pulses at said central office, a line scanner at said concentrator and controlled by said source for cyclically selecting each of said lines and for determining the service condition thereof, a line selection circuit at said central office and connectable to said line scanner for outpulsing the identity of one of said lines to said line scanner, means at said central office and controlled by said line scanner for disconnecting said source from said line scanner and for connecting said line selection circuit to said line scanner, means at said central office effective upon the initiation of a terminating call to any one of said lines for disconnecting said line scanner from said source and for connecting said line scanner to said line selection circuit, means at said central office controlled by said line scanner for selecting an idle one of said trunks and for providing an indication thereof to said concentrator, means at said concentrator and controlled by said line scanner and said trunk selecting means for establishing a line-to-trunk connection, and means in said line selection circuit for making a line busy test for both originating and terminating calls before the completion of the outpulsing operation.

27. A line concentrator telephone system comprising a plurality of subscriber lines having idle and service request conditions; a central office; a plurality of talking trunks less in number than said plurality of lines and extending from said central office; a plurality of control pairs less in number than said plurality of trunks and extending from said central office; a line concentrator connected to said talking trunks, to said control leads and to said subscriber lines for providing a connection between any one of said subscriber lines and any one of a predetermined group of said trunks associated with said line; means including said control leads and located partially at said concentrator and partially at said central office and responsive to the service request condition of any one of said lines for establishing a dial-tone connection through one of said trunks from said service requesting line; means at said concentrator for holding the connection between said line and said trunk when the rest of the dial-tone connection is released; and means at said central office effective during call back for releasing the dial-tone connection and for determining the identity of said trunk utilized for the dial-tone connection.

28. A telephone system comprising a plurality of subscriber lines, a plurality of talking trunks, a central office, a switching network controlled by said central office for establishing connections between said lines and said trunks, a line scanner associated with said network for determining the service condition of said lines and for supplying indications of said conditions to said central office, means at said central office responsive to a service request indication from said line scanner for halting the operation of said line scanner and for establishing a dial-tone connection through one of said trunks to the service requesting one of said lines, means effective upon the establishment of the dial-tone connection for restarting said line scanner, and means effective when dialing is completed for establishing a call-back connection without interrupting the operation of said line scanner.

29. A line concentrator telephone system comprising a plurality of subscriber lines having idle and service request conditions; a central office; a plurality of talking trunks less in number than said plurality of lines and extending from said central office; a plurality of control pairs less in number than said plurality of trunks and extending from said central office; a line concentrator connected to said talking trunks, to said control leads and to said subscriber lines for providing connections between said subscriber lines and said trunks; means including said control leads located partially at said concentrator and partially at said central office and responsive to the service request condition of any one of said lines for establishing a dial-tone connection through one of said trunks from said service requesting line; means at said concentrator for holding the connection between said line and said trunk when the rest of the dial-tone connection is released; means at said central office effective during the establishment of a call back connection for releasing the dial-tone connection and for determining the identity of said trunk utilized for the dial-tone connection; and means controlled by said determining means for establishing the call-back connection to said service requesting line through said trunk utilized for the dial-tone connection.

30. A line concentrator telephone system comprising a plurality of subscriber lines having idle and service request conditions; a central office; a plurality of talking trunks less in number than said plurality of lines and extending from said central office; a plurality of control pairs less in number than said plurality of trunks and extending from said central office; a line concentrator connected to said talking trunks, to said control leads and to said subscriber lines for providing connections between said subscriber lines and said trunks; a line link frame at said central office and including an auxiliary switch connected to said trunks; a switching network at said central office and connected to said line link frame; a switching network at said concentrator and connected to said trunks; a line scanner at said concentrator for determining the condition of said lines and for supplying indications thereof to said central office during normal scanning and for partially controlling the operation of said concentrator network when a call is being served and normal scanning is halted; an originating register at said central office connectable to said auxiliary switch; a concentrator register at said central office for registering the identity of said line being scanned; a pulse generator at said central office for synchronously operating said line scanner with said concentrator register; means at said central office and responsive to a service request indication through said control pairs from said line scanner for halting the operation of said line scanner and said concentrator register whereby the identity of said service requesting line is registered; means controlled by said concentrator register, for operating said central office switching network to establish a connection from said auxiliary switch to said originating register; means controlled by said concentrator register for outpulsing the identity of said service requesting line over said control pairs to said line scanner; means controlled by said concentrator register for selecting an idle one of said trunks; means controlled by said selecting means and effective after the operation of said outpulsing means for supplying a connect potential over said selected trunk to said concentrator; means at said concentrator responsive to said connect potential for operating said concentrator network to connect said service requesting line to said selected trunk; means at said concentrator responsive to the operation of said concentrator network for supplying an indication of the operation of said concentrator network over said control pairs to said central office; and means at said central office responsive to said network operation indication for operating said auxiliary switch to complete a connection from said service requesting line to said originating register.

31. A line concentrator telephone system in accordance with claim 30 wherein the rate of said outpulsing is greater than the scanning rate of said line scanner.

32. A line concentrator telephone system comprising a plurality of subscriber lines having idle and service request conditions; a central office; a plurality of talking trunks less in number than said plurality of lines and extending from said central office, said trunks being arranged in groups which are associated with said lines; a plurality of control pairs less in number than said plurality of trunks and extending from said central office; a line concentrator connected to said talking trunks, to said control leads and to said subscriber lines for providing a connection between any one of said subscriber lines and any one of a predetermined line associated group of said trunks; a line link frame at said central office and including an auxiliary switch connected to said trunks; a switching network at said central office and connected to said line link frame; a switching network at said concentrator and connected to said trunks; a line scanner at said concentrator for determining the condition of said lines and for supplying indications thereof to said central office during normal scanning and for partially controlling the operation of said concentrator network when a call is being served and normal scanning is halted; an originating register at said central office connectable to said auxiliary switch; a concentrator register at said central office for registering the identity of said line being scanned; a pulse generator at said central office for synchronously operating said line scanner with said concentrator register; means at said central office and responsive to a service request indication through said control pairs from said line scanner for halting the operation of said line scanner and said concentrator register; means controlled by said concentrator register for operating said central office switching network to establish a connection from said auxiliary switch to said originating register; means controlled by said concentrator register for outpulsing the identity of said service requesting line over said control pairs to said line scanner; means controlled by said concentrator register for selecting an idle one of said trunks; means controlled by said selecting means and effective after the operation of said outpulsing means for supplying a connect potential over said selected trunk to said concentrator; means at said concentrator responsive to said connect potential for operating said concentrator network to connect said service requesting line to said selected trunk; means at said concentrator responsive to the operation of said concentrator network for supplying an indication of the operation of said concentrator network over said control pairs to said central office; means at said central office responsive to said network operation indication for operating said auxiliary switch to complete a connection from said service requesting line to said originating register; means effective when dialing is completed for releasing said central office network and said auxiliary switch while maintaining the connection by said concentrator network from said service requesting line to said selected trunk; and means at said central office effective when dialing is completed but before the release of said auxiliary switch for determining the identity of said selected trunk.

33. A line concentrator telephone system in accordance with claim 32 comprising in addition means at said central office and controlled by said trunk identity determining means for establishing a call-back connection through said central office network and said auxiliary switch to said selected trunk.

34. In a common control telephone system, a plurality of subscriber lines arranged in groups; a line concentrator for each of said groups of lines; a central office; a plurality of trunks for each of said concentrators being smaller in number than the number of lines in said group connected to the said concentrator, said trunks extending from said central office; means at said central office effective during both originating and terminating calls for outpulsing the identity of one of said lines to the associated one of said concentrators; means at said central office concurrently operating with said outpulsing means for selecting and marking one of said trunks connected to said associated concentrator; and means at each of said concentrators for establishing line-to-trunk connections under the dual control of said outpulsing means and said selecting means; said outpulsing means including means for making a line busy test and for receiving an indication of the completion of the trunk selection by said trunk selecting and marking means before outpulsing is completed, and means for supplying an indication of the completion of outpulsing to said trunk selecting and marking means; said trunk selecting and marking means including means for supplying an indication of the completion of trunk selection to said line busy test and receiving means, and means for delaying marking said selected trunk until outpulsing is completed.

35. In a telephone system a plurality of subscriber telephones, a satellite office, a subscriber line connecting each of said telephones to said satellite office, a central office remote from said satellite office, at least one trunk connecting said offices, switching means at said satellite office for connecting any one of said subscriber lines to said trunk, scanning means at said satellite office for scanning said lines in succession and for transmitting to said central office an indication of the service condition of said lines, a marker at said central office, means controlled by said scanning means for initiating the operation of said marker, means effective when a call is made to any one of said lines for initiating the operation of said marker, and means controlled by said marker for operating said switching means.

36. In a telephone system a plurality of subscriber telephones, a satellite office, a subscriber line connecting each of said telephones to said satellite office, a central office remote from said satellite office, at least one trunk connecting said offices, switching means at said satellite office for connecting any one of said subscriber lines to said trunk, scanning means at said satellite office for scanning said lines in succession and for transmitting to said central office an indication of the service condition of said lines, a marker at said central office, means controlled by said scanning means for initiating the operation of said marker, means effective when a call is made to any one of said lines for initiating the operation of said marker, means controlled by said marker for operating said switching means, means at said central office and effective upon the termination of a call for initiating the release of said switching means, and means effective as long as said marker is operating to establish a connection for another of said lines for delaying said release initiating means.

37. In a telephone system a plurality of subscriber telephones, a satellite office, a subscriber line connecting each of said telephones to said satellite office, a central office remote from said satellite office, at least one trunk connecting said offices, switching means at said satellite office for connecting any one of said subscriber lines to said trunk, scanning means at said satellite office for scanning said lines in succession and for transmitting to said central office an indication of the service condition of said lines, a marker at said central office, means controlled by said scanning means for initiating the operation of said marker, means effective when a call is made to any one of said lines for initiating the operation of said marker, means controlled by said marker for operating said switching means, means at said central office and effective upon the termination of a call for initiating the release of said switching means, means effective as long as said marker is operating for delaying said release initiating means, and means for inhibiting the operation of said marker initiating means that is controlled by said scanning means for calls originated at predetermined ones of said lines.

38. In a telephone system a plurality of subscriber telephones, a satellite office, a subscriber line connecting each of said telephones to said satellite office, a central office remote from said satellite office, at least one trunk connecting said offices, control pairs connecting said offices through which all the operating power for said satellite office is supplied on a phantom basis from said central office, switching means at said satellite office for connecting any one of said subscriber lines to said trunk, scanning means at said satellite office for scanning said lines in succession and for transmitting to said central office over said control pairs an indication of the service condition of said lines, a marker at said central office, means controlled by said scanning means for initiating the operation of said marker, means effective when a call is made to any one of said lines for initiating the operation of said marker, and means including said control pairs and controlled by said marker for operating said switching means.

39. In an electrical system comprising a central station and a plurality of lines remote from that station, each of said lines having an idle and a service request condition, means including counters remotely located with said lines for relaying to said station information as to the condition of said lines, means at said central station for receiving said relayed information and for halting the operation of said relaying means when the received information indicates a service request condition on any one of said lines, and means including said counters and controlled by said receiving and halting means for establishing a connection from said station to said service requesting line.

40. In an electrical system comprising a central station and a plurality of lines remote from that station, each of said lines having an idle and a service request condition, means including counters remotely located with said lines for relaying to said station information as to the condition of said lines, means at said central station for receiving said relayed information and for halting the operation of said relaying means when the received information indicates a service request condition on any one of said lines, means including said counters and controlled by said receiving and halting means for establishing a connection from said station to said service requesting line, and means effective upon the operation of said connection establishing means for restarting said relaying means.

41. In an electrical system comprising a central station and a plurality of lines remote from that station, each of said lines having an idle and a service request condition, means including counters remotely located with said lines for relaying to said station information as to the condition of said lines, means at said central station for receiving said relayed information and for halting the operation of said relaying means when the received information indicates a service request condition on any one of said lines, means including said counters and controlled by said receiving and halting means for establishing a connection from said station to said service requesting line, means for disconnecting an established connection to any one of said lines, and means controlled by said connection establishing means for delaying the operation of said disconnect means when said connection establishing means is operating.

42. A line concentrator telephone system comprising a plurality of subscriber lines, a plurality of talking trunks less in number than said plurality of lines, a central office, a remotely located line concentrator controlled by said central office for establishing connections between said lines and said trunks, an originating register at said central office for registering dial pulses, means at said concentrator responsive to the service request condition of any one of said lines for supplying the identity of said service requesting line to said central office, means at said central office controlled by said supply means for selecting an idle one of said trunks and for initiating the operation of said concentrator to connect said service requesting line to said selected trunk, means at said central office controlled by said select and initiating means for connecting said selected trunk to said register, means controlled by said register upon the completion of dialing for disconnecting said register from said selected trunk while maintaining the connection from said service requesting line to said selected trunk, an outgoing trunk at said central office, means controlled by said register upon completion of dialing for establishing a connection from said outgoing trunk to said selected trunk which is still connected to said service requesting line, means effective when the subscriber at said service requesting line hangs up for disconnecting said selected trunk at one end from said outgoing trunk and at the other end from said service requesting line, said disconnect means comprising means effective during the operation of either said register connecting means or said outgoing trunk connecting means for registering the identity of said selected trunk, and means effective during the operation of either said register connecting means or said outgoing trunk connecting means for preventing the disconnect of said selected trunk from said service requesting line.

43. A line concentrator telephone system comprising a plurality of subscriber lines, a plurality of talking trunks less in number than said plurality of lines, a central office, a remotely located line concentrator controlled by said central office for establishing connections between said lines and said trunks, an originating register at said central office for registering dial pulses, means at said concentrator for cyclically scanning said plurality of subscriber lines, means responsive to the service request condition of any one of said lines for halting the operation of said scanning means, means at said concentrator and controlled by said scanning means for supplying to said central office the identity of said service requesting line, means at said central office controlled by said supply means for selecting an idle one of said trunks and for initiating the operation of said concentrator to connect said service requesting line to said selected trunk, means at said central office controlled by said select and initiating means for connecting said selected trunk to said register, means controlled by said register upon the completion of dialing for disconnecting said register from said selected trunk while maintaining the connection from said service requesting line to said selected trunk, an outgoing trunk at said central office, means controlled by said register upon completion of dialing for establishing a connection for said outgoing trunk to said selected trunk which is still connected to said service requesting line, means effective upon the establishment of a connection from said service requesting line to said selected trunk by said concentrator for resuming the operation of said scanning means and means effective when the subscriber at said service requesting line hangs up for disconnecting said selected trunk at one end from said outgoing trunk and at the other end from said service requesting line, said disconnect means comprising means effective during the operation of either said register connecting means or said outgoing trunk connecting means for registering the identity of said selected trunk, means effective during the operation of either said register connecting means or said outgoing trunk connecting means for preventing the disconnect of said selected trunk from said service requesting line, and means for maintaining the operation of said scanning means during the operation of said register disconnect means and during the operation of said disconnect means and during the operation of said outgoing trunk connecting means.

44. In an electrical system, a central station, a plurality of lines remote from that station, each of said lines having an idle and a service request condition, means including counters remotely located with said lines for relaying to said station information as to the condition of said lines, means at said central station for receiving said relayed information and for halting the operation of said relaying means when the received information indicates a service request condition on any one of said lines, means including said counters and controlled by said receiving and halting means for establishing a connection from said station to said service requesting line, and means for inhibiting the operation of said receiving and halting means when the received information indicates a service request condition on a predetermined one of said lines.

45. A line concentrator telephone system comprising a plurality of subscriber lines, a central office, a plurality of trunks less in number than said plurality of subscriber lines and extending from said central office, a plurality of control pairs less in number than said plurality of trunks, an automatic line concentrator controlled by said central office for establishing connections between said lines and trunks for terminating and for originating calls, a line scanner at said concentrator for cyclically determining the condition of said lines and for supplying an indication of said condition over said control pairs to said central office, means at said central office and controlled by said line scanner when a service request indication is received for halting the operation of said line scanner and for registering the identity of said service requesting line, means at said central office controlled by said halting and registering means for selecting an idle one of said trunks and for supplying the identity of said service requesting line back to said line scanner over said control pairs, means at said concentrator controlled by said selecting and supplying means and by said line scanner for establishing a connection from said service requesting line to said selected trunk, and means for supplying the operating power for said concentrator over said control pairs on a phantom basis from said central office.

46. A line concentrator telephone system comprising a plurality of groups of subscriber lines; a central office; a plurality of groups of trunks extending from said central office; and a plurality of line concentrators controlled by said central office for establishing connections from said lines to said trunks, each of said concentrators being connected to one of said groups of trunks and one of said groups of lines and comprising a counting circuit, means including said counting circuit for determining the conditions of the lines in said group connected thereto, and a switching network controlled by said counting circuit for establishing connections from any one of said group of lines to one of said group of trunks connected to said concentrator; said central office having a register counting circuit, a pulse generator for cyclically operating all of said concentrator counting circuits with said register counting circuit, means controlled by said determining means in any one of said concentrators for halting the operation of said register counting circuit whereby the identity of said concentrator and of one of said lines is registered thereby, and means controlled by said register counting circuit and by said generator for operating said network in said identified concentrator to connect sad identified line to one of said trunks, said network operating means including a selector counting circuit for outpulsing the identity of said identified line to said counting circuit in said identified concentrator.

47. In a telephone system, a plurality of subscriber lines, a central office, at least one trunk extending from said central office, switching means remotely located from said central office for connecting any one of said lines to said trunk, means for recognizing at said central office the initiation of a service request condition on any one of said lines, common control equipment at said central office for controlling the operation of said switching means, means controlled by said recognizing means for operating said common control equipment, and means effective when a call is made to any one of said lines for operating said common control equipment.

48. A line concentrator telephone system comprising a plurality of subscriber lines, a central office, a plurality of trunks less in number than said plurality of subscriber lines and extending from said central office, an automatic line concentrator having access to said trunks and controlled by said central office for establishing connections between said lines and said trunks, means for recognizing at said central office the initiation of a service request from any one of said lines, means at said central office and controlled by said recognizing means for operating said line concentrator, and a denial circuit at said central office for denying service to any predetermined one of said lines.

49. A line concentrator telephone system in accordance with claim 48 wherein said denial circuit includes manual switches for preselecting said line for which service is to be denied.

50. In an electrical system comprising a central station and a plurality of lines remote from that station, each of said lines having an idle and a service request condition, means remotely located with said lines for relaying to said station information as to the condition of said lines, means at said central station for receiving said relayed information and for halting the operation of said relaying means when the received information indicates a service request condition on any one of said lines, means controlled by said receiving and halting means for establishing a connection from said station to said service requesting line, and means effective upon the operation of said connection establishing means for restarting said relaying means.

51. In an electrical system comprising a central station and a plurality of lines remote from that station, each of said lines having an idle and a service request condition, a line scanner remotely located with said lines for determining the condition of said lines, means at said central station controlled by said scanner upon the initiation of a service request condition on any one of said lines for halting the operation of said scanner, and means including said scanner and controlled by said halting means for establishing a connection from said station to said service requesting line.

References Cited in the file of this patent

UNITED STATES PATENTS

| | | |
|---|---|---|
| 2,715,656 | Andrews | Aug. 16, 1955 |
| 2,715,657 | Andrews | Aug. 16, 1955 |
| 2,715,658 | Dunlap et al. | Aug. 16, 1955 |
| 2,724,746 | Bruce | Nov. 22, 1955 |